(12) United States Patent
Fujiwara et al.

(10) Patent No.: US 8,256,075 B2
(45) Date of Patent: *Sep. 4, 2012

(54) GRID FOR A BATTERY PLATE, METHOD OF PRODUCING THE SAME, AND BATTERY USING THE SAME

(75) Inventors: Yoshiomi Fujiwara, Kyoto (JP); Ken Sawai, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/893,836

(22) Filed: Sep. 29, 2010

(65) Prior Publication Data

US 2011/0017035 A1    Jan. 27, 2011

Related U.S. Application Data

(62) Division of application No. 12/011,372, filed on Jan. 25, 2008, now Pat. No. 7,814,628, which is a division of application No. 10/177,972, filed on Jun. 20, 2002, now abandoned.

(30) Foreign Application Priority Data

| Jun. 22, 2001 | (JP) | 2001-190103 |
| Jul. 16, 2001 | (JP) | 2001-215197 |
| Jul. 16, 2001 | (JP) | 2001-215198 |
| Dec. 6, 2001 | (JP) | 2001-372429 |
| Mar. 4, 2002 | (JP) | 2002-057580 |
| Mar. 11, 2002 | (JP) | 2002-065639 |

(51) Int. Cl.
*H01M 4/74* (2006.01)
*B21D 31/04* (2006.01)

(52) U.S. Cl. .................. 29/2; 29/6.1; 429/242

(58) Field of Classification Search .......... 29/2
See application file for complete search history.

(56) References Cited

U.S. PATENT DOCUMENTS

| 4,291,443 A | 9/1981 | Laurie et al. |
| 4,297,866 A | 11/1981 | Sakauye et al. |
| 5,136,765 A * | 8/1992 | Tanaka et al. .............. 29/6.1 |

FOREIGN PATENT DOCUMENTS

| CA | 1106703 | 8/1981 |
| JP | 10-079253 | 3/1998 |
| JP | 10-223232 | 8/1998 |
| JP | 11-260373 | 9/1999 |
| JP | 2000-106190 | 4/2000 |
| JP | 2000-348734 | 12/2000 |
| JP | 2000-348735 | 12/2000 |
| JP | 2000-357518 | 12/2000 |

* cited by examiner

*Primary Examiner* — Gregg Cantelmo
(74) *Attorney, Agent, or Firm* — Jordan and Hamburg LLP

(57) ABSTRACT

A grid for a battery plate is made by forming a metal sheet is formed into a grid-like shape. Rupture due to torsion or stress concentration does not occur in a basal portion of a wire which is drawn out from a node of the grid, thereby preventing corrosion due to electrolyte from advancing so as not to cause a crack of corrosion in an early stage. The invention provides also a battery using the grid for a battery plate, a method of producing the grid for a battery plate, and a battery using it.

3 Claims, 35 Drawing Sheets

WIDTH DIRECTION

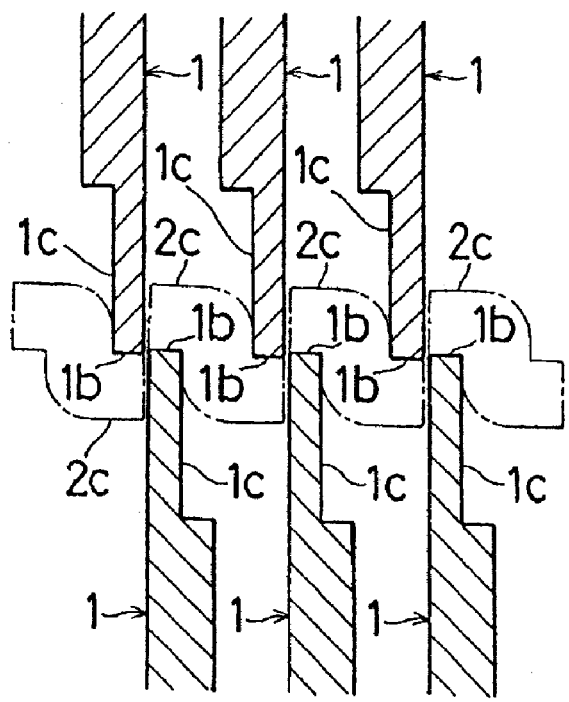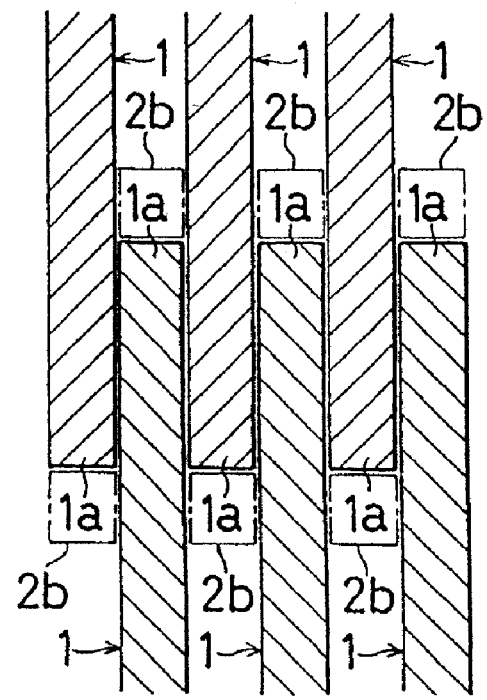
Fig.39(a) PRIOR ART
Fig.39(b) PRIOR ART

GRID FOR A BATTERY PLATE, METHOD OF PRODUCING THE SAME, AND BATTERY USING THE SAME

REFERENCE TO RELATED APPLICATION

This is a divisional application of Ser. No. 12/011,372, filed Jan. 25, 2008, now U.S. Pat. No. 7,814,628, which is a divisional of Ser. No. 10/177,972 filed Jun. 20, 2002. The subject matter of the aforementioned prior applications are hereby incorporated herein by reference.

BACKGROUND OF THE INVENTION

The present invention relates to a grid for a battery plate which is produced by a rotary expander, a method of producing it, and a battery using it.

A battery plate of a lead storage battery is configured by filling an active material into meshes of a grid made of lead or a lead alloy. Such a grid is often produced by directly forming a grid-like shape by means of, for example, casting of lead or a lead alloy, or alternatively by forming meshes in a metal sheet made of lead or a lead alloy (hereinafter, a sheet such as that containing lead, a lead alloy, or another alloy is referred to merely as a metal sheet) by an expander. The expander is of the reciprocal type in which meshes are sequentially formed in a metal sheet with starting from both the ends of the sheet, by vertical motions of a die cutter, or of the rotary type in which slits are formed in a zigzag pattern by rotation of a disk cutter, and the metal sheet is stretched from both the sides to develop the slits into meshes. As shown in FIG. 37, in a disk cutter 1 which is used in the rotary expander, large numbers of ridges 1a and valleys 1b are alternately formed at regular intervals along a circumferential direction on the peripheral side face of a metal disk. The valleys 1b are curved faces consisting of the circumferential face itself constituting the peripheral side face of the disk of the disk cutter 1. The oval enlarged view in FIG. 37 shows the circumferential face in a form developed to a plane. Each of the ridges 1a is formed by protruding the circumferential face of the disk cutter 1 in a ridge-like shape toward the outer periphery. The apex of the ridge is rounded and formed with being shifted toward the front side in the rotational direction (indicated by the arrow in the figure).

In the disk cutter 1, grooves 1c are formed in both the disk-like faces and in every other valley 1b. Each of the grooves 1c is a groove which has a width that is equal to the length (the distance between adjacent ridges 1a) of the corresponding valley 1b, and a depth that is about one half of the thickness of the valley 1b (the thickness of the disk cutter 1), and which is radially formed in the disk face of the disk cutter 1. The groove 1c is formed so as to open in the valley 1b in the outer peripheral side and have a length of some degree toward the center. The grooves 1c which are formed in every other valley 1b are arranged so as to be alternate on both the faces.

A large number of such disk cutters 1 are arranged on a common rotation shaft with being separated from each other by a distance which is approximately equal to the thickness of the disk cutters 1, thereby forming a disk cutter roll. As shown in FIG. 38, two disk cutter rolls each configured by a large number of such disk cutters 1 are vertically arranged, and a lead sheet 2 is passed between the rolls, thereby forming slits 2a. In this case, as, shown in FIG. 39(a), the upper and lower disk cutter rolls are placed respectively at levels which allow the valleys 1b of the upper and lower disk cutter 1 to slightly overlap with each other. Furthermore, the upper and lower disk cutter rolls are placed with being shifted in the axial direction by a half pitch so that each of the disk cutters 1 of the lower disk cutter roll is positioned between the disk cutters 1 of the upper disk cutter roll. The rotational phase is adjusted so that, when the valley 1b in which the groove 1c is formed in one disk face of the upper disk cutter 1 reaches the lower end, the valley 1b in which the groove 1c is formed in the other disk face of the lower disk cutter 1 reaches the upper end, and, when the ridge 1a of the upper disk cutter 1 reaches the lower end, as shown in FIG. 39(b), the ridge 1a of the lower disk cutter 1 reaches the upper end.

When a metal sheet 2 is passed between the disk cutter rolls, as shown in FIG. 38, the slits 2a are formed in the metal sheet 2 by the ridges 1a of the upper and lower disk cutters 1, and thin wires 2b between the slits 2a which are formed adjacently in the width direction of the metal sheet 2 are pressed by the upper and lower ridges 1a to alternately vertically protrude in a ridge-like shape. As shown in FIG. 39(a), in the valleys 1b of the upper and lower disk cutters 1 where the grooves 1c face each other in opposite directions, the metal sheet 2 is cut so that the slits 2a are continuously formed, and, in the valleys where the grooves 1c face each other, the metal sheet 2 is not cut so that the slits 2a are intermitted to form nodes 2c. In the metal sheet 2, therefore, the slits 2a each having a length corresponding to two ride-like shapes which are formed by pressing of the ridges 1a are continuously formed in the transportation direction while being intermitted in the nodes 2c. Adjacent ones of the slits 2a are similarly continuously formed while their nodes 2c are shifted from each other by a half pitch. Therefore, the slits 2a are formed in a zigzag pattern as shown in a plan view which is in a circle of FIG. 38.

The metal sheet (lead sheet) 2 in which the many slits 2a are formed as described above is stretched toward both the sides in the width direction in a subsequent step. As a result, as shown in FIG. 40, the slits 2a are widened so as to form meshes, whereby a lattice-like grid is formed in which the nodes 2c are connected to one another by four wires 2b that are obliquely bent to be drawn out.

As shown in FIG. 47, endmost disk cutters 4 are disposed on both the axial ends of the lower disk cutter roll, respectively. In each of the endmost disk cutters 4, as shown in FIGS. 48 and 49, ridges 4a and valleys 4b are alternately arranged in the peripheral edge. The valleys 4b, and grooves 4c which are formed in the valleys 4b are configured in the strictly identical manner as the valleys 1b and the grooves 1c of the usual disk cutters 1. In each of the ridges 4a, however, a peripheral side face configured by a reference circumferential face is formed. Namely, in the endmost disk cutters 4, the ridges 4a do not protrude in a ridge-like shape toward the outer periphery, and the valleys 4b do not have a shape which is relatively recessed with respect to the ridges 4a. The endmost disk cutters 4 are placed at the ends of the lower disk cutter roll so as to be outward juxtaposed with the usual disk cutters 1 at the ends of the upper disk cutter roll, respectively.

In the ends of the disk cutter rolls, as shown in FIG. 47(b), the ridges 4a of the endmost disk cutters 4 of the lower disk cutter roll overlap with the ridges 1a of the end disk cutters 1 of the upper disk cutter roll, whereby the metal sheet 2 between the ridges are cut so that the slits 2a are formed and the wires 2b downward protrude in a ride-like shape. As shown in FIGS. 47(a) and 47(c), also in the adjacent portions (the right end in FIG. 47(a), and the left end in FIG. 47(b)) where the grooves 4c of the valleys 4b of the lower endmost disk cutters 4, and the grooves 1c of the valleys 1b of the upper end disk cutters 1 face each other in opposite directions, the valleys 1b and 4b slightly overlap with each other, whereby the metal sheet 2 is cut and the slits 2a are continuously formed. However, in the adjacent portions (the left end in FIG. 47(a), and the right end in FIG. 47(b)) where the grooves 4c of the valleys 4b of the lower endmost disk cutters 4, and the grooves 1c of the valleys 1b of the upper end disk cutters 1 are formed in the opposed faces so as to face each other, the grooves 1c and 4c cause the peripheral side faces of the valleys 1b and 4b not to overlap with each other, and the metal sheet 2 is not cut. Therefore, endmost nodes 2f which are similar to the nodes 2c are formed. Since no slit 2a is formed in the outer end, the endmost nodes 2f are directly connected to frame portions 2g which are formed in the ends in the width direction of the metal sheet 2.

The metal sheet 2 in which the many slits 2a are formed as described above is stretched toward both the sides in the width direction in the subsequent step of the rotary expander. As a result, as shown in FIG. 50, the slits 2a are widened so as to form meshes, whereby a lattice-like grid is formed in which the nodes 20 and the endmost nodes 2f are connected to one another by four wires 2b that are obliquely drawn out. In practice, the nodes 2c are pulled by the wires 2b during the developing step to be inclined in a twisting direction. In FIG. 50, however, such twist is omitted and the grid is diagrammatically shown.

Problem (1) to be Solved by the Invention

In the conventional grid described above, when the slits 2a are formed in the metal sheet 2, the wires 2b connected to each of the nodes 2c are pressed by the ridges 1a to be bent in the basal end. During a process of developing the slits 2a into a lattice-like shape, the tensile stress applied to the wires 2b is concentrated in the basal end where the wires are connected to the node 2c. When stress is concentrated in the basal end of the node 2c, an excessive load is applied to the basal end during the developing process, and rupture may occur in the basal end. Therefore, corrosion due to electrolyte easily advances with starting from the basal end, thereby causing the possibility that a crack of corrosion occurs in the wires 2b during use of a battery.

Consequently, a conventional grid which is produced by using a rotary expander has a problem in that a basal end where a wire is connected to a node is cracked by corrosion and the life of a battery is shortened.

Problem (2) to be Solved by the Invention

In the conventional disk cutter 1 configured as described above, as shown in FIG. 41, each of the ridges 1a is not formed as a ridge having an isosceles triangular shape, but formed into a scalene triangular shape in which the apex 1i is formed with being shifted toward the front side in the rotational direction. The rotating disk cutter 1 forms the slits 2a in the metal sheet 2, and presses the fence-like portion between the slits 2a by the ridges 1a to project the portion in a ridge-like shape, thereby forming the wires 2b. In the case where the ridges 1a have an isosceles triangular shape, therefore, the front half of the fence-like portion between the slits 2a protrudes in a ridge-like shape while being gradually stretched by the apexes 1i of the ridges 1a, and in contrast the latter half is pressed only by the rear slopes of the ridges 1a which are in rear of the apexes 1a. In each of the wires 2b between the slits 2a and protruding in a ridge-like shape, consequently, the front half is more elongated to be thinned. When a grid is formed by stretching such wires, there arises a defect that walls of the meshes are uneven in thickness. By contrast, when the apex 1i of each ridge 1a is formed with being shifted toward the front side, the fence-like portion between the slits 2a is first pressed by a substantially whole front area of the slope which is raised by a steep angle $\theta_{10}$ of the front side, so as to protrude at a relatively early timing to form the wires 2b. In accordance with the rotation, also the rear area gradually protrudes. As a result, the whole wires 2b are uniformly extended and the thickness is even. Because of the above, conventionally, a rotary expander uses the disk cutter 1 in which the apex 1i of the ridge 1a is formed with being shifted toward the front side in the rotational direction (see Japanese Patent Publication (Kokoku) No. SHO59-35694).

The metal sheet 2 in which the many slits 2a are formed as described above is stretched toward both the sides in the width direction in a subsequent step, whereby the slits 2a are widened to form rhombic meshes, with the result that a grid for a battery plate is formed.

With respect to the angles at which the slopes on both the sides of the apex 1i of each ridge 1a are connected to the valleys 1b, the front angle $\theta_{10}$ is steeper than the rear angle $\theta_{20}$. As shown in FIG. 42, also in each of the wires 2b which are formed as a result of protrusion of the fence-like portion between the slits 2a of the metal sheet 2 in a ridge-like shape, therefore, the front bending angle $\theta_{11}$ is steeper than the rear bending angle $\theta_{21}$. When the metal sheet 2 is stretched to widen the slits 2a to form meshes, therefore, the degree of cut into the nodes 2c is large or the strength is reduced in the front end where the wires 2b between the slits 2a are sharply bent. As a result, as shown in FIG. 43, there arises the possibility that the length of the nodes 2c is reduced, or rupture occurs in edge portions (edge portions D in FIG. 43). In FIG. 43, twisting is not shown, and the grid is schematically shown.

When a grid for a battery plate is produced by using the disk cutters 1 of a conventional rotary expander, particularly in the case where the grid is used as a positive plate, the nodes 2c of the meshes and the edge portions D are corroded by electrolyte with starting from rupture or the like to cause a crack of corrosion, thereby producing a problem in that the capacity of a lead storage battery is reduced or the life of the battery is shortened.

Problem (3) to be Solved by the Invention

As shown in FIG. 44, the wires 2b are pressed by the ridges 1a of the disk cutters 1 to be elastically deformed in a ridge-like shape in which the apex 2e is bent at the steepest curvature. Even when the ridges are stretched in an oblique direction in the developing step to become linear, therefore, the apex 2e of each ridge remains to be elastically deformed and hence cannot be stretched into a fully linear form. When the wires 2b are stretched in the developing step, consequently, the tensile stress in this process is easily concentrated in both sides of the elastically deformed portion of the apex 2e which is bent.

In practice, the wires 2b are developed in the developing step not only by being obliquely stretched to become linear, also by being twisted at the ends in opposite directions as indicated by the arrows D and E in FIG. 45. As shown in FIG. 39(a) or FIGS. 47(a) and 47(c), in each of the nodes 2c, the sides in the width direction of the metal sheet 2 are vertically pressed in opposite directions by the valleys 1b of the upper and lower the disk cutters 1. Therefore, a level difference which approximately corresponds to the thickness of the sheet is formed between one side in the width direction and the other side, and also positions where the wires 2b are drawn out are different in level. As shown in FIG. 45, in a node 2c which is connected to one end of a certain wire 2b, one side in the width direction is higher in level, and the other side is lower. By contrast, in another node 2c which is connected to the other end of the same wire 2b, one side in the width direction is lower in level, and the other side is higher. When the metal sheet 2 is stretched in the width direction, therefore, the nodes 2c are stretched toward both the sides in the width direction by the wires 2b which are different in level, with the result that the nodes 2c, 2c which are shown in right upper, and left lower portions of FIG. 45 are twisted in the direction of the arrow F, and in contrast the nodes 2c, 2c which are shown in left upper, and right lower portions of FIG. 45 are twisted in the opposite direction or the direction of the arrow G. The wire 2b between the right upper and left upper nodes 2c, 2c is developed while the ends are twisted in opposite directions or the directions of the arrows D and E, respectively. As a result, each of the wires 2b is stretched while the ends are twisted in opposite directions, so that the torsion stress is easily concentrated in both sides of the elastically deformed portion of the apex 2e.

In each of the wires 2b, consequently, the tensile stress and the torsion stress in the developing step are concentrated on both the sides of the elastically deformed portion of the apex 2e which remains to be bent, and a constricted part may be formed. Therefore, a grid which is produced by using a conventional rotary expander has a problem in that rupture often occurs in the portion. In the case where the metal sheet 2 is thick or has a thickness larger than 1.0 mm, or the case where the disk cutters 1 in which the ridges 1a largely protrude are used, particularly, rupture often occurs in the vicinity of the apex 2e of each wire 2b. When a battery is produced by using such a grid as a battery plate, local corrosion occurs in the rupture portion, or in the worst case a crack of corrosion occurs the wires 2b, thereby causing the life of the battery to be shortened. The invention has been conducted in order to cope with the above-discussed circumstances. It is an object of the invention to provide a grid for a battery plate in which an inclined face is formed on a peripheral side face of each ridge of a disk cutter, and wires are formed in a ridge-like shape in a state where the wires are pretwisted, thereby causing the wires to hardly rupture, and also a method of producing the grid.

Problem (4) to be Solved by the Invention

The shape of the disk cutter 1 and production steps in the production of a grid for a battery plate in which disk cutters for a rotary expander are used are shown in FIGS. 37 to 40. In a process of producing the grid for a battery plate, the slits 2a and the nodes 2c are formed in the metal sheet 2. As apparent from FIG. 46(a), the cutting is conducted while pressing each of the nodes 2c against a ridgeline 1k of the portion of the disk cutter 1 where the groove 1c of the peripheral side face of the valley 1b is formed. As shown in FIG. 46(b), therefore, stress is concentrated on the portion against which the ridgeline 1k is pressed, and rupture sometimes occurs in the node 2c. When such rupture once occurs, corrosion advances with starting from the rupture, and crack of corrosion finally occurs, thereby producing a problem in that the capacity of a lead storage battery is reduced or the life of the battery is shortened.

The invention has been conducted in order to cope with the above-discussed circumstances. It is an object of the invention to provide a method of producing a grid for a battery in which stress concentration is relaxed and rupture hardly occurs in the node 2c, and a battery using the grid for a battery.

Problem (5) to be Solved by the Invention

In the formation of the nodes 2c and the endmost nodes 2f of the metal sheet 2, as shown in FIGS. 47(a) and 47(c), the sides in the width direction are vertically pressed in opposite directions by the valleys 1b and 4b of the upper and lower disk cutters 1 and the endmost disk cutters 4 in which the grooves 1c are opposed to each other. Therefore, the sides in the width direction are vertically deformed with respect to each other by a large degree corresponding to the thickness of the metal sheet 2 or more, and the metal sheet 2 of the endmost nodes 2f is stretched to be thinned in accordance with the deformation.

When the metal sheet 2 is stretched toward both the sides in the width direction, development is conducted while the wires 2b drawn out from the nodes 2c and the endmost nodes 2f which are thinned by the vertical deformation are laterally pulled to be obliquely bent. Therefore, stress is concentrated on the nodes 2c and the endmost nodes 2f, and the possibilities that rupture occurs during a production process, and that, after a battery is produced by using such a grid for a battery, a crack of corrosion is caused between the nodes and the wires 2b by corrosion or heat are increased. When a crack of corrosion of the wires 2b occurs in one of the endmost nodes 2f connected to the frame portions 2g of the metal sheet 2 where a lug of the grid is formed for current collection from the battery plate, the plate portion that is on the other side in the width direction is connected to the lug through a detour. As a result, the current hardly flows, so that disadvantages such as that the active material in the portion is not effectively used, and that a large current flows through the detour to generate heat are largely increased. When a crack of corrosion occurs in any one of the nodes 2c other than the endmost nodes 2f, similarly, a current hardly flows from the plate portion that is on the other side in the width direction with respect to the node 2c. However, influence due to the above is more extremely reduced as the node 2c is more separated from the frame portions 2g where a lug is formed.

SUMMARY OF THE INVENTION

The invention has been conducted in order to solve the above-discussed problems. It is an object of the invention to provide a grid for a battery plate in which various unique measures are taken mainly on the peripheral side faces of the valleys 1b between the ridges 1a of the disk cutters 1, to prevent rupture from occurring during a process of producing the grid, and corrosion and a crack of corrosion from occurring in nodes and edges of meshes of the grid for a battery plate, thereby preventing the capacity of a lead storage battery from being reduced, and the life of the battery from being shortened, a method of producing the grid, and a battery using the grid.

In the endmost nodes 2f connected to the frame portions 2g of the metal sheet 2, a crack of corrosion of the wires 2b easily occurs in the same manner as in the other nodes 2c. Consequently, there arises a problem in that, in many batteries, the capacity is largely reduced by a crack in the endmost nodes 2f. The invention has been conducted in order to cope with the above-discussed circumstances. It is an object of the invention to provide a grid for a battery plate in which the peripheral side faces of the valleys of the endmost disk cutters are recessed toward the center, whereby deformation of endmost nodes is reduced so that a crack of wires hardly occurs, and a method of producing the grid.

Means for Solving Problem (1)

The invention provides a grid for a battery plate in which a large number of slits each configured by a cut elongating in a longitudinal direction are formed in a metal sheet in a zigzag pattern, the metal sheet is stretched in a width direction to develop the slits, and nodes configured between slits that are adjacent in the longitudinal direction are connected to one another to form a lattice-like shape, by four wires which are configured between slits that are adjacent in the width direction, and which are obliquely bent to be drawn out, wherein at least one of the four wires connected to each of the nodes is bent in a predetermined oblique direction via a drawn-out portion which is drawn out from the node in a substantially longitudinal direction.

According to the invention, since at least one wire is bent at the tip end of the substantially straight drawn-out portion which is drawn out from the node, tensile stress produced during a process of developing the wire is applied with being dispersed not only to the basal end of the node but also to the whole drawn-out portion, and hence at least the wire can be prevented from being easily corroded.

The invention provides a method of producing a grid for a battery plate in which a metal sheet is passed between two rotating disk cutter rolls in each of which a plurality of disk cutters are placed on a same shaft with forming a gap therebetween, each of the disk cutters being configured by: alternately forming ridges which protrude in a ridge-like shape toward an outer peripheral side, and valleys composed of a circumferential face or a flat face along a circumferential direction on a peripheral side face of a disk; and forming grooves which are opened in an outer peripheral end and in every other valley alternately formed in both faces of the disk, in peripheral edges of both the faces of the disk, the disk cutter rolls being opposed to each other in a manner that the ridges of the disk cutters of one of the disk cutter rolls are placed in the gaps of the disk cutters of another disk cutter roll, whereby slits each configured by a cut elongating in a longitudinal direction are formed in the metal sheet, wherein the valleys of the disk cutters of one of the disk cutter rolls which are placed respectively on both sides of the metal sheet are arranged with being shifted in phase from the valleys of the disk cutters of another disk cutter roll.

According to the invention, since the valleys of the disk cutters are shifted in phase, one or more wires are pressed by the ridges to be bent in a ridge-like shape at the tip end of a drawn-out portion which is pressed by an end of the shifted valley to be drawn out in a substantially straight manner from a node. In the wires which are bent via the drawn-out portion, therefore, tensile stress produced during a developing process is dispersed, and hence the wire can be prevented from being easily corroded.

The invention provides a method of producing a grid for a battery plate in which a metal sheet is passed between two rotating disk cutter rolls in each of which a plurality of disk cutters are placed on a same shaft with forming a gap therebetween, each of the disk cutters being configured by: alternately forming ridges which protrude in a ridge-like shape toward an outer peripheral side, and valleys composed of a circumferential face or a flat face along a circumferential direction on a peripheral side face of a disk; and forming grooves which are opened in an outer peripheral end and in every other valley alternately formed in both faces of the disk, in peripheral edges of both the faces of the disk, the disk cutter rolls being opposed to each other in a manner that the ridges of the disk cutters of one of the disk cutter rolls are placed in the gaps of the disk cutters of another disk cutter roll, whereby slits each configured by a cut elongating in a longitudinal direction are formed in the metal sheet, wherein a length in a circumferential direction of the valleys of the disk cutters of the disk cutter roll which is placed on one side of the metal sheet is larger than a length of the valleys of the disk cutters of the disk cutter roll which is placed on another side of the metal sheet.

According to the invention, since the valleys of the disk cutters are different in length in the circumferential direction, one or more wires are pressed by the ridges to be bent in a ridge-like shape at the tip end of a drawn-out portion which is pressed by an end of the longer valley to be drawn out in a substantially straight manner from a node. In the wires which are bent via the drawn-out portion, therefore, tensile stress produced during a developing process is dispersed, and hence the wires can be prevented from being easily corroded.

The invention provides a method of producing a grid for a battery plate in which a metal sheet is passed between two rotating disk cutter rolls in each of which a plurality of disk cutters are placed on a same shaft with forming a gap therebetween, each of the disk cutters being configured by: alternately forming ridges which protrude in a ridge-like shape toward an outer peripheral side, and valleys composed of a circumferential face or a flat face along a circumferential direction on a peripheral side face of a disk; and forming grooves which are opened in an outer peripheral end and in every other valley alternately formed in both faces of the disk, in peripheral edges of both the faces of the disk, the disk cutter rolls being opposed to each other in a manner that the ridges of the disk cutters of one of the disk cutter rolls are placed in the gaps of the disk cutters of another disk cutter roll, whereby slits each configured by a cut elongating in a longitudinal direction are formed in the metal sheet, wherein the grooves of the disk cutters of the disk cutter roll(s) which is placed on one side or both sides of the metal sheet are opened only in a part of a whole circumferential length of the valleys.

According to the invention, since the grooves of the disk cutters are opened only in a part of the whole length of the valleys, the slits are formed also by the valleys other than the openings, and one or more wires are pressed by the ridges to be bent in a ridge-like shape at the tip end of a drawn-out portion which is drawn out in a substantially straight manner from a node. In the wires which are bent via the drawn-out portion, therefore, tensile stress produced during a developing process is dispersed, and hence the wires can be prevented from being easily corroded.

The invention provides a method of producing a grid for a battery plate in which a metal sheet is passed between two rotating disk cutter rolls in each of which a plurality of disk cutters are placed on a same shaft with forming a gap therebetween, each of the disk cutters being configured by: alternately forming ridges which protrude in a ridge-like shape toward an outer peripheral side, and valleys composed of a circumferential face or a flat face along a circumferential direction on a peripheral side face of a disk; and forming grooves which are opened in an outer peripheral end and in every other valley alternately formed in both faces of the disk, in peripheral edges of both the faces of the disk, the disk cutter rolls being opposed to each other in a manner that the ridges of the disk cutters of one of the disk cutter rolls are placed in the gaps of the disk cutters of another disk cutter roll, whereby slits each configured by a cut elongating in a longitudinal direction are formed in the metal sheet, wherein two or more of settings are made, the settings including: setting in which the valleys of the disk cutters of one of the disk cutter rolls which are placed on both sides of the metal sheet are arranged with being shifted in phase from the valleys of the disk cutters of another disk cutter roll; setting in which a length in a circumferential direction of the valleys of the disk cutters of the disk cutter roll which is placed on the one side of the metal sheet is larger than a length of the valleys of the disk cutters of the disk cutter roll which is placed on the other side of the metal sheet; and setting in which the grooves of the disk cutters of the disk cutter roll(s) which is placed on the one side or both the sides of the metal sheet are opened only in a part of a whole circumferential length of the valleys.

According to the invention, two or more kinds of the settings in which wires are pressed by protrusions to be bent in a ridge-like shape at the tip end of a drawn-out portion which is pressed by an end of the drawn-out portion that is drawn out in a substantially straight manner from a node are combinedly made. In the wires which are bent via the drawn-out portion, therefore, tensile stress produced during a developing process is dispersed, and hence the wires can be prevented from being easily corroded.

Means for Solving Problem (2)

The invention provides a method of producing a grid for a battery plate wherein slits in which a small bent portion is formed between a node and a fence-like portion are formed in a metal sheet by using disk cutters of a rotary expander in each of which a plurality of ridges an apex of which is shifted toward a front side in a rotational direction protrude with forming a gap therebetween toward an outer circumference from a disk-like circumferential face at equal angular intervals, a small slope is interposed between a valley constituting a peripheral side face between two of the ridges, and at least a front slope of a peripheral side face of a ridge which is rearward adjacent to the valley, thereby connecting peripheral side faces, the small slope having an inclination angle which is between angles of the two faces, and grooves which are formed at equal angular intervals in peripheral edges of both disk-like faces are formed in every other gap face and opened alternately in both the faces.

According to the invention, since, in the disk cutter of the rotary expander, a small slope is interposed between each of the valleys and the slope of each of the ridges, the portion between the valley and the slope of the ridge is bent in two steps via the small slope, and the bending angles are gentle. When slits are formed in a metal sheet, therefore, the rising part of the fence-like portion between slits which are pressed by ridges of the disk cutters 1 to protrude from a node in a ridge-like shape is not bent by a steep angle, and can be bent in two steps via the small slope, so that edges of meshes which are formed by developing the slits are prevented from being easily corroded by electrolyte. In the production method of the invention, particularly, at least the bending angle which is formed by the valley and the slope of the ridge that is rearward adjacent thereto, and which is to be originally steep can be made gentle. Therefore, corrosion and a crack of corrosion in a node can be effectively prevented from occurring.

The invention provides a method of producing a grid for a battery plate wherein slits in which a portion between a node and a fence-like portion is curved are formed in a metal sheet by using disk cutters of a rotary expander in each of which a plurality of ridges an apex of which is shifted toward a front side in a rotational direction protrude with forming a gap therebetween toward an outer circumference from a disk-like circumferential face at equal angular intervals, a curved face is interposed between a valley constituting a peripheral side face between two of the ridges, and at least a front slope of a peripheral side face of a ridge which is rearward adjacent to the valley, thereby connecting peripheral side faces, the curved face having a contact face of an inclination angle which is between angles of the two faces, and grooves which are formed at equal angular intervals in peripheral edges of both disk-like faces are formed in every other gap face and opened alternately in both the faces.

According to the invention, since, in the disk cutter of the rotary expander, a curved face is interposed between each of the valleys and the slope of each of the ridges, the portion between the valley and the slope of the ridge is smoothly bent via the curved face. When slits are formed in a metal sheet, therefore, the rising part of the fence-like portion between slits which are pressed by ridges of the disk cutters 1 to protrude from a node in a ridge-like shape is not angularly bent, and can be bent smoothly in, for example, a rounded manner, so that edges of meshes which are formed by developing the slits are prevented from being easily corroded by electrolyte. In the production method of the invention, particularly, at least the edge which is formed by the valley and the slope of the ridge that is rearward adjacent thereto, and which is to be originally steeply bent can be smoothed. Therefore, corrosion and a crack of corrosion in a node can be effectively prevented from occurring.

The invention provides a method of producing a grid for a battery plate wherein slits in which a node is inclined are formed in a metal sheet by using disk cutters of a rotary expander in each of which a plurality of ridges an apex of which is shifted toward a front side in a rotational direction protrude with forming a gap therebetween toward an outer circumference from a disk-like circumferential face at equal angular intervals, a valley constituting a peripheral side face between two of the ridges is formed into a face which is more inclined toward a center as being more forward than a contact face contacting with a circumferential face in which all contacting faces contacting with the valley have a same angular position at a center of a rotation shaft, and grooves which are formed at equal angular intervals in peripheral edges of both disk-like faces are formed in every other gap face and opened alternately in both the faces.

According to the invention, since the valley between the ridges of the disk cutter used in the rotary expander is inclined toward the center as being more forward in the rotational direction, the bending angle formed by the valley and the steep slope of the ridge that is rearward adjacent thereto is made gentle, and that formed by the valley and the gentle slope of the ridge that is forward adjacent thereto is made steep. Consequently, the difference between the angles formed by the valley between the ridges and the slopes of the ridges that are respectively adjacent thereto on both the sides can be reduced. When slits are formed in a metal sheet, therefore, a node is inclined, and a phenomenon that only the rear side of the fence-like portion between slits is bent by a steep angle does not occur. As a result, the bending angles of the rear and front sides are averaged, whereby the edges can be prevented from being easily corroded by electrolyte. When the valley is configured by using a face which is formed by inclining a circumferential face, the angle formed by contact faces of the circumferential face can be always made constant. Alternatively, the valley may be configured by an inclined flat face or another curved face.

The invention provides a method of producing a grid for a battery plate in which a plate is produced by a rotary expander for forming slits in a metal sheet by using disk cutters in each of which a plurality of ridges an apex of which is shifted toward a front side in a rotational direction protrude with forming a gap therebetween toward an outer circumference from a disk-like circumferential face at equal angular intervals, and grooves which are formed at equal angular intervals in peripheral edges of both disk-like faces are formed in every other valley constituting a peripheral side face between the ridges, and opened alternately in both the faces, wherein each of the valleys of the disk cutter is formed into a face which is more inclined toward a center as being more forward than a contact face contacting with a circumferential face in which all contacting faces contacting with the valley have a same angular position at a center of a rotation shaft of the disk cutter.

According to the invention, since the valley between the ridges of the disk cutter is inclined toward the center as being more forward in the rotational direction, the bending angle formed by the valley and the steep slope of the ridge that is rearward adjacent thereto is made gentle, and that formed by the valley and the gentle slope of the ridge that is forward adjacent thereto is made steep. Consequently, the difference between the angles formed by the valley between the ridges and the slopes of the ridges that are respectively adjacent thereto on both the sides can be reduced. Therefore, a phenomenon that only the rear side of the fence-like portion between slits of the metal sheet is bent by a steep angle does not occur. As a result, the bending angles of the rear and front sides are averaged, whereby the edges can be prevented from being easily corroded by electrolyte. When the valley is configured by using a face which is formed by inclining a circumferential face, the angle formed by contact faces of the circumferential face can be always made constant. Alternatively, the valley may be configured by an inclined flat face or another curved face.

The invention is characterized in that the valley is formed into a face which is more inclined by 1° or more toward the center as being more forward than the contact face contacting with the circumferential face in which all contacting faces contacting with the valley have a same angular position at the center of the rotation shaft of the disk cutter.

According to the invention, since the valley between the ridges of the disk cutter has an inclination of 1° or more, the bending angle formed by the valley and the steep slope of the ridge that is rearward adjacent thereto can be surely made gentle.

The invention is characterized in that only a face of the valley excluding a front end portion is formed into a face which is more inclined toward the center as being more forward than the contact face contacting with the circumferential face in which all contacting faces contacting with the valley have a same angular position at the center of the rotation shaft of the disk cutter.

The valley between the ridges of the disk cutter may be configured by, for example, an inclined flat face in place of a face which is formed by inclining a circumferential face. When such a flat face has a small inclination angle, there is a case where, in the vicinity of a portion where the flat face is adjacent to the front ridge, the contact face of the circumferential face is more inclined toward the center as being more forward. In some cases, the portion where the valley is adjacent to the front ridge may be rounded, or a small slope having an intermediate inclination angle may be interposed between the valley and the front ridge. A contact face of the rounded face or the small slope may be inclined more outward than a contact face of a circumferential face at the same angular position. According to the invention, however, the contact face of the valley between the ridges of the disk cutter excluding such a front end portion is more inclined toward the center as being more forward. Therefore, at least the bending angle formed by the valley and the steep slope of the ridge that is rearward adjacent thereto can be surely made gentle. In some cases, also the portion where the valley is adjacent to the rear ridge may be rounded, or a small slope having an intermediate inclination angle may be interposed between the valley and the rear ridge. A contact face of the rounded face or the small slope is always more inclined toward the center than a contact face of a circumferential face at the same angular position.

The invention is characterized in that the circumferential face serving as a reference of inclination of the valley is a flat face connecting together cross lines between the circumferential face and the slopes of the ridges on both the sides.

A conventional valley is sometimes configured by a flat face in place of a face extending along a circumferential face. In such a flat face, the rear half is a face which is slightly inclined toward the center in a larger degree as being more forward than a contact face contacting with a circumferential face at the same angular position, but the front half is a face which is slightly inclined toward the center in a larger degree as being more rearward than a contact face contacting with a circumferential face at the same angular position. However, this can make gentle the angle formed by the valley and the slope of the ridge, only by a small degree, and there is little difference between the case where the valley is configured by a flat face, and that where the valley is configured by a face extending along a circumferential face. By contrast, according to the invention, the valley between the ridges is more inclined than the flat face, and hence at least the bending angle formed by the valley and the steep slope of the ridge that is rearward adjacent thereto can be surely made gentle.

Means for Solving Problem (3)

The invention provides a method of producing a grid for a battery plate in which a rotary expander is used for forming a large number of zigzag slits in a metal sheet by passing the metal sheet between two or more opposed disk cutter rolls, each of the disk cutter rolls being configured by placing a plurality of disk cutters on a same shaft with forming a gap therebetween, each of the disk cutters being configured by: alternately forming ridges in which a peripheral side face protrudes in a ridge-like shape toward an outer periphery from a reference circumferential face of a predetermined radius, and valleys in which a peripheral side face composed of a face substantially extending along the reference circumferential face is formed, in a whole periphery of a peripheral edge of a disk, the reference circumferential face being centered at an axis of the disk; and, for each of the valleys, forming a groove which is opened in a peripheral side face of the valley, in a peripheral edge portion of one of disk faces in which valleys that are adjacent to each other via a ridge are formed in an oppositely reverse manner, wherein, in each of the disk cutters, an inclined face is formed in peripheral side faces which extend from apexes of ridges formed on both sides of each of the valleys to the valley, the inclined face more approaching the axis as being nearer to the disk face in which the groove of the valley is formed.

According to the invention, since the inclined face is formed in the peripheral side face of the ridge of the disk cutters, thin wires which are configured between adjacent slits are formed in a ridge-like shape in a state where the wires are pretwisted along the inclined face when slits are formed in a metal sheet by pressing of the ridge. Furthermore, the wires are inclined toward the groove. During the developing process, therefore, the node is pulled by the wires to be set to a direction which is opposite to the twisting direction. As a result, concentration of torsion stress in the vicinity of the apexes of the wires during the developing process can be reduced.

The inclined face which more approaches the axis as being nearer to the disk face means that a contact face of the inclined face is inclined so as to more approach the axis of the disk cutter as being nearer to the disk face, or means that the inclined face may have a part where a contact face is parallel to the axis but is not allowed to have a part where a contact face is inclined toward the outer peripheral side.

Preferably, the inclined face is formed from a position of a peripheral side face of a ridge, to a valley, the position being higher than the valley by one third or more of a height in a radial direction of the disk cutter extending from the valley to an apex of the ridge. Conventionally, torsion stress is concentrated on the vicinity of an apex of a wire. Therefore, it is preferable to form the inclined face of a ridge of a disk cutter so as to extend as far as possible to the vicinity of the apex.

When the inclined face is formed so as to extend from a level which is higher by one third or more of the ridge to the valley, therefore, the twisting which is previously formed in the wire can surely exert an effect.

Preferably, the inclination angle of the inclined face is equal to or smaller than 40° with respect to the reference circumferential face. When the inclination angle of the inclined face is 40°, the angle of an edge between the inclined face and the disk face can be set to 60° or more, and hence the metal sheet can be surely cut.

The grid for a battery plate of the invention is characterized in that the grid is produced by the production method for solving problem (3).

According to the invention, since concentration of torsion stress in the vicinity of the apexes of the wires during developing process can be reduced, a grid for a battery plate in which rupture or breakage hardly occurs is obtained.

Means for Solving Problem (4)

The invention provides a method of producing a grid for a battery plate in which a plurality of parallel slits are cut in a metal sheet into a zigzag pattern along an advancing direction of the metal sheet, wires which are formed by slits that are adjacent in a width direction of the metal sheet are elastically deformed in a ridge-like shape in both front and ewe directions from a face of the metal sheet, flat regions which are formed by non-slit portions are formed to become nodes of the wires, and the metal sheet is developed in the width direction, thereby forming meshes, wherein the slits which are cut into a zigzag pattern are formed by passing the metal sheet through a roll pair in which rolls are opposed to each other, each of the rolls is configured by stacking disk cutters each having ridges and valleys, the ridges protruding at regular intervals from a circumference of the disk cutter, and, in the disk cutter, grooves are disposed in a thickness direction in each of the valleys between the ridges and alternately in both disk faces corresponding to the nodes, and chamfered portions are disposed in an outer peripheral portion of a peripheral side face of the disk cutter, the outer peripheral portion excluding at least the ridges, the chamfered portions being lowered as being respectively nearer to the faces in which the grooves are disposed.

The invention is characterized in that the chamfered portions between the peripheral side face of the disk cutter and the disk faces of the disk cutter in which the grooves are formed are planer or curved chamfered portions.

The invention provides a battery comprising a grid for a battery plate which is produced by the method for solving problem (4).

Means for Solving Problem (5)

The invention provides a method of producing a grid for a battery plate in which a rotary expander is used for forming a large number of zigzag slits in a metal sheet by passing the metal sheet between two or more opposed disk cutter rolls, each of the disk cutter rolls being configured by placing a plurality of disk cutters on a same shaft with forming a gap therebetween, each of the disk cutters being configured by: alternately forming ridges in which a peripheral side face protrudes in a ridge-like shape toward an outer periphery from a reference circumferential face of a predetermined radius, and valleys in which a peripheral side face composed of a face substantially extending along the reference circumferential face is formed, in a whole periphery of a peripheral edge of a disk, the reference circumferential face being centered at a rotation axis of the disk; and, for each of the valleys, forming a groove which is opened in a peripheral side face of the valley, in a peripheral edge portion of one of disk faces in which valleys that are adjacent to each other via a ridge are formed in an oppositely reverse manner, wherein, among the disk cutter rolls, a disk cutter roll which is opposed to a disk cutter roll having a disk cutter that is disposed outermost is provided with a disk-like endmost disk cutter that is placed more outward than the outermost disk cutter, and a peripheral side face which is recessed toward a center with respect to the reference circumferential face is formed in a valley (hereinafter, referred to as "endmost node forming valley") which corresponds to a valley in a disk cutter of another disk cutter roll that is opposed via the metal sheet, among valleys of the endmost disk cutter (in the endmost disk cutter, peripheral edge portions respectively corresponding to valleys of another disk cutter of a same disk cutter roll are referred to as "valleys"), a groove being formed in a disk face in the groove of the disk cutter of the other disk cutter roll, the disk face directed to the endmost disk cutter.

In a usual node, deformation of a degree which is larger than the thickness of a metal sheet is produced because peripheral side faces of valleys of both disk cutters of disk cutter rolls which are opposed via the metal sheet press the metal sheet from both the sides while exceeding the cutting plane that is in the center between the axes of the disk cutter rolls. By contrast, according to the invention, the peripheral side faces of the endmost node forming valleys of the endmost disk cutter are recessed with respect to the reference circumferential face. Even when peripheral side faces of valleys of disk cutters of disk cutter rolls which are opposed via a metal sheet press an end portion of the endmost node while exceeding the cutting plane, therefore, the peripheral side faces of the endmost node forming valleys of the endmost disk cutter press the basal portion of the endmost node with advancing in front of the cutting plane at the most. Consequently, deformation of the endmost node is reduced, so that wires drawn out from the node can be surely prevented from being easily broken.

Preferably, the peripheral side face of the endmost node forming valley is recessed toward the center with respect to a circumferential face of a predetermined radius by a degree which is not smaller than 30% and not larger than 70% of a thickness of the metal sheet. When the peripheral side face of the endmost node forming valley is recessed by 20% of the sheet thickness, for example, deformation of the endmost node exceeds 80% of the sheet thickness, and is not largely different from that of the prior art. When the peripheral side face of the endmost node forming valley is recessed by 80% of the sheet thickness, deformation of the endmost node can be restricted to a degree which slightly exceeds about 20% of the sheet thickness. In the valleys of the endmost disk cutter other than the endmost node forming valleys, slits are formed by pressing a metal sheet while exceeding the cutting plane between the disk cutter rolls, and, with respect to also the ridges (in the case of the endmost disk cutter, peripheral edge portions respectively corresponding to ridges of another disk cutter of the same disk cutter roll are referred to as "ridges"), pressing is usually conducted in a similar manner. Therefore, a step corresponding to about 80% of the sheet thickness is produced between these portions and the endmost node forming valleys. By contrast, when the recess of the peripheral side face of each of the endmost node forming valleys is set to about 50% of the sheet thickness, deformation of the endmost node and the step between the node and the surrounding metal sheet can have an optimum size of about 50% of the sheet thickness. Consequently, it is preferable to form a recess which is not smaller than 30% and not larger than 70% of the sheet thickness.

In the valleys of the endmost disk cutter, it is not always necessary to form a groove. In the valleys of the endmost disk cutter other than the endmost node forming valleys, the grooves are formed in the disk face of the endmost disk cutter which is outward directed. Therefore, it is entirely unnecessary to form such valleys, except the case where parts are shared by the endmost disk cutter and that which is placed in the opposite outer end. By contrast, the grooves of the endmost node forming valleys of the endmost disk cutter are formed in the disk face of the endmost disk cutter which is inward directed, and a space for forming endmost nodes is required between the grooves, and those of valleys of a disk cutter which is opposed to the endmost disk cutter via the metal sheet. In a usual case, therefore, it is preferable to dispose grooves of the endmost node forming valleys. In the invention, the peripheral side faces of the endmost node forming valleys are recessed. When the recesses are formed to be sufficiently large, therefore, an enough space can be ensured between the valleys and the grooves of the valleys of the opposed disk cutter, and hence forcible deformation is not produced in the endmost nodes, with the result that formation of grooves is not always necessary.

Preferably, an inclined face which more approaches a center as being nearer to an outer side is formed in each of peripheral side faces of the valleys and/or the ridges of the endmost disk cutter other than the endmost node forming valleys. In the valleys of the endmost disk cutter other than the endmost node forming valleys, slits are formed by pressing the metal sheet while exceeding the cutting plane between the disk cutter rolls. Also in the ridges, usually, pressing is conducted in a similar manner. Therefore, a step is produced between these portions and the endmost node forming valleys in which the peripheral side face is recessed, so that step-like undulation may be formed in the frame portion of the metal sheet. When each of the peripheral side faces of the valleys and the ridges other than the endmost node forming valleys is formed as an inclined face, the frame portion of the metal sheet can be gently bent.

In each of the ridges of the endmost disk cutter, preferably, a peripheral side face of the reference circumferential face or a peripheral side face which is nearer to the center than the reference circumferential face is formed. When the peripheral side faces of the ridges of the endmost disk cutter protrude in a ridge-like shape in the same manner as those of a usual disk cutter, the edge of the frame portion of the metal sheet is unnecessarily vertically pressed to cause deformation, because no slits are formed outside the ridges. Since the ridge-like protruding peripheral side face of each of the ridges of a usual disk cutter presses the metal sheet while greatly exceeding the cutting plane between the disk cutter rolls, the metal sheet can be cut in many cases, even when the peripheral side face of each of the valleys of the endmost disk cutter which is opposed to the usual disk cutter does not exceed the cutting plane. Therefore, the peripheral side face of each of the valleys of the endmost disk cutter can be formed in the reference circumferential face. When a peripheral side face which is nearer to the center at a degree similar to the peripheral side faces of the endmost node forming valleys is formed, for example, the frame portion of the metal sheet can be prevented from largely undulating.

The method of producing a grid for a battery plate according to the invention is characterized in that an inclined face is formed in the peripheral side face of the endmost node forming valley, the inclined face being nearer to the center as being more inward.

In the case where a groove is not formed in the endmost node forming valley, when the peripheral side face is recessed by a small degree from the reference circumferential face, the endmost node is deformed only by means of the space in the recess of the valley of the disk cutter which is opposed via the metal sheet, and hence there is the possibility that, when the amount of deformation is large, the endmost node is deformed in an extremely abrupt manner. According to the invention, an inclined face is formed in the peripheral side face of the endmost node forming valley, and hence the endmost node can be gently deformed along the inclined face. Even in the case where a groove is formed in the endmost node forming valley, the deformation of the endmost node can be made more gentle by the formation of an inclined face in the peripheral side face.

The grid for a battery plate of the invention is characterized in that the grid is produced by the production method for solving problem (5).

According to the invention, a grid for a battery plate in which wires drawn out from the endmost nodes are hardly broken is obtained.

BRIEF DESCRIPTION OF THE DRAWINGS

FIG. 39 is a partial enlarged side longitudinal section view showing a prior art example, and showing an arrangement of disk cutters in a rotary expander;

DETAILED DESCRIPTION OF THE PREFERRED EMBODIMENTS

Hereinafter, embodiments of the invention will be described with reference to the accompanying drawings.

Embodiment (1) of the invention

Figure 1:
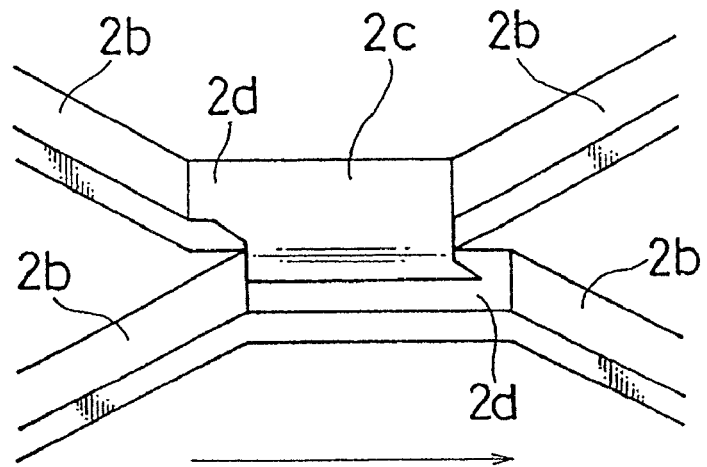
FIG. 1 is a partial enlarged perspective view showing a first example of a first embodiment of the invention, and showing the vicinity of a node of a grid in an enlarged manner.
Figure 2:
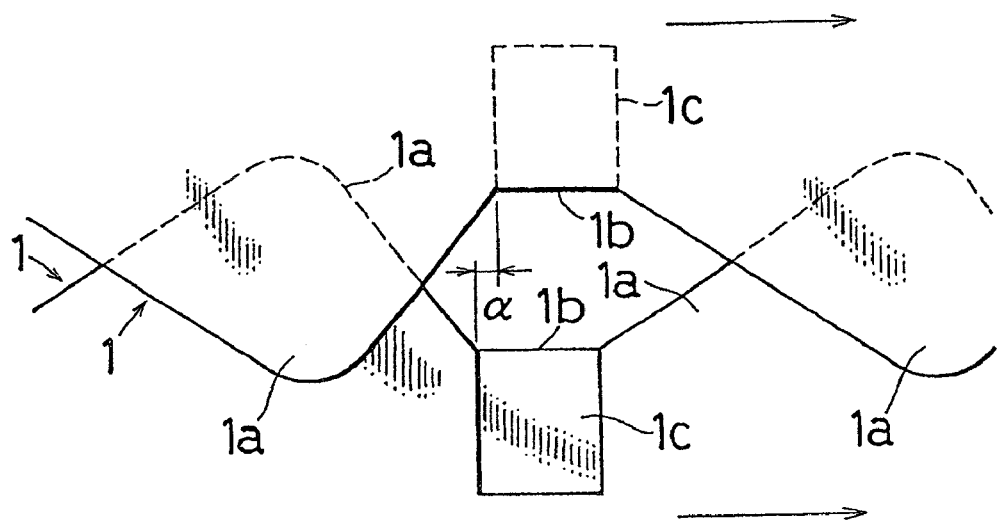
FIG. 2 is a partial enlarged schematic view showing the first example of the first embodiment of the invention, and schematically showing in an enlarged manner a portion where disk cutters which are vertically placed overlap with each other.

FIGS. 1 and 2 show a first example of a first embodiment of the invention. FIG. 1 is a partial enlarged perspective view showing the vicinity of a node of a grid in an enlarged manner, and FIG. 2 is a partial enlarged schematic view schematically showing in an enlarged manner a portion where disk cutters which are vertically placed overlap with each other. The components having the same functions as those of the prior art example shown in FIGS. 37 to 50 are denoted by the identical reference numerals.

In the same manner as the prior art example, in the embodiment, a grid which is to be used in a battery plate of a lead storage battery will be described, and also a method of producing the grid for a battery plate from the metal sheet 2 by a rotary expander will be described.

The embodiment is a case where, as shown in FIG. 2, the disk cutters 1, 1 which are vertically opposed to each other are changed in phase. A plurality of the upper and lower disk cutters 1, 1 are combined so as to be used as disk cutter rolls, respectively. In the disk cutters 1, 1, lengths in the circumferential direction of the valleys 1b and the ridges 1a are equal to each other. Conventionally, such disk cutters 1, 1 are placed and rotated while their phases coincide with each other so that the valleys 1b, 1b vertically overlap with each other without being mutually shifted. By contrast, in the embodiment, the phase of the disk cutter 1 which is placed in the upper side leads by a phase angle α. In the embodiment, namely, the upper disk cutter 1 is placed with being slightly shifted toward the front side in the rotational direction (indicated by the arrow in FIG. 2). In order to facilitate the understanding of the phase shifting, the upper and lower disk cutters 1, 1 in FIG. 2 are shown with being vertically separated from each other. In practice, the disk cutters are placed so closely that the valleys 1b slightly overlap with each other. In FIG. 2, the circumferential faces of the disk cutters 1, 1 are shown with being developed to a horizontal plane.

When the metal sheet 2 is passed between the upper and lower disk cutters 1, 1 in the prior art which are not shifted in phase, the slits 2a are formed by the overlapping portions between the upper and lower ridges 1a, 1a, and those between the upper and lower valleys 1b, 1b where the grooves 1c, 1c are opened with facing in opposite directions, and the nodes 2c are formed by the overlapping portions between the upper and lower valleys 1b where the grooves 1c are opened with facing each other. The length of each node 2c in the longitudinal direction (the advancing direction indicated by the arrow in FIG. 2) is equal to the length in the circumferential direction of each valley 1b, i.e., the width of each groove 1c.

By contrast, when the metal sheet 2 is passed between the disk cutters 1, 1 in the embodiment, the nodes 2c are formed only by the portions where the upper and lower grooves 1c, 1c overlap with each other, because the openings of the grooves are shifted from each other, with the result that the length of the nodes 2 in the longitudinal direction is shorter than the length of the valleys 1b and the width of the grooves 1c. As shown in FIG. 1, in the rear side of each node 2c in the longitudinal direction of the metal sheet 2, the wire 2b (the left front one in the figure) which is downward pressed by the ridge 1a of the upper disk cutter 1 that leads in phase is downward bent with starting immediately from the basal end of the node 2c, and the wire 2b (the left rear one in the figure) which is upward pressed by the ridge 1a of the lower disk cutter 1 that lags in phase is upward bent at the tip end of a drawn-out portion 2d which is rearward drawn out from the node 2c in the longitudinal direction of the metal sheet 2. In the front side of the node 2c in the longitudinal direction of the metal sheet 2, the wire 2b (the right rear one in the figure) which is upward pressed by the ridge 1a of the lower disk cutter 1 that lags in phase is upward bent with starting immediately from the basal end of the node 2c, and the wire 2b (the right front one in the figure) which is downward pressed by the ridge 1a of the upper disk cutter 1 that leads in phase is downward bent at the tip end of a drawn-out portion 2d which is forward drawn out from the node 2c in the longitudinal direction of the metal sheet 2. The drawn-out portions 2d are portions which fail to be completely formed as the node 2c, because they are caused to remain flat by the valley 1b of one of the disk cutters 1 in the same manner as the node 2c, but the metal sheet 2 is pressed to be cut by the ridge 1a of the other disk cutter 1 where no groove 1c exists.

As a result, in the grid of the embodiment, among the four wires 2b connected to the node 2c, the two diagonal wires 2b (the left front and right rear ones in the figure) are bent with starting immediately from the basal end of the node 2c and diagonally elongate in the same manner as in the prior art example, but the remaining two wires 2b (the left rear and right front ones in the figure) are bent at the tip ends of the drawn-out portions 2d which are once drawn out from the basal end of the node 2c in the longitudinal direction of the metal sheet 2, and then diagonally elongate. When the grid is stretched in the width direction of the metal sheet 2 to be developed, therefore, the tensile stress applied to the two wires 2b which are drawn out and bent from the node 2c via the drawn-out portions 2d is dispersed to the whole drawn-out portions 2d, so that, even after the developing process, the drawn-out portions 2d can maintain the state where the portions are drawn out in a substantially longitudinal direction.

FIG. 1 shows the grid after development. In practice, also in the grid which is immediately after the formation of the slits 2a by the disk cutters 1, 1, the drawing out angles of the wires are made gentle, and there is no difference in the drawn-out portions 2d before and after development. With respect to the two wires 2b in which no drawn-out portion 2d is disposed, therefore, the tensile stress during the developing process is concentrated in the basal end of the node 2c, and hence there is the possibility that large distortion or rupture occurs. In the same manner as the prior art example, consequently, the wires are easily corroded by electrolyte during use of the storage battery. By contrast, in the two wires 2b in which the drawn-out portion 2d is disposed, large distortion or rupture does not occur, so that corrosion due to electrolyte hardly occurs. As a result, the possibility that a crack of such corrosion occurs in the wires 2b can be reduced.

The embodiment can be implemented simply by using as they are the disk cutters 1 which are shown in the prior art example, and shifting the phases of the upper and lower disk cutters when the disk cutter rolls are to be disposed.

Figure 3:
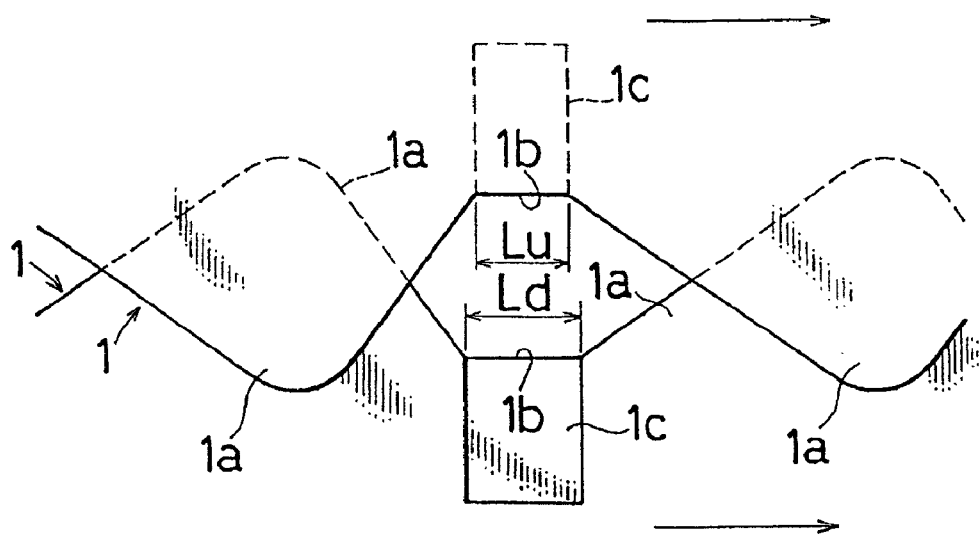
FIG. 3 is a partial enlarged schematic view showing a second example of the first embodiment of the invention, and schematically showing in an enlarged manner a portion where disk cutters which are vertically placed overlap with each other.
Figure 4:
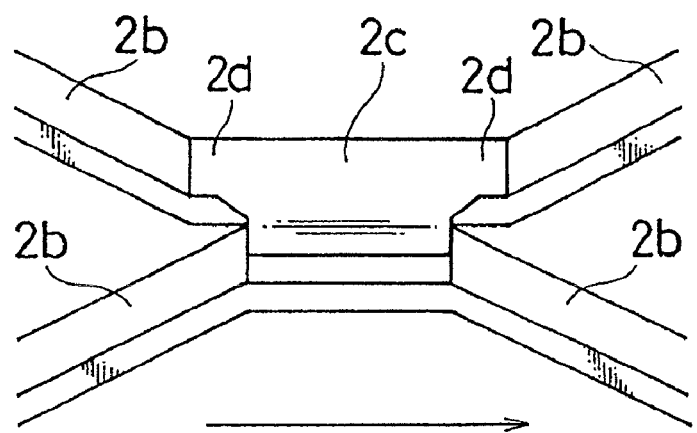
FIG. 4 is a partial enlarged perspective view showing the second example of the first embodiment of the invention, and showing in an enlarged manner the vicinity of a node of a grid.

FIGS. 3 and 4 show a second example of the first embodiment of the invention. FIG. 3 is a partial enlarged schematic view schematically showing a portion where disk cutters which are vertically placed overlap with each other, and FIG. 4 is a partial enlarged perspective view showing the vicinity of a node of a grid in an enlarged manner.

Figure 5:
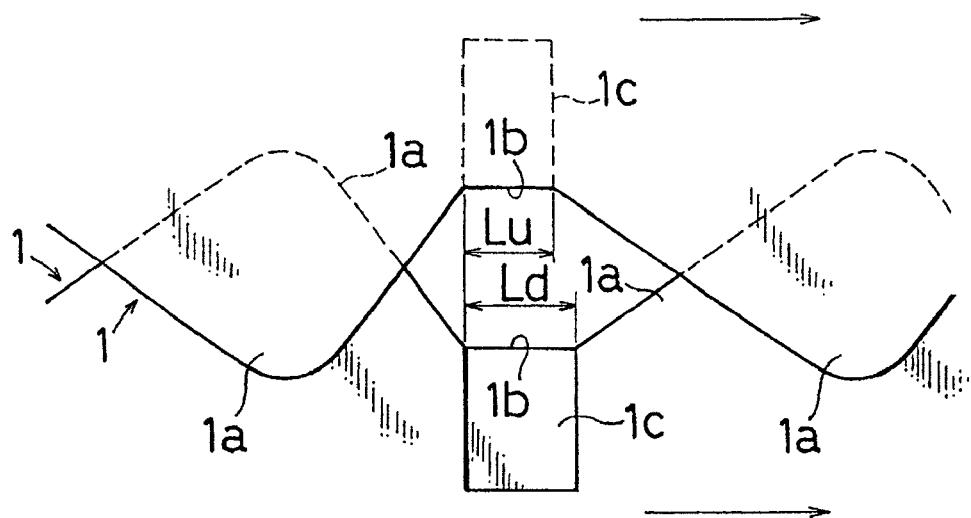
FIG. 5 is a partial enlarged schematic view showing a third example of the first embodiment of the invention, and schematically showing in an enlarged manner a portion where upper and lower phase-shifted disk cutters overlap with each other.
Figure 6:
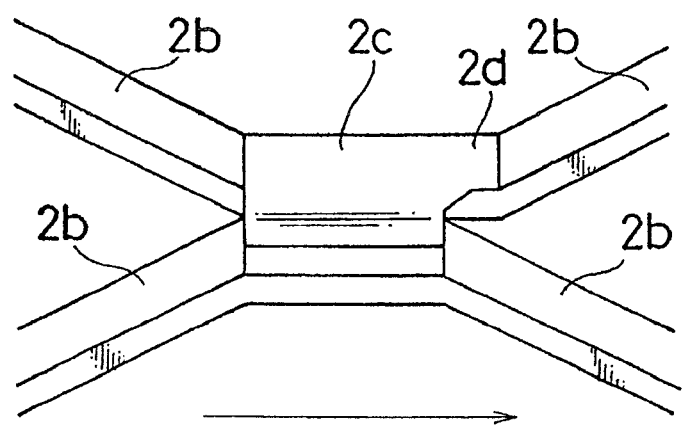
FIG. 6 is a partial enlarged perspective view showing the third example of the first embodiment of the invention, and showing in an enlarged manner the vicinity of a node of a grid which is produced by the phase-shifted disk cutters.

FIGS. 5 and 6 show a third example of the first embodiment of the invention. FIG. 5 is a partial enlarged schematic view schematically showing in an enlarged manner a portion where upper and lower phase-shifted disk cutters overlap with each other, and FIG. 6 is a partial enlarged perspective view showing in an enlarged manner the vicinity of a node of a grid which is produced by the phase-shifted disk cutters. The components having the same functions as those of the first embodiment shown in FIGS. 1 and 2 are denoted by the identical reference numerals. In the same manner as FIG. 2, FIGS. 3 and 5 show the upper and lower disk cutters with being vertically separated from each other, and the circumferential faces are shown with being developed to a horizontal plane. In the same manner as FIG. 1, actually, FIGS. 4 and 6 show a grid which has been developed.

In the same manner as the first example, also in the second and third examples of the embodiment, a grid for a plate of a storage battery will be described, and also a method of producing the grid from the metal sheet 2 by the upper and lower disk cutters 1, 1 of the rotary expander will be described. In the embodiment, as shown in FIG. 3, the lengths of the valleys 1b of the disk cutters 1, 1 which are vertically opposed to each other are different. In the embodiment, namely, the length Ld in the circumferential direction of the valley 1b of the disk cutter 1 which is placed in the lower side is longer than the length Lu of the valley 1b of the disk cutter 1 which is placed in the upper side. In accordance with the above, the width of the groove 1c by which the groove is opened in each of the valleys 1b of the lower disk cutter 1 is longer. In the lower disk cutter 1, the pitch of the valleys 1b along the circumference is made equal to that of the upper disk cutter 1, by reducing the length of the ridges 1a in the circumferential direction. Moreover, the phases of the upper and lower disk cutters 1 coincide with each other, so that each of the valleys 1b of the upper disk cutter 1 overlaps just with the center of the whole length of the corresponding valley 1b of the lower disk cutter 1.

When the metal sheet 2 is passed between the upper and lower disk cutters 1, 1, only the nodes 2c the length of which is equal to the shorter width of the grooves 1c of the upper disk cutter 1 are formed in the grid, because the widths of the upper and lower grooves 1c, 1c are different from each other. As shown in FIG. 4, in one side of each node 2c in the width direction of the metal sheet 2, two wires (the front ones in the figure) which are downward pressed by the ridge 1a of the upper disk cutter 1 having the shorter valleys 1b are downward bent with starting immediately from the basal end of the node 2c, and by contrast two wires (the rear ones in the figure) which are upward pressed by the ridge 1a of the lower disk cutter 1 having the longer valleys 1b are upward bent at the tip ends of the drawn-out portions 2d which are frontward and backward drawn out from the node 2c in the longitudinal direction of the metal sheet 2.

When the grid is stretched in the width direction of the metal sheet 2 to be developed, the tensile stress applied to the two wires 2b which are drawn out and bent from the node 2c via the drawn-out portions 2d is dispersed to the whole drawn-out portions 2d, so that, even after the developing process, the drawn-out portions 2d can maintain the state where the portions are drawn out in a substantially longitudinal direction. In the two wires 2b which are bent at the tip ends of the drawn-out portions 2d, therefore, large distortion or rupture does not occur during the developing process, so that corrosion due to electrolyte hardly occurs. As a result, the possibility that a crack of corrosion occurs in the wires 2b during use of the storage battery can be reduced.

In the second example, the case where the phases of the upper and lower disk cutters 1, 1 coincide with each other has been described. Alternatively, the phases may be shifted from each other. As shown in FIG. 5, for example, the lower disk cutter 1 may lead in phase so that the rear ends of the grooves 1c, 1c vertically coincide with each other. As a result, as shown in FIG. 6, the wire 2b (the right rear front one in the figure) which is upward pressed by the ridge 1a of the lower disk cutter 1 having the longer valleys 1b is upward bent at the tip end of the drawn-out portion 2d which is forward drawn out from the node 2c in the longitudinal direction. The tensile stress applied to the wire 2b during the developing process is dispersed to the whole drawn-out portion 2d, whereby, although for one bar for each of the nodes 2c, the possibility that a crack of corrosion due to electrolyte occurs in the wire 2b during use of the storage battery can be reduced.

Figure 7:
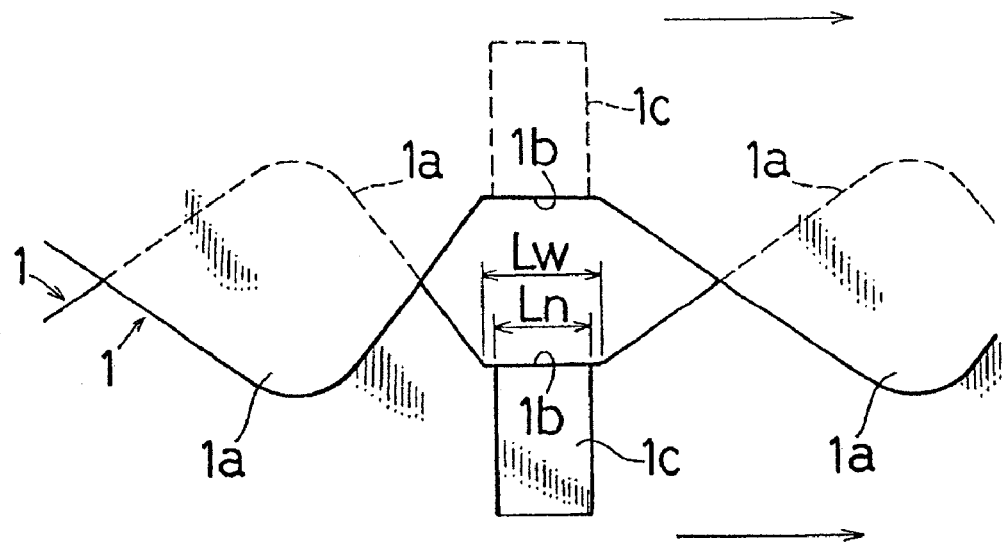
FIG. 7 is a partial enlarged schematic view showing a fourth example of the first embodiment of the invention, and schematically showing in an enlarged manner a portion where disk cutters which are vertically placed overlap with each other.
Figure 8:
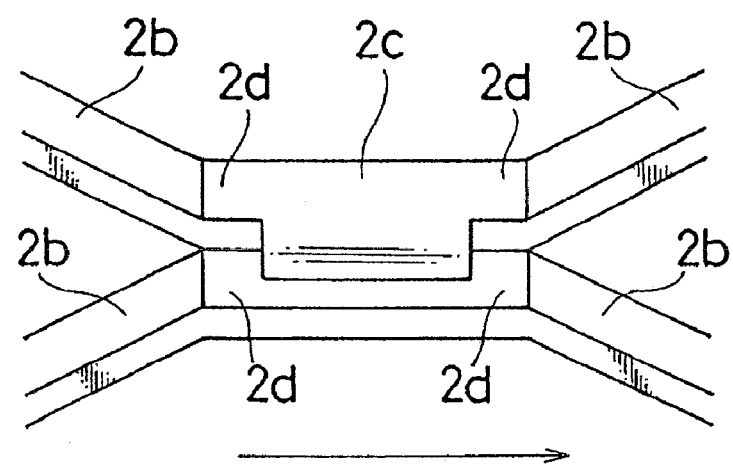
FIG. 8 is a partial enlarged perspective view showing the fourth example of the first embodiment of the invention, and showing in an enlarged manner the vicinity of a node of a grid.
Figure 9:
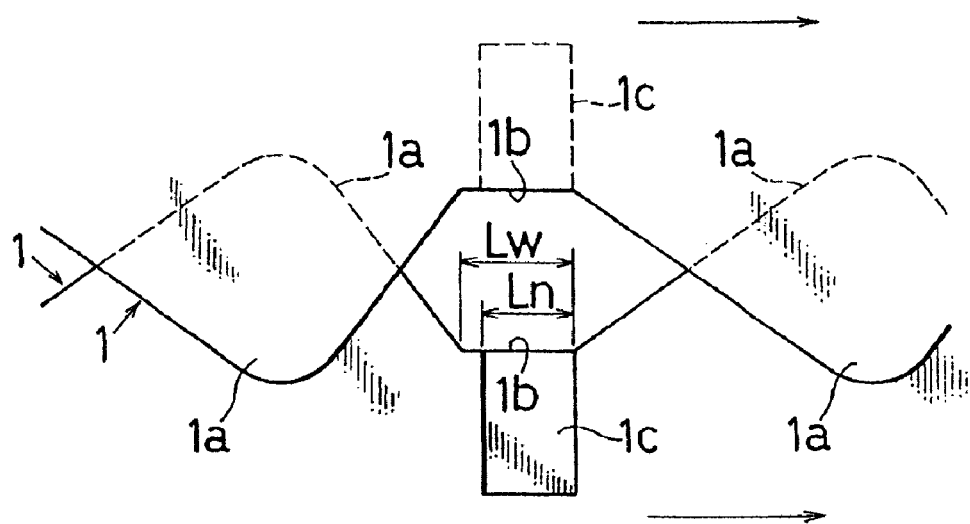
FIG. 9 is a partial enlarged schematic view showing a fifth example of the first embodiment of the invention, and schematically showing in an enlarged manner a portion where disk cutters which are vertically placed with shifting grooves to one side overlap with each other.
Figure 10:
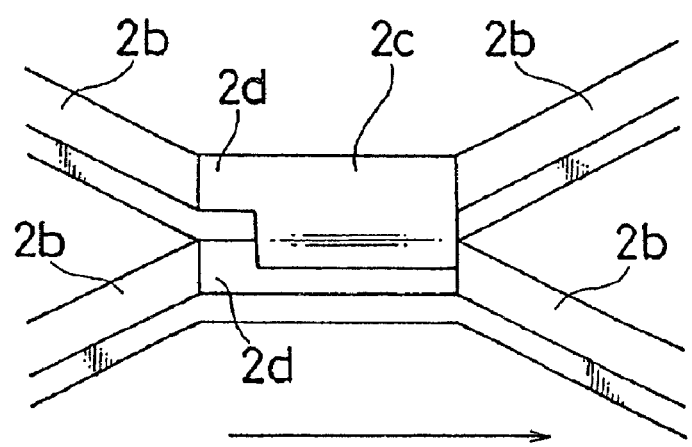
FIG. 10 is a partial enlarged perspective view showing the fifth example of the first embodiment of the invention, and showing in an enlarged manner the vicinity of a node of a grid which is produced by the disk cutters having grooves shifted to one side.

FIGS. 7 and 8 show a fourth example of the first embodiment of the invention. FIG. 7 is a partial enlarged schematic view schematically showing in an enlarged manner a portion where disk cutters which are vertically placed overlap with each other, and FIG. 8 is a partial enlarged perspective view showing in an enlarged manner the vicinity of a node of a grid. FIGS. 9 and 10 show a fifth example of the first embodiment of the invention. FIG. 9 is a partial enlarged schematic view schematically showing in an enlarged manner a portion where disk cutters which are vertically placed with shifting grooves to one side overlap with each other, and FIG. 10 is a partial enlarged perspective view showing in an enlarged manner the vicinity of a node of a grid which is produced by the disk cutters having grooves shifted to one side.

Figure 11:
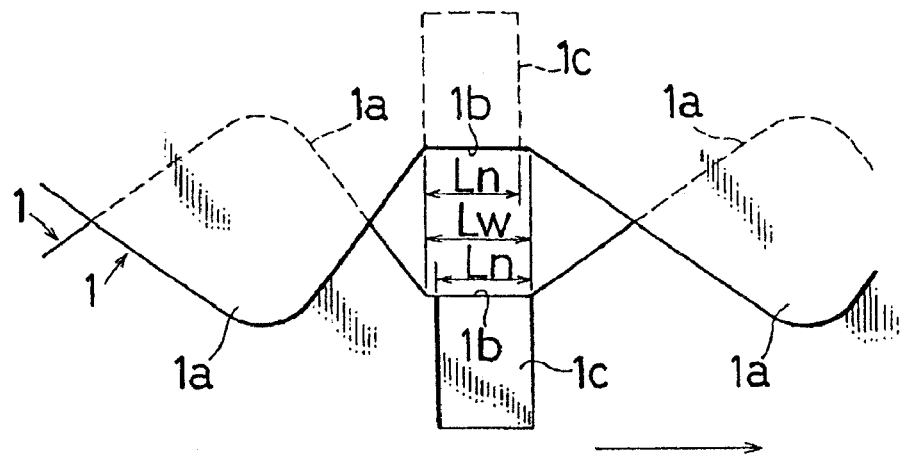
FIG. 11 is a partial enlarged schematic view showing a sixth example of the first embodiment of the invention, and schematically showing in an enlarged manner a portion where disk cutters which are vertically placed with shifting grooves in opposite directions overlap with each other.
Figure 12:
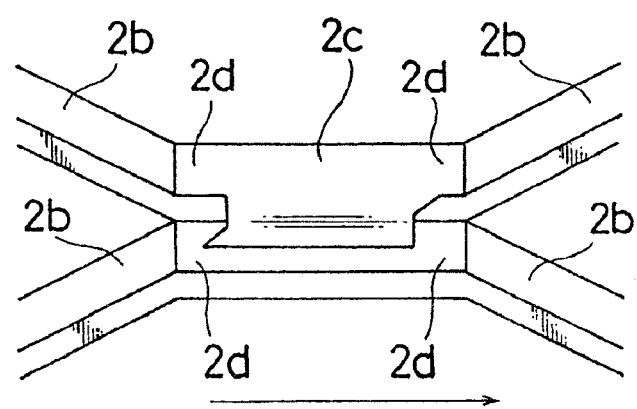
FIG. 12 is a partial enlarged perspective view showing the sixth example of the first embodiment of the invention, and showing in an enlarged manner the vicinity of a node of a grid which is produced by the disk cutters having grooves shifted in opposite directions.

FIGS. 11 and 12 show a sixth example of the first embodiment of the invention. FIG. 11 is a partial enlarged schematic view schematically showing in an enlarged manner a portion where disk cutters which are vertically placed with shifting grooves in opposite directions overlap with each other, and FIG. 12 is a partial enlarged perspective view showing in an enlarged manner the vicinity of a node of a grid which is produced by the disk cutters having grooves shifted in opposite directions.

Figure 13:
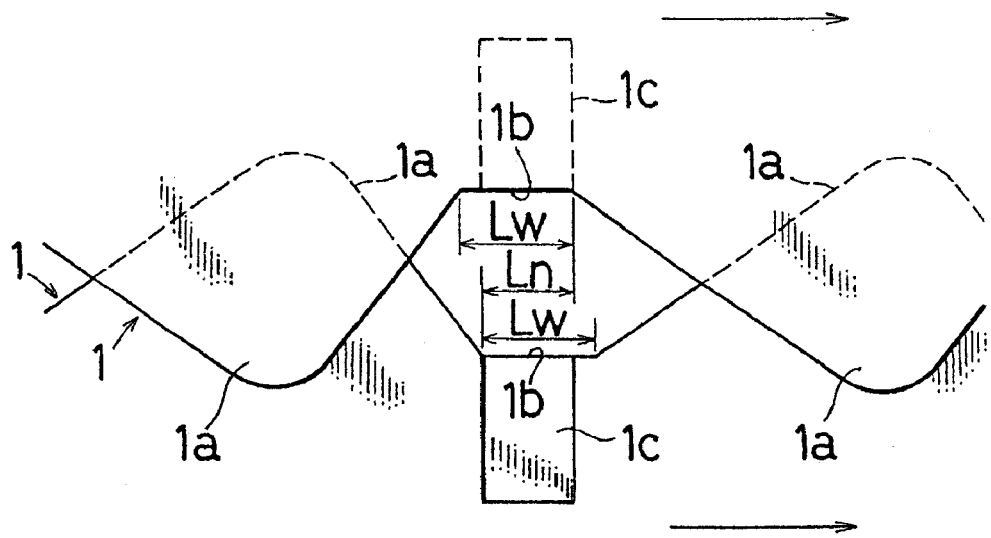
FIG. 13 is a partial enlarged schematic view showing a seventh example of the first embodiment of the invention, and schematically showing in an enlarged manner a portion where upper and lower phase-shifted disk cutters overlap with each other.
Figure 14:
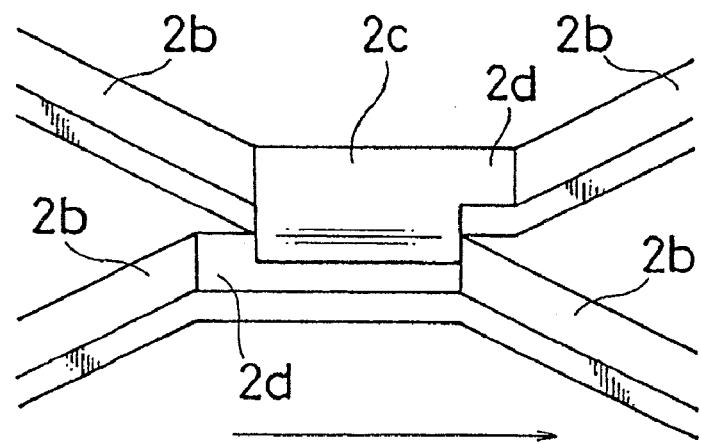
FIG. 14 is a partial enlarged perspective view showing the seventh example of the first embodiment of the invention, and showing in an enlarged manner the vicinity of a node of a grid which is produced by the phase-shifted disk cutters.

FIGS. 13 and 14 show a seventh example of the first embodiment of the invention. FIG. 13 is a partial enlarged schematic view schematically showing in an enlarged manner a portion where upper and lower phase-shifted disk cutters overlap with each other, and FIG. 14 is a partial enlarged perspective view showing in an enlarged manner the vicinity of a node of a grid which is produced by the phase-shifted disk cutters.

The components having the same functions as those of the examples shown in FIGS. 1 and 6 are denoted by the identical reference numerals. In the same manner as FIG. 2 and the like, FIGS. 7, 9, 11, and 13 show the upper and lower disk cutters with being vertically separated from each other, and the circumferential faces are shown with being developed to a horizontal plane. In the same manner as FIG. 1 and the like, actually, FIGS. 8, 10, 12, and 14 show a grid which has been developed.

In the same manner as the first to third examples, also in the examples (FIGS. 7 to 14) of the embodiment, a grid for a plate of a storage battery will be described, and also a method of producing the grid from the lead sheet 2 by the upper and lower disk cutters 1, 1 of the rotary expander will be described. In the fourth example of the embodiment, as shown in FIG. 7, the length Lw of the valleys 1b is longer than the width Ln of the grooves 1c. In FIG. 7, particularly, the disk cutter 1 is used in which each of the grooves 1c is opened at the width Ln and only in the center area of the whole length Lw of a flat face 1b (Ln<Lw). In FIG. 7, the phases of the upper and lower disk cutters 1, 1 coincide with each other.

When the metal sheet 2 is passed between the upper and lower disk cutters 1, 1, the node 2c the length of which is equal to the width Ln of the grooves 1c is formed, because the upper and lower grooves 1c, 1c coincide and overlap with each other. In the four wires 2b connected to the node 2c, their ends are pressed by the valley 1b where the groove 1c is not opened. As shown in FIG. 8, therefore, the wires are upward or downward bent at the tip ends of the drawn-out portions 2d which are frontward and backward drawn out from the node 2c in the longitudinal direction of the lead sheet 2.

When the grid is stretched in the width direction of the metal sheet 2 to be developed, the tensile stress applied to the four wires 2b which are drawn out and bent from the node 2c via the drawn-out portions 2d is dispersed to the whole drawn-out portions 2d, so that, even after the developing process, the drawn-out portions 2d can maintain the state where the portions are drawn out in a substantially longitudinal direction. In all the basal ends where the four wires 2b are connected to the node 2, therefore, large distortion or rupture does not occur during the developing process, so that corrosion due to electrolyte hardly occurs. As a result, the possibility that a crack of corrosion occurs in the wires 2b during use of the storage battery can be remarkably reduced.

In the fourth example of the embodiment, the case where the groove 1c is opened in the center of the valley 1b has been described. In the fifth example, the groove 1c is opened with being shifted to one end of the valley 1b as shown in FIG. 9. In this case also, the upper and lower grooves 1c, 1c coincide and overlap with each other, and hence the node 20 the length of which is equal to the width Ln of the grooves 1c is formed. As shown in FIG. 10, however, in one side of each node 2c in the width direction of the metal sheet 2, two wires 2b (the right ones in the figure) which are vertically pressed by the ridges 1a which protrude immediately from the ends of the valleys 1b where the groove 1c is opened are vertically bent with starting immediately from the basal end of the node 2c, and by contrast two wires (the left ones in the figure) which are vertically pressed by the ends of the valleys 1b where the groove 1c is not opened are vertically bent at the tip ends of the drawn-out portions 2d which are rearward drawn out from the node 2c in the longitudinal direction of the metal sheet 2. The tensile stress applied to the two wires 2b during the developing process is dispersed to the whole drawn-out portions 2d, whereby the possibility that a crack of corrosion due to electrolyte occurs in the wires 2b during use of the storage battery can be reduced.

As shown in FIG. 11, the grooves 10 which are opened with being shifted to ends of the valleys 1b may be formed respectively in the ends which are on the opposite sides along the frontward and backward directions in the upper and lower disk cutters 1. The upper and lower disk cutters 1 are oppositely rotated. In the case of the disk cutters 1 shown in FIG. 9, therefore, disk cutters having different shapes are used as the upper and lower disk cutters. By contrast, in the case of FIG. 11, disk cutters having the same shape can be used as the upper and lower disk cutters, and hence sharing of the parts can be attained. In this case, the upper and lower grooves 1c, 1c are shifted from each other, and hence the node 2c is formed only by the portion where the grooves overlap with each other. As shown in FIG. 12, all of the four wires 2b connected to the node 2c are vertically pressed by the valleys 1b where the groove 1c is opened, and the valleys 1b where the groove 1c is not opened, and hence vertically bent at the tip ends of the drawn-out portions 2d which are frontward and backward drawn out from the node 2c in the longitudinal direction of the metal sheet 2. The tensile stress applied to the four wires 2b during the developing process is dispersed to the whole drawn-out portions 2d, whereby the possibility that a crack of corrosion due to electrolyte occurs in the wires 2b during use of the storage battery can be remarkably reduced.

As shown in FIG. 13, the grooves 1c which are opened with being shifted to ends of the valleys 1b may be formed respectively in the ends which are on the opposite sides along the frontward and backward directions in the upper and lower disk cutters 1, and may be shifted in phase so that the upper and lower grooves 1c, 1c coincide and overlap with each other. In this case also, the upper and lower valleys 1b, 1b are shifted from each other, but the upper and lower grooves 1c, 1c coincide and overlap with each other, so that the node 2c the length of which is equal to the width Ln of the grooves 1c is formed. As shown in FIG. 14, among the four wires 2b connected to the node 2c, the two diagonal wires 2b (the left rear and right front ones in the figure) are pressed by the upper and lower protrusions 1a to be vertically bent with starting immediately from the basal end of the node 2c, but the remaining two wires 2b (the left front and right rear ones in the figure) which are vertically pressed by the ends of the valleys 1b where the groove is not opened are vertically bent at the tip ends of the drawn-out portions 2d which are drawn out from the basal end of the node 2c in the longitudinal direction of the metal sheet 2. The tensile stress applied to the two wires 2b during the developing process is dispersed to the whole drawn-out portions 2d, whereby the possibility that a crack of corrosion due to electrolyte occurs in the wires 2b during use of the storage battery can be reduced.

In the first to sixth examples, the various combinations in which the phases of the upper and lower disk cutters 1, 1 are shifted from each other, the upper and lower flat faces 1b, 1b have different lengths, or the length of the valleys 1b of the disk cutters 1 is longer than the width of the grooves 1c have been described. Any other combinations of the disk cutters 1, 1 can be used as far as at least one of the wires 2b connected to the node 2c has a shape in which it is bent via the drawn-out portion 2d. For example, the upper and lower valleys 1b, 1b may have different lengths, and the width of both or one of the upper and lower grooves 1c may be shorter than the lengths of the valleys 1b. In addition to this, the phases of the upper and lower disk cutters 1, 1 may be shifted from each other.

In the first to sixth examples, in order to simplify the description, the case where the grid is produced by passing the metal sheet 2 of lead or a lead alloy between the upper and lower disk cutters 1, 1 has been described. The manner of arranging disk cutter rolls in which such disk cutters 1 are combinedly used can be arbitrarily selected, and is not restricted to the case where the metal sheet 2 is passed through two opposed disk cutter rolls. The grid may be produced with arranging three or more disk cutter rolls in the transportation path of the metal sheet 2.

In the first to sixth examples, the case where the metal sheet 2 of lead or a lead alloy is processed to produce a grid for a battery plate has been described. The invention can be similarly applied also to the case where the metal sheet 2 of a metal other than lead or a lead alloy is processed to produce another grid for a battery plate.

As apparent from the above description, according to the grid for a battery plate of the invention, a wire is bent at the tip end of a drawn-out portion which is drawn out in a substantially straight manner from a node, and hence the wire can be prevented from being easily corroded to cause a crack of corrosion.

According to the method of producing a grid for a battery plate of the invention, a wire is bent at the tip end of a drawn-out portion which is drawn out in a substantially straight manner from a node, whereby wires of a produced grid can be prevented from being easily corroded.

Embodiment (2) of the Invention

Next, a second embodiment of the invention will be described with reference to the accompanying drawings.

Figure 15:
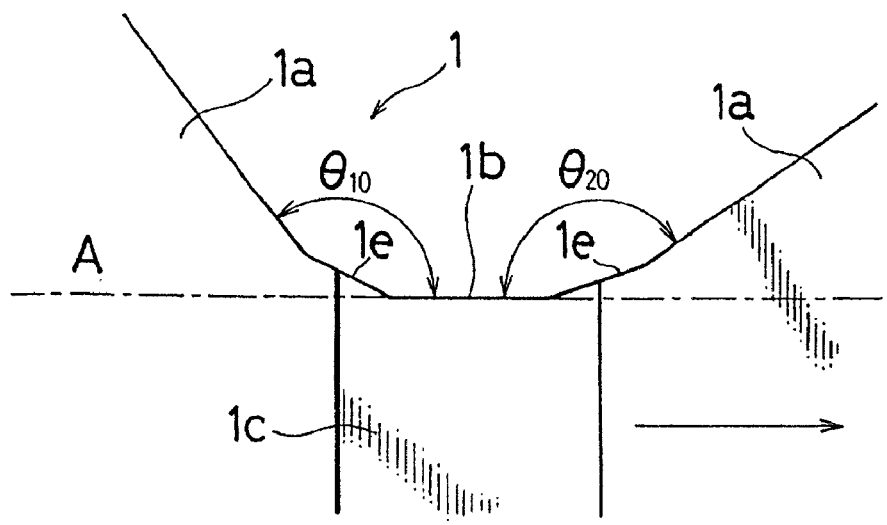
FIG. 15 is a partial enlarged front view showing a second embodiment of the invention, and showing a valley of a disk cutter.
Figure 16:
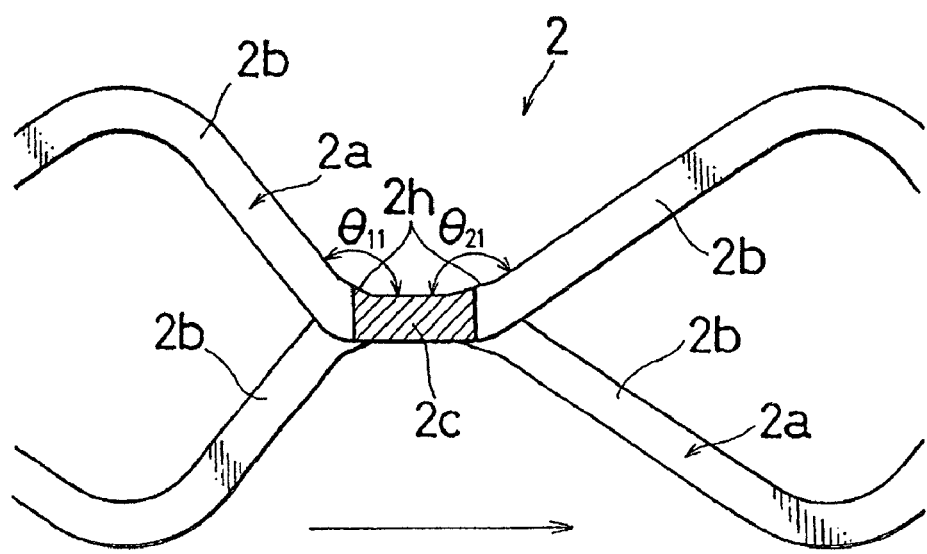
FIG. 16 is a partial enlarged front longitudinal section view showing the second embodiment of the invention, and showing a fence-like portion between slits protruding in a ridge-like shape in a metal sheet.
Figure 17:
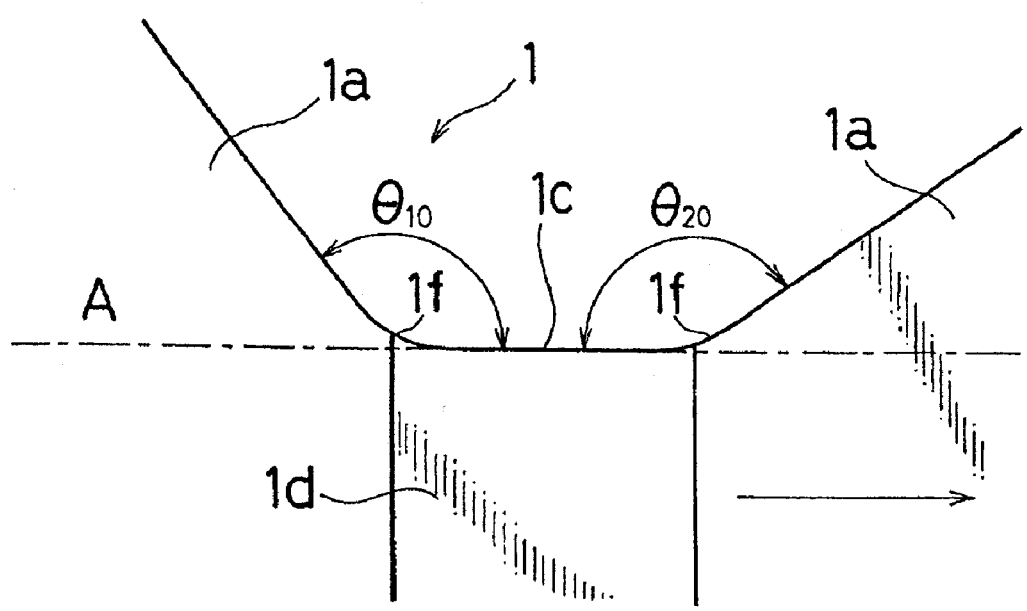
FIG. 17 is a partial enlarged front view showing an embodiment of the invention, and showing a case where, in place of a small slope, a curved faces is interposed in both sides of a gap face of a disk cutter.

FIGS. 15 to 17 show the second embodiment of the invention. FIG. 15 is a partial enlarged front view showing a gap face of a disk cutter, FIG. 16 is a partial enlarged front longitudinal section view showing a fence-like portion between slits protruding in a ridge-like shape in a metal sheet, and FIG. 17 is a partial enlarged front view showing a case where, in place of a small slope, a curved faces is interposed in both sides of a valley of a disk cutter.

In a manner similar to the prior art example shown in FIGS. 37 to 50, also the embodiment of the invention relates to the disk cutter 1 of a rotary expander. The disk cutter 1 is a cutting tool in which a large number of ridges 1a protrude from the peripheral side face of a thin disk-like steel plate. The ridges 1a protrude at equal angular intervals from the peripheral side face of the disk cutter 1, and are arranged with forming a constant gap between adjacent ridges. In the same manner as in the prior art example shown in FIG. 41, each of the ridges 1a is formed so as to protrude in a ridge-like shape from the circumferential face A, and the apex 1i (see FIG. 41) of the ridge 1a is rounded so as to smoothly connect the peripheral side faces between the slopes across the apex. In each of the ridges 1a, the apex is formed with being shifted toward the front side in the rotational direction. As described in the prior art example, with respect to the angles at which the slopes on both the sides of the apex protrude from the circumferential face A, therefore, the front angle $\theta_{10}$ is closer to a right angle or steeper than the rear angle $\theta_{20}$.

The valley 1b which elongates along the circumferential face A of the disk cutter 1 is formed between the ridges 1a. As shown in FIG. 15 in which the circumferential face A that is within the same radius from the axis of the disk cutter is developed to a plane, therefore, the angle formed by the valley 1b and the front slope of the ridge 1a that is rearward adjacent thereto is $\theta_{10}$, and the angle formed by the valley and the rear slope of the ridge 1a that is forward adjacent thereto is $\theta_{20}$. In FIG. 15, since the circumferential face A is shown with being developed to a plane, also the valley 1b is shown in the same plane as the circumferential face A. Small slopes 1e are interposed respectively between the valley 1b and the slopes of the ridges 1a that are adjacent thereto on both the sides. Each of the small slopes 1e is a plane which connects the peripheral side face between the valley 1b and the slope of the ridge 1a, and has an inclination angle at which the small slope is raised from the valley 1b, and which is a half of the protruding angle ($\theta_{10}$ or $\theta_{20}$) of the slope of the ridge 1a from the circumferential face A. Therefore, the small slopes 1e are connected also to the slopes of the ridges 1a at the same angle as the rising angle from the valley 1b, and the slopes of the ridges 1a protrude from the valley 1b via the small slopes 1e at the two-step bending angles.

In the disk cutter 1, the grooves 1c which are similar to those of the prior art example are formed in both the disk-like faces and in every other valley 1b. In the same manner as the prior art example shown in FIGS. 38 and 39, a large number of thus configured disk cutters 1 are arranged on a rotation shaft with being separated from each other to form a roll, and two rolls of the disk cutters 1 are vertically arranged.

In the rotary expander of the second embodiment of the invention, the metal sheet 2 is passed between the upper and lower roll-like disk cutters 1, thereby forming the slits 2a in the metal sheet 2. In the metal sheet 2, as shown in FIG. 2, the fence-like portion between the slits 2a is pressed by the ridges 1a of the upper and lower disk cutters 1 to protrude in a ridge-like shape. At this time, as shown in FIG. 16, small bent portions 2h which are bent in two steps by the small slopes 1e are formed between the node 2c where the slits 2a are disconnected, and the fence-like portion (the wires 2b) which protrudes in a ridge-like shape. The small bent portions 2h are bent at both ends by an angle which is a ($\theta_{11}$ or $\theta_{21}$) in the prior art.

In the second embodiment of the invention, therefore, the fence-like portion (the wires 2b) between the slits 2a of the metal sheet 2 can be bent in two steps via the small bent portion 2h by an angle which is a half of the conventional bending angle. When the metal sheet 2 is stretched to widen the slits 2a to form meshes, therefore, a phenomenon that the degree of cut of the slits 2a in an end of the fence-like portion is increased to shorten the length of the nodes 2c shown in FIG. 43 or reduce the strength of the nodes to cause rupture does not occur. As a result, edges of the meshes can be prevented from being easily corroded by electrolyte.

In the second embodiment of the invention, the case where each of the valleys 1b is configured by a face which extends along the circumferential face A has been described. Alternatively, the valley 1b may be configured by a face other than that extending along the circumferential face A, such as a flat face. In the case where the valley 1b is configured by a face extending along the circumferential face A as in the embodiment or another curved face, the inclination angle of the face is the inclination angle of a contacting face of a portion which is immediately in front of the portion connected to the small slope 1e.

In the second embodiment of the invention, the case where the small slope 1e is formed in both the sides of each of the valleys 1b has been described. Alternatively, the small slope 1e may be formed only between each of the valleys 1b and at least the front slope of the ridge 1a which is rearward adjacent to the valley in the rotational direction, because the slope of the rear ridge 1a protrudes at the steeper angle $\theta_{10}$ with respect to the circumferential face A and hence a crack of corrosion in the node 2c can be effectively prevented from occurring, even in a configuration in which the bending angle of the slope is simply divided into two steps. In the second embodiment of the invention, the case where the small slope 1$e$ has an intermediate inclination angle between the slopes of the valley 1$b$ and the ridge 1$a$ has been described. When the inclination angle is set to an arbitrary angle between the slopes of the valley 1$b$ and the ridge 1a, the bending angle can be made gentle. However, the bending angles in both the ends of the small slope 1$e$ are gentlest in the case where the intermediate inclination angle is employed as in the embodiment.

In the second embodiment of the invention, the case where the small slope 1$e$ is interposed between the valley 1$b$ and the slope of the ridge 1$a$ has been described. Alternatively, as shown in FIG. 17, a curved face 1$f$ may be interposed between the valley 1$b$ and the slope of the ridge 1a. All contact faces which are in contact with the curved face 1$f$ must have an inclination angle between an inclination angle of the valley 1$b$ and that of the slope of the ridge 1a. Preferably, the curved face 1$f$ is rounded so that the inclination angle is closer to the inclination angle of the valley 1$b$ as more approaching the valley 1$b$, and closer to that of the slope of the ridge 1$a$ as more approaching the slope of the ridge 1a. When the thus configured slope 1$e$ is interposed between the valley 1$b$ and the slope of the ridge 1a, the fence-like portion between the slits 2$a$ of the metal sheet 2 can smoothly protrude in a ridge-like shape from the node 2$c$. Therefore, cracks due to reduced strength caused by formation of angled bends can be prevented from occurring, and edges of meshes can be prevented from being easily corroded by electrolyte.

EXAMPLE 1

The case where the lead sheet 2 made of lead or a lead alloy is used as the metal sheet 2, and the slits 2$a$ are formed and developed by using the disk cutter 1 of the prior art example in which the valley 1$b$ is directly connected to the slope of the ridge 1$a$ without interposing the small slope 1$e$ therebetween was compared with that where the slits 2$a$ are formed in the lead sheet 2 by using the disk cutter 1 of the embodiment in which the small slope 1$e$ is interposed between the valley 1$b$ and the slope of the ridge 1a. Results of the comparison are shown in Table 1.

TABLE 1

| Inclination angle of small slope ($\theta_{10}$ = 40°) | Development amount before crack (100 in case of no small slope) | Life performance (100 in case of no small slope) | |
| --- | --- | --- | --- |
| No small slope | 100 | 100 | Prior art example |
| 5° | 105 | 101 | Example |
| 10° | 109 | 105 | Example |
| 15° | 116 | 113 | Example |
| 20° | 122 | 116 | Example |
| 30° | 116 | 110 | Example |

In Table 1 above, in the case where the inclination angle of the valley 1$b$ is set to 0° and that of the steep slope of the ridge 1$a$ which is in rear of the valley 1$b$, i.e., the angle $\theta_{10}$ is set to 40°, the prior art example of "no small slope", and examples in which the inclination angle of the small slope 1$e$ with respect to the steep slope is set to 5°, 10°, 15°, 20°, or 30° were compared with one another in amount of development which was conducted until crack occurred, and life performance of a lead storage battery. Specifically, the slits 2$a$ were formed in the lead sheet 2 by using a rotary expander having the disk cutters 1 of each kind, and the amount of development which was conducted until crack occurred in the nodes 2$c$ was measured. The slits 2$a$ were formed in the lead sheet 2 by using a rotary expander having the disk cutters 1 of each kind, and developed by a predetermined amount to form a grid, an active material was filled into the grid, and the grid was then cured and dried to form a positive plate. The positive plate was combined with a negative plate which was produced by a conventional method, and a separator which is configured mainly by microporous polyethylene, to produce a lead storage battery for an automobile. The lead storage battery was subjected to a light-load life test according to JIS standard (D 5301) in a gaseous phase of 75° C. After the life test was ended, the battery was disassembled, and the rates of crack portions in the higher- and lower-angle sides of the node 2$c$ in the grid were investigated.

From the comparison results shown in Table 1, it has been seen that, in all the cases where the small slope 1$e$ is interposed, the development amount before the node 2$c$ cracks is larger than that in the prior art example, and maximized in the case where the small slope 1$e$ has the inclination angle of 20° which is an intermediate inclination angle between the valley 1$b$ and the slope of the ridge 1$a$, while becoming larger as being nearer to the inclination angle. Furthermore, it has been seen that, in accordance with this, also the SAE life performance at 75° C. is excellent.

As apparent from the above description, according to the method of producing a grid for a battery plate of the invention and the apparatus for the method, a small slope or a curved face is interposed between each of the valleys and the slope of each of the ridges in the disk cutter, the angled bend between the valley and the slope of the ridge can be set to two steps so as to be gentle, or to be smoothly conducted. Therefore, the rising angle by which the fence-like portion between the slits of the metal sheet protrudes in a ridge-like shape can be made gentle, and the portion can be smoothly raised. Consequently, the portion can be prevented from being easily corroded by electrolyte, thereby preventing the capacity of a battery from being reduced, and the life of the battery from being shortened.

Embodiment (3) of the Invention

Next, a third embodiment of the invention will be described with reference to the accompanying drawings.

The third embodiment corresponds to a modification of the above-described second embodiment, and is also a preferable example of means for solving above discussed Problem (2) to be solved.

Figure 18:
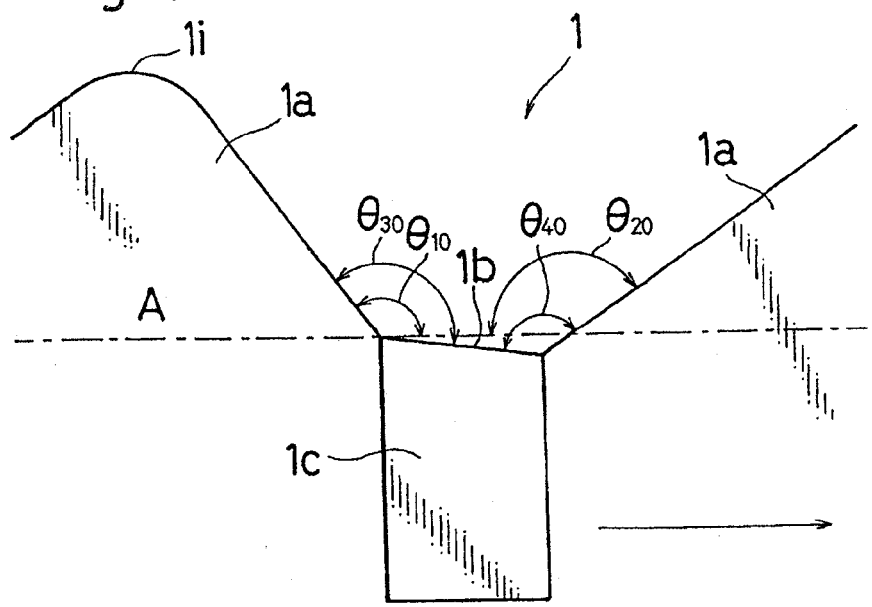
FIG. 18 is a partial enlarged front view showing a third embodiment of the invention, and showing an inclined valley of a disk cutter.
Figure 19:
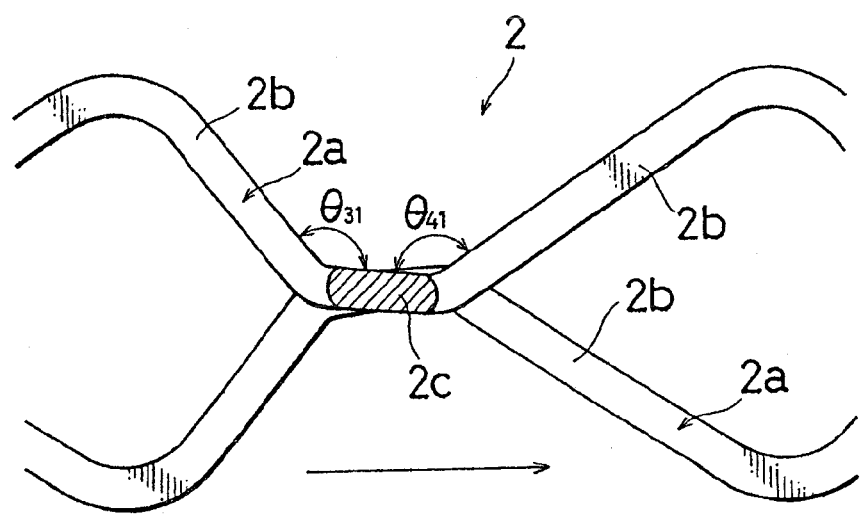
FIG. 19 is a partial enlarged front longitudinal section view showing the third embodiment of the invention, and showing a fence-like portion between slits protruding in a ridge-like shape in a metal sheet.

FIGS. 18 and 19 show the third embodiment of the invention. FIG. 18 is a partial enlarged front view showing an inclined valley of a disk cutter, and FIG. 19 is a partial enlarged front longitudinal section view showing a fence-like portion between slits protruding in a ridge-like shape in a metal sheet.

In a manner similar to the prior art example shown in FIGS. 37 to 50, also the third embodiment of the invention relates to the disk cutter 1 of a rotary expander. The disk cutter 1 is a cutting tool in which a large number of ridges 1$a$ protrude from the peripheral side face of a thin disk-like steel plate. The ridges 1$a$ protrude at equal angular intervals from the peripheral side face of the disk cutter 1, and are arranged with forming a constant gap between adjacent ridges. As shown in FIG. 18 in which the circumferential face A that is within the same radius from the axis of the disk cutter is developed to a plane, each of the ridges 1$a$ is formed so as to protrude in a ridge-like shape from the circumferential face A, and rounded. In each of the ridges 1$a$, the apex of the ridge-like shape is formed with being shifted toward the front side in the rotational direction. As described in the prior art example, with respect to the angles at which the slopes on both the sides of the apex protrude from the circumferential face A, therefore, the front angle $\theta_{10}$ is closer to a right angle or steeper than the rear angle $\theta_{20}$ (hereinafter, for each of the ridges 1a, the side of the front angle $\theta_{10}$ is referred to as "the higher-angle side", and the side of the rear angle $\theta_{20}$ is referred to as "the lower-angle side").

The valley 1b in which the front side is inclined toward the center with respect to the circumferential face A of the disk cutter 1 is formed between the ridges 1a. The valley 1b is configured by a face which is obtained by rotationally displacing the curved face extending along the circumferential face A so as to incline the front side toward the center, about the crossing line between the curved face and the slope of the rear ridge 1a on the higher-angle side. Therefore, the valleys 1b is a face in which all contact faces contacting with the valley 1b are inclined toward the center by a constant angle as being more forward than the contact face which is centered at the rotation axis of the disk cutter 1 and has the same angular position. At this time, it is preferable to set the inclination angle of the valley 1b to 1° or more. Since FIG. 18 shows the circumferential face A with developing the face to a plane, also the valley 1b is shown as a plane which is inclined by a constant angle with respect to the circumferential face A. When the valley 1b is inclined in this way, the bending angle $\theta_{30}$ between the valley and the higher-angle side slope of the ridge 1a which is rearward adjacent thereto is larger than the angle $\theta_{10}$ with respect to the circumferential face A or becomes gentle. The bending angle $\theta_{40}$ between the valley and the lower-angle side slope of the ridge 1a which is forward adjacent thereto is smaller than the angle $\theta_{20}$ with respect to the circumferential face A or becomes steep. However, the angle $\theta_{10}$ with respect to the circumferential face A is originally sufficiently closer to a right angle or steeper than the angle $\theta_{20}$, and hence the angle $\theta_{40}$ with respect to the valley 1b is closer to the angle $\theta_{30}$ so as to reduce the difference.

In the disk cutter 1, the grooves 1c which are similar to those of the prior art example are formed in both the disk-like faces and in every other valley 1b. In the same manner as the prior art example shown in FIGS. 38 and 39, a large number of thus configured disk cutters 1 are arranged on a rotation shaft with being separated from each other to form a roll, and two rolls of the disk cutters 1 are vertically arranged. At this time, the upper and lower rollers of the disk cutters 1 are placed in the same manner as the prior art example shown in FIG. 39. In the embodiment, however, the valley 1b is inclined, and hence the rolls are placed respectively at levels which allow at least the portions of the faces of the valleys 1b which are closest to the center to slightly overlap with each other without forming a gap therebetween.

In the rotary expander of the third embodiment of the invention, the metal sheet 2 is passed between the upper and lower roll-like disk cutters 1, thereby forming the slits 2a in the metal sheet 2. In the metal sheet 2, as shown in FIG. 19, the fence-like portion between the slits 2a is pressed by the ridges 1a of the upper and lower roll-like disk cutters 1 to protrude in a ridge-like shape to be formed as the wires 2b. At this time, the node 2c in which the slits 2a are disconnected is obliquely formed by the valleys 1b of the disk cutters 1. As a result, the bending angle $\theta_{31}$ with respect to the higher-angle side slope of the rear ridge is made gentle, and the bending angle $\theta_{41}$ with respect to the lower-angle side slope of the front ridge is made steep, so that the difference between the angles is reduced. The fence-like portions (the wires 2b) between the slits 2a which are adjacent to each other protrude respectively in opposite directions or upward and downward directions.

Therefore, the fence-like portions on both sides of the node 2c are inclined respectively in opposite directions or upward and downward directions, and hence the node 2c itself is in a twisted state.

Figure 43:
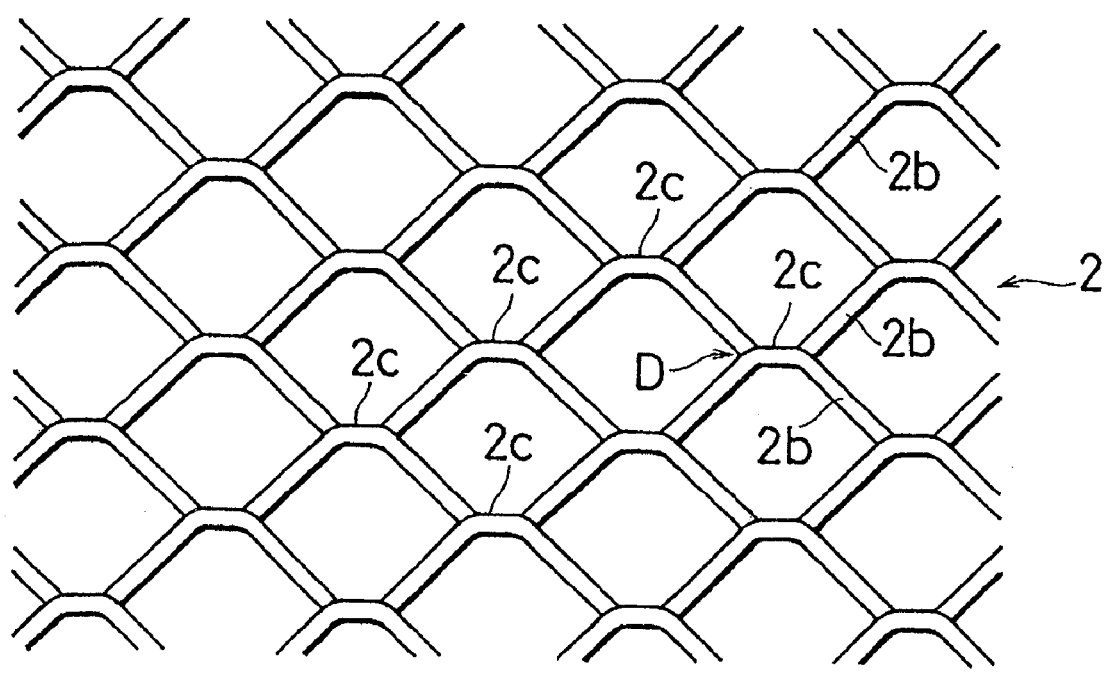
FIG. 43 is a partial enlarged plan view showing a prior art example, and showing a grid which is formed by developing slits of a metal sheet into meshes.
Figure 44:
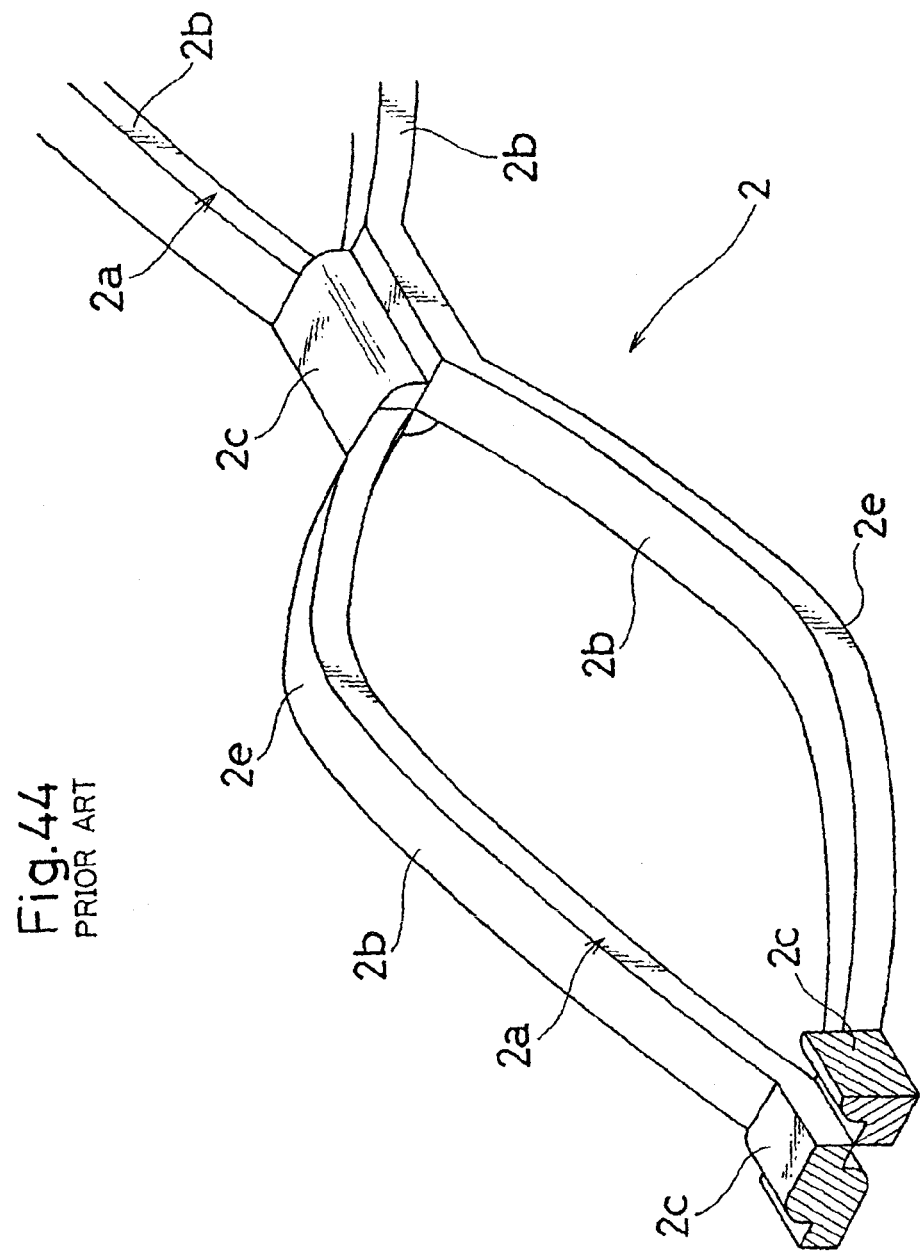
FIG. 44 is a partial enlarged perspective view showing a prior art example, and showing a metal sheet illustrating a node formed in the slit forming step, and wires connected thereto.
Figure 45:
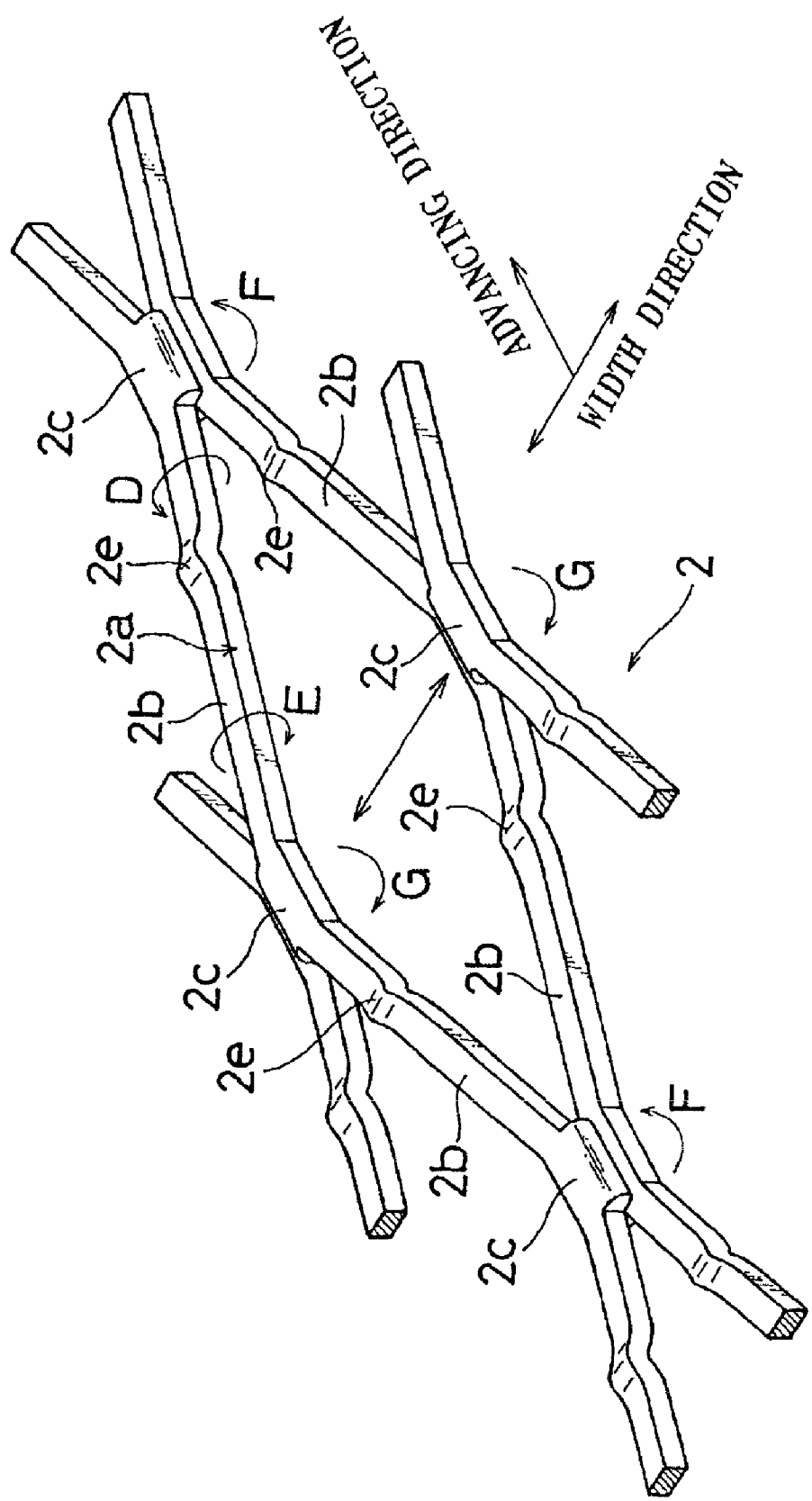
FIG. 45 is a partial enlarged perspective view showing a prior art example, and showing a grid which is obtained by, in a developing step, developing a metal sheet in which slits are formed in a slit forming step.

In the embodiment, therefore, the fence-like portion between the slits 2a of the metal sheet 2 is prevented from being bent only in the higher-angle side by a steep angle, and the bending angles $\theta_{31}$ and $\theta_{41}$ of the higher- and lower-angle sides can be averaged. When the metal sheet 2 is stretched to widen the slits 2a to form meshes, therefore, the phenomenon in the prior art that the degree of cut in only the higher-angle side in the fence-like portion between the slits 2a is large and the length and strength of the node 2c shown in FIG. 43 are reduced to cause rupture in edge portions does not occur. Consequently, edges of meshes can be prevented from being easily corroded by electrolyte.

In the embodiment, the case where the valley 1b is configured by a face which is obtained by rotationally displacing the curved face extending along the circumferential face A has been described. The valley may be configured by any kind of face as far as all contact faces contacting with the valley 1b are inclined toward the center as being more forward than the contact face which is in contact with the circumferential face A at the same angular position. Alternatively, the face may be a curved or flat face other than a face extending along the circumferential face A. When the valley 1b is a flat face which is inclined by a small angle, there sometimes arises a case where only a front end portion is more inclined toward the outer periphery as being more forward than the contact face of the circumferential face A at the same angular position. Also in such a case, it is possible to attain the effect that the bending angle with respect to the higher-angle side slope of the rear ridge 1a is made gentle. In some cases, the portion between the valley 1b and the lower-angle side slope of the ridge 1a which is forward adjacent is rounded, or a small slope having an intermediate inclination angle is interposed in the portion. Also in such cases, it is possible to attain not only the effect that the bending angle with respect to the lower-angle side slope of the front ridge 1a is made further gentle, but also the effect that the bending angle with respect to the higher-angle side slope of the rear ridge 1a is made gentle. Namely, the face contacting with the valley 1b may be a face which is inclined toward the center as being more forward than the contact face that is in contact with the circumferential face A at the same angular position, excluding at least a front end portion of the valley 1b.

In the embodiment, the case where the valley 1b is configured so that a face contacting with the valley 1b is inclined toward the center as being more forward than the contact face which is in contact with the circumferential face A at the same angular position has been described. Alternatively, the face contacting with the valley 1b may be configured by a face which is more inclined toward the center as being more forward than a plane connecting together cross lines between the circumferential face A and the slopes of the ridges 1a on both the sides. In the alternative, even when the valley 1b is a flat face which is inclined by a small angle, a face which is surely inclined over a range to a front end portion is obtained.

EXAMPLE 1

The case where the lead sheet 2 made of lead or a lead alloy is used as the metal sheet 2, and the slits 2a are formed and developed by using the disk cutter 1 of the prior art example in which the valley 1b is not inclined was compared with that where the slits 2a are formed in the lead sheet 2 by using the disk cutter 1 of the embodiment in which the valley 1b is inclined. Results of the comparison are shown in Table 2.

TABLE 2

| Inclination angle | Percentage of crack in lower-angle side | Percentage of crack in higher-angle side | Life performance (100 in case of inclination angle of 0°) | |
|---|---|---|---|---|
| 0° | 0% | 30% | 100 | Prior art example |
| 1° | 0% | 25% | 105 | Example |
| 3° | 1% | 19% | 113 | Example |
| 5° | 3% | 12% | 130 | Example |
| 8° | 5% | 6% | 152 | Example |
| 10° | 6% | 6% | 147 | Example |

In Table 2 above, a prior art example in which the inclination angle of the valley 1b is 0°, and examples in which the inclination angle is 1°, 3°, 5°, 8°, or 10° were compared with each other with respect to the percentages of crack in the higher- and lower-angle sides and life performance of a lead storage battery. Specifically, the lead sheet 2 was formed into a grid by using a rotary expander having the disk cutters 1 of each kind, an active material was filled into the grid, and the grid was then cured and dried to form a positive plate. The positive plate was combined with a negative plate which was produced by a conventional method, and a separator which is configured mainly by macroporous polyethylene, to produce a lead storage battery for an automobile. The lead storage battery was subjected to a light-load life test according to JIS standard (D 5301) in a gaseous phase of 75° C. After the life test was ended, the battery was disassembled, and the rates of crack portions in the higher- and lower-angle sides of the node 2c in the grid were investigated.

From the comparison results shown in Table 2, it has been seen that, in the prior art example, the percentage of crack in the higher-angle side is high, and by contrast, in the examples, the percentage of crack in the lower-angle side is slightly higher but that in the higher-angle side is greatly reduced as the inclination angle is larger, and the total percentage of crack is lower as the inclination angle is larger. Furthermore, it has been seen that, in accordance with this, also the SAE life performance at 75° C. is more improved as the inclination angle is larger, until the inclination angle has a certain large value.

As apparent from the above description, according to the method of producing a grid for a battery plate of the invention and the apparatus for the method, the valley between the ridges of the disk cutter is more inclined toward the center as being more forward. Consequently, the bending angle between the valley and the steep slope of the ridge that is rearward adjacent thereto can be made large so as to be gentle. When slits are formed in a metal sheet, therefore, the node is inclined, and the steep rising angle by which the fence-like portion between the slits protrudes in a ridge-like shape can be made gentle, so that the portion can be prevented from being easily corroded by electrolyte, thereby preventing the capacity of a battery from being reduced, and the life of the battery from being shortened.

Embodiment (4) of the Invention

Next, a fourth embodiment of the invention will be described with reference to the accompanying drawings.

Figure 20:
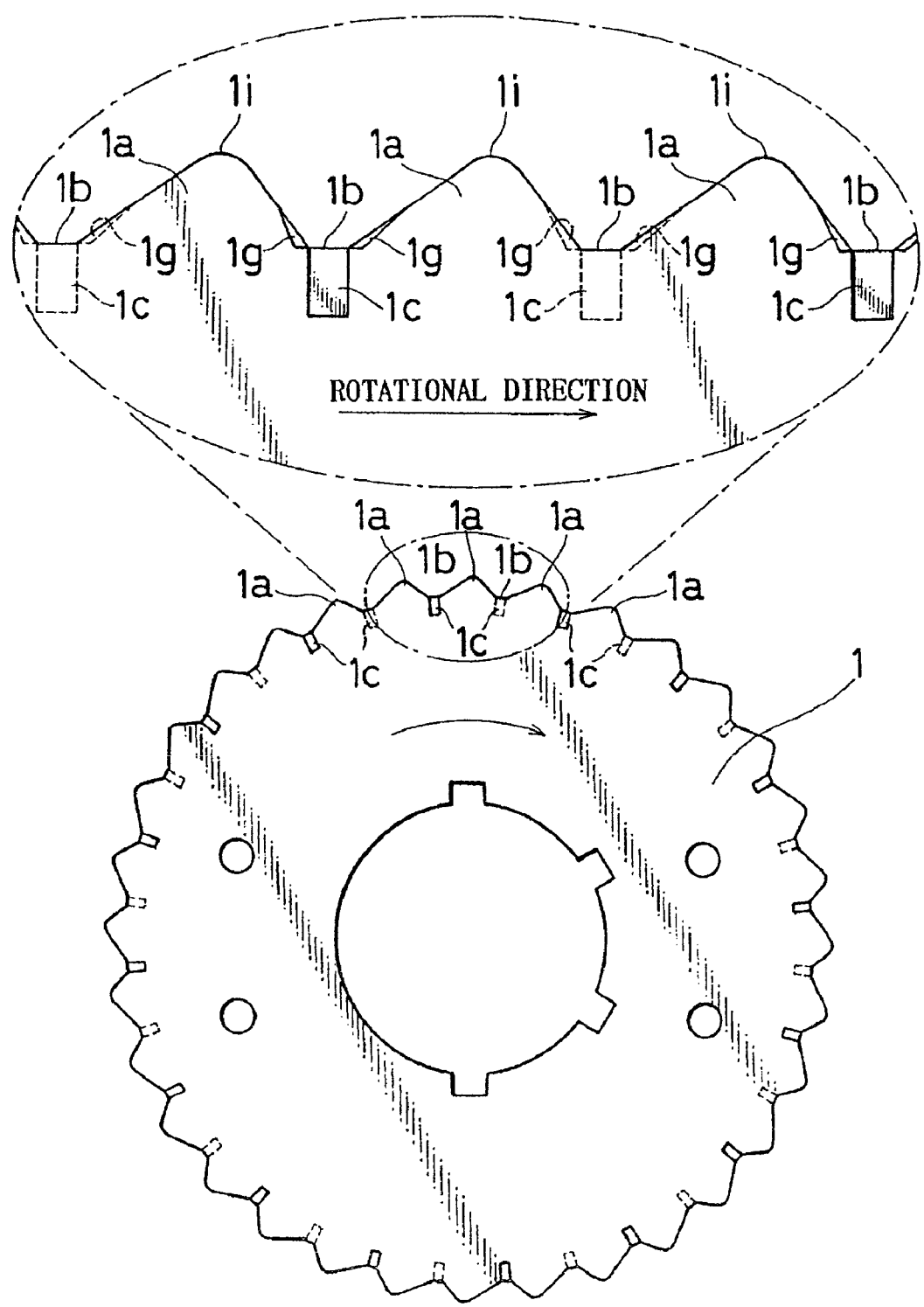
FIG. 20 is a front view showing a fourth embodiment of the invention, and showing the whole of a disk cutter, and a peripheral edge of the disk cutter in an enlarged manner.
Figure 21:
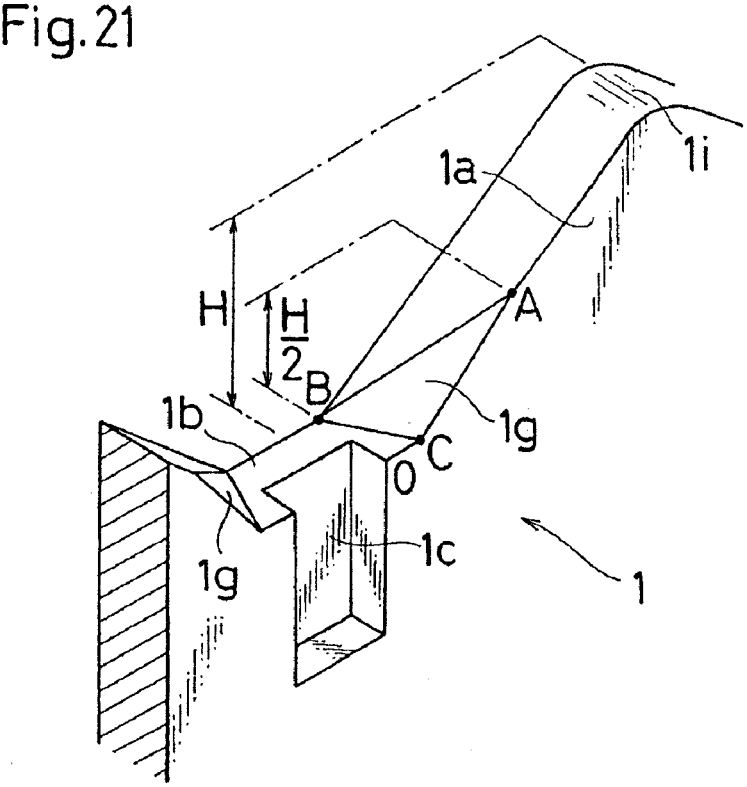
FIG. 21 is a partial enlarged perspective view showing the fourth embodiment of the invention, and showing inclined faces formed in peripheral side faces of ridges which are opposed across a valley of the disk cutter.
Figure 22:
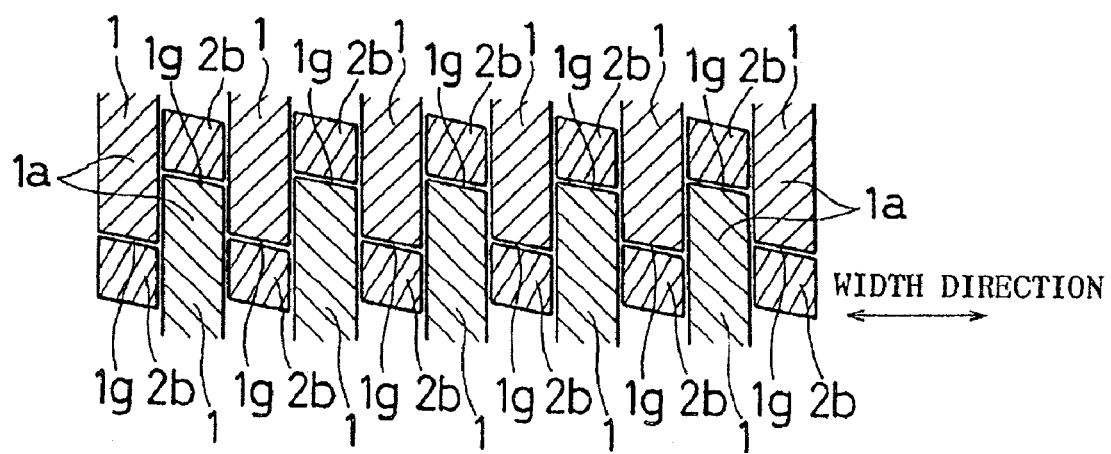
FIG. 22 is a partial enlarged side longitudinal section view showing the fourth embodiment of the invention, and showing a slit forming step of a rotary expander and illustrating a manner in which wires of a metal sheet are twisted with being pressed by the inclined faces formed in ridges of disk cutters of upper and lower disk cutter rolls.
Figure 23:
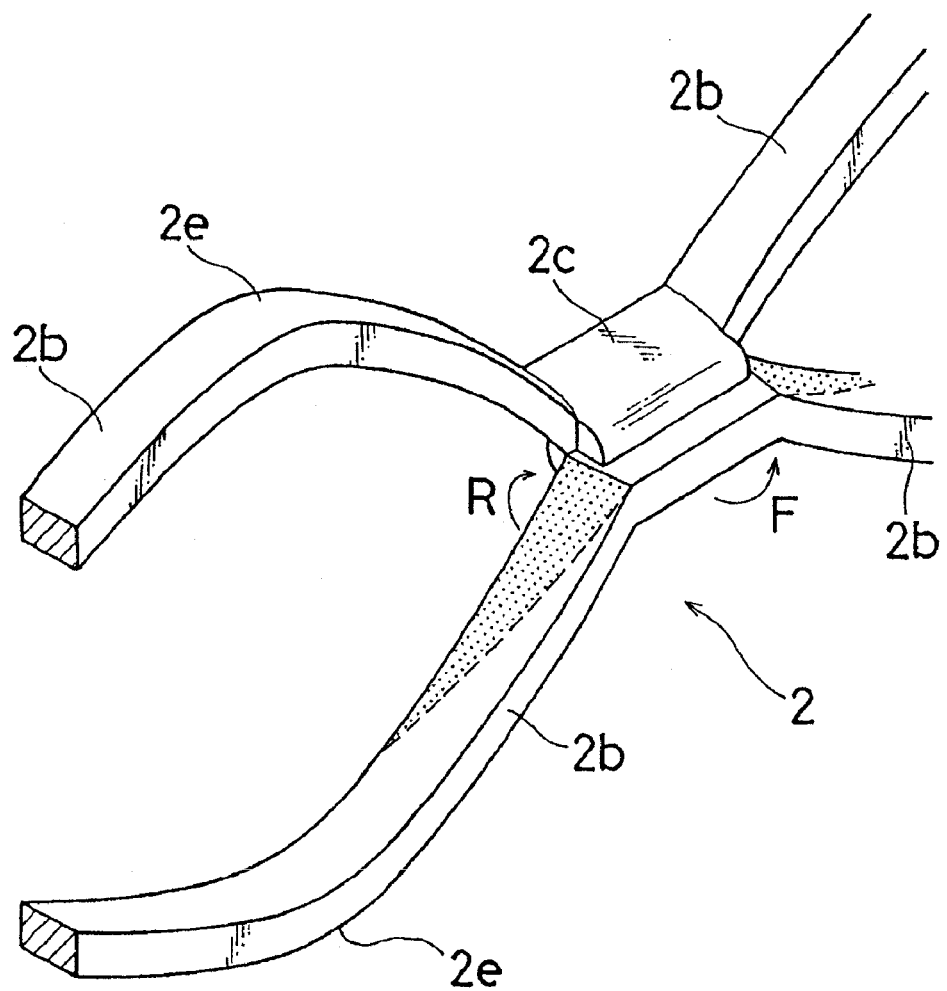
FIG. 23 is a partial enlarged perspective view showing the fourth embodiment of the invention, and showing a lead sheet and illustrating a node formed in the slit forming step, and four wires connected thereto.
Figure 24:
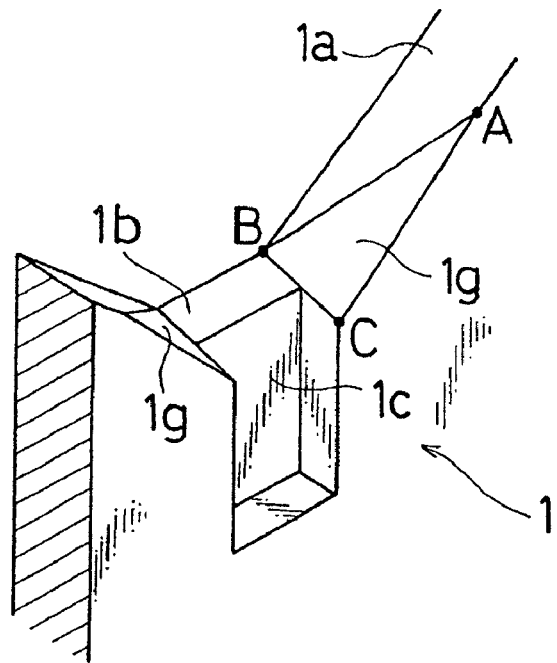
FIG. 24 is a partial enlarged perspective view showing the fourth embodiment of the invention, and showing another first configuration example of the inclined faces formed in peripheral side faces of ridges which are opposed across a valley of the disk cutter.
Figure 25:
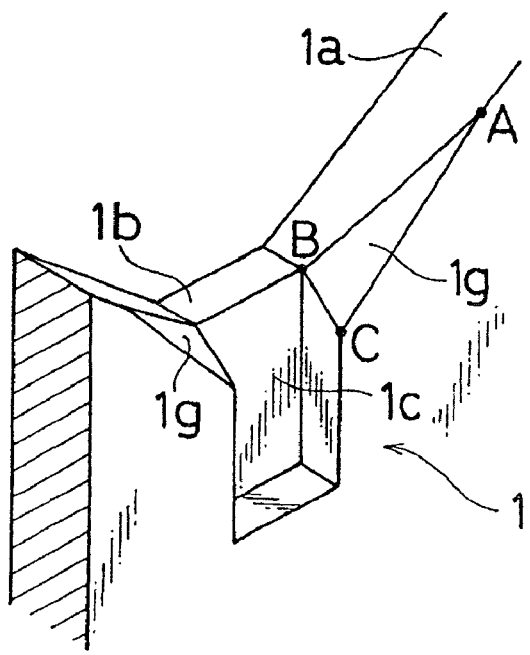
FIG. 25 is a partial enlarged perspective view showing the fourth embodiment of the invention, and showing another second configuration example of the inclined faces formed in peripheral side faces of ridges which are opposed across a valley of the disk cutter.
Figure 26:
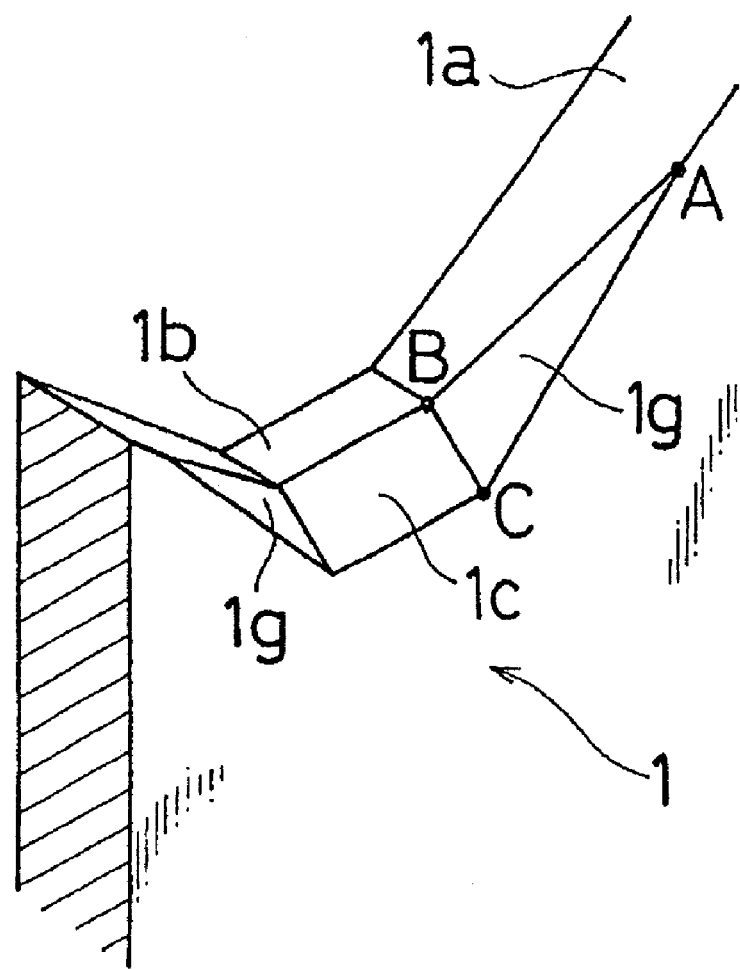
FIG. 26 is a partial enlarged perspective view showing the fourth embodiment of the invention, and showing another third configuration example of the inclined faces formed in peripheral side faces of ridges which are opposed across a valley of the disk cutter.

FIGS. 20 to 26 show the fourth embodiment of the invention. FIG. 20 is a front view showing the whole of a disk cutter, and a peripheral edge of the disk cutter in an enlarged manner, FIG. 21 is a partial enlarged perspective view showing inclined faces formed in peripheral side faces of ridges which are opposed across a valley of the disk cutter, FIG. 22 is a partial enlarged side longitudinal section view showing a slit forming step of a rotary expander and illustrating a manner in which wires of a metal sheet are twisted with being pressed by the inclined faces formed in ridges of disk cutters of upper and lower disk cutter rolls, FIG. 23 is a partial enlarged perspective view showing a metal sheet and illustrating a node formed in the slit forming step, and four wires connected thereto, FIG. 24 is a partial enlarged perspective view showing another first configuration example of the inclined faces formed in peripheral side faces of ridges which are opposed across a valley of the disk cutter, FIG. 25 is a partial enlarged perspective view showing another second configuration example of the inclined faces formed in peripheral side faces of ridges which are opposed across a valley of the disk cutter, and FIG. 26 is a partial enlarged perspective view showing another third configuration example of the inclined faces formed in peripheral side faces of ridges which are opposed across a valley of the disk cutter.

Figure 38:
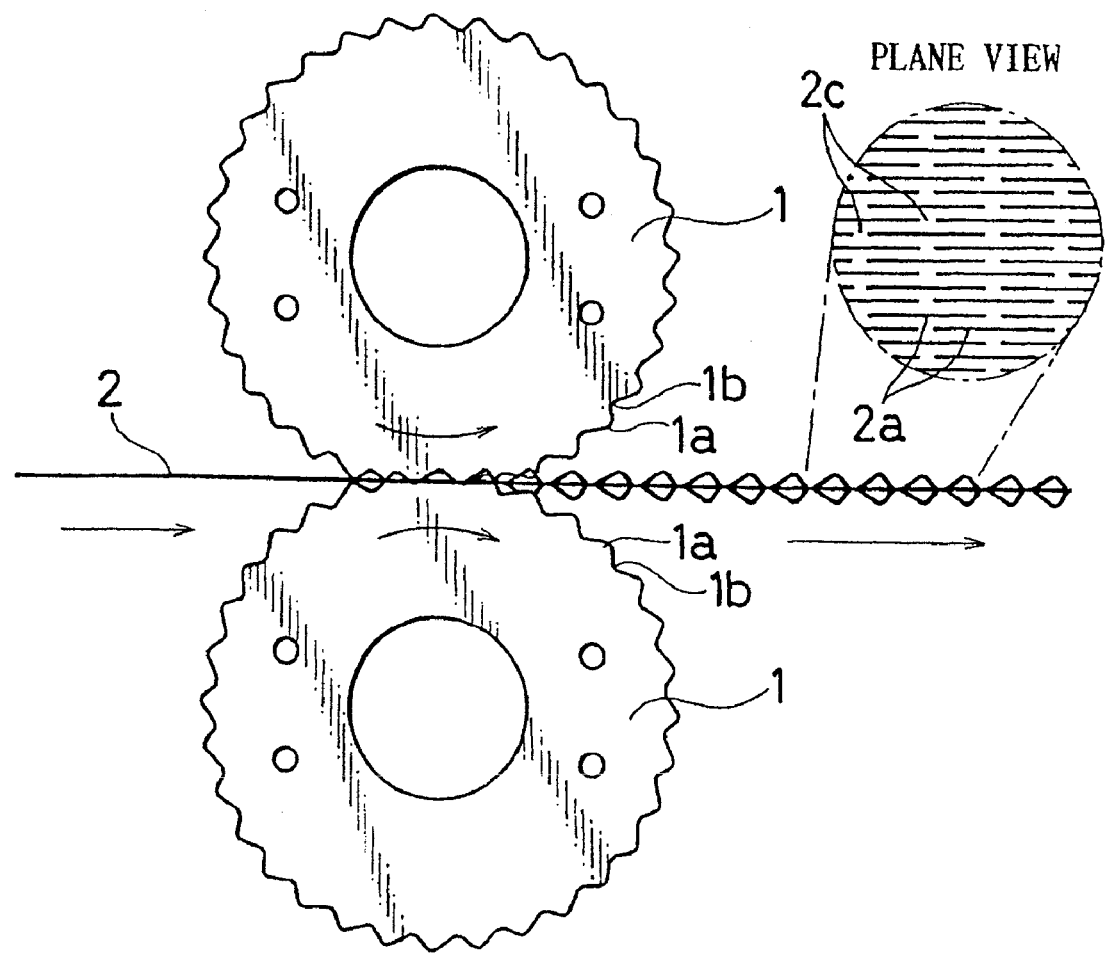
FIG. 38 is a front view showing a prior art example, and showing a step of forming slits in a metal sheet by a disk cutter in a rotary expander.
Figure 40:
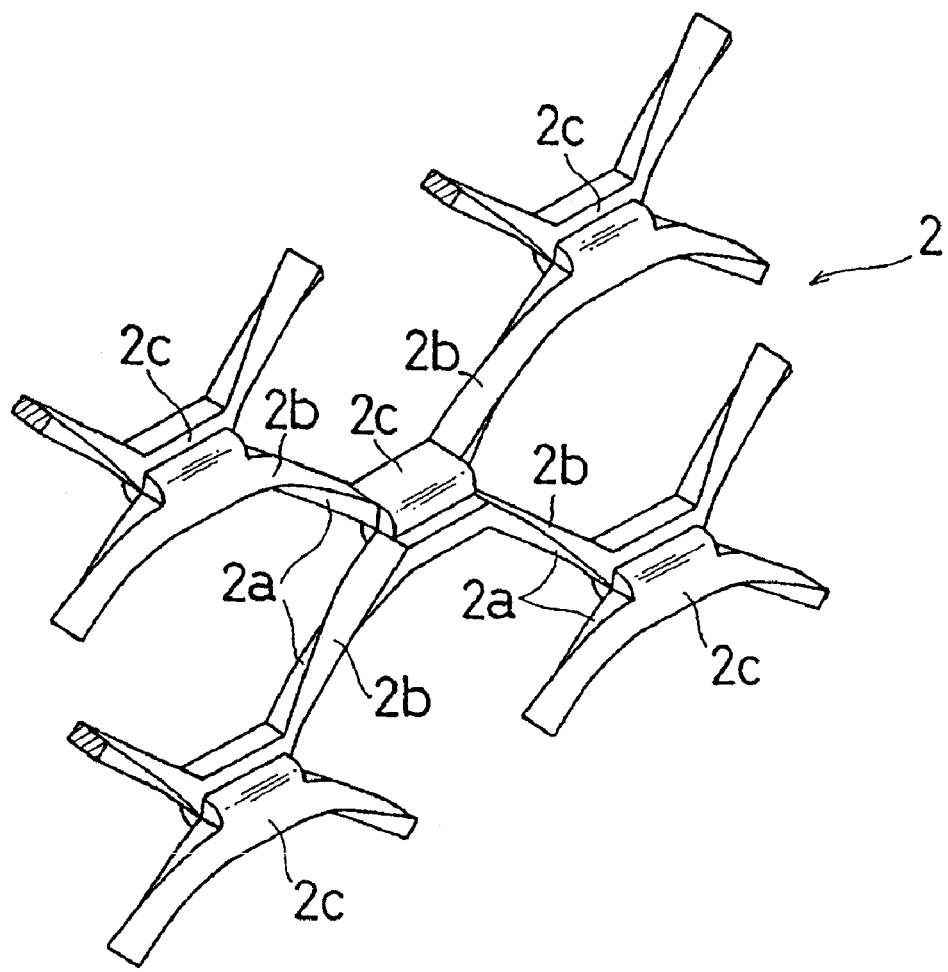
FIG. 40 is a partial enlarged perspective view showing a prior art example, and showing a grid which is obtained by forming slits in a metal sheet and developing the slits.
Figure 41:
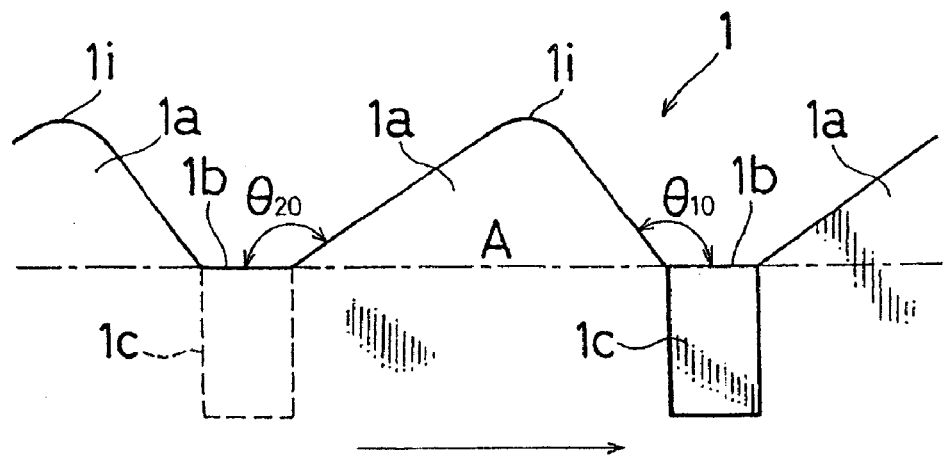
FIG. 41 is a partial enlarged view showing a prior art example, and showing ridges and valleys of a disk cutter.
Figure 42:
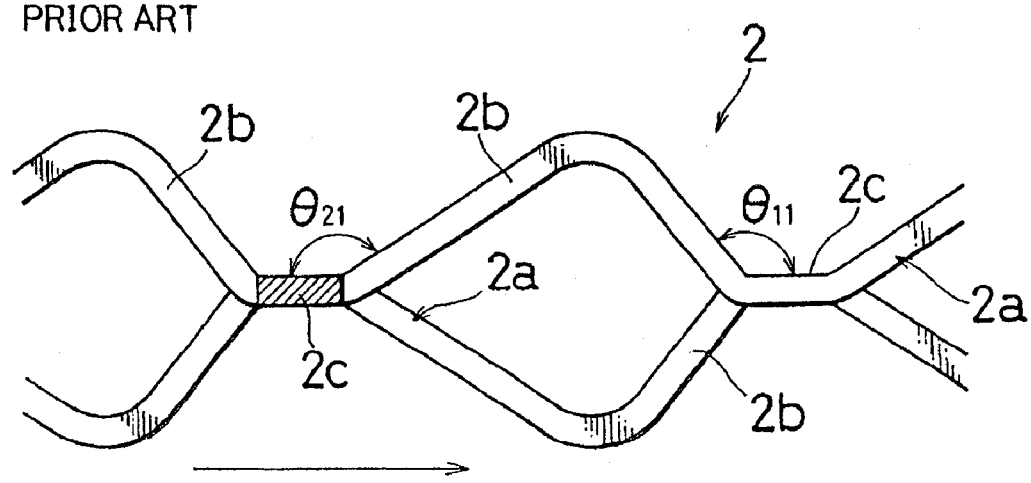
FIG. 42 is a partial enlarged side longitudinal section view showing a prior art example, and showing a fence-like portion between slits protruding in a ridge-like shape in a metal sheet.

In a manner similar to the prior art example, also the fourth embodiment of the invention relates to a rotary expander for producing a grid for a battery (lead storage battery) plate. As shown in FIG. 38, the metal sheet 2 is passed between the upper and lower disk cutter rolls to form a large number of zigzag slits 2a in the metal sheet 2. The portion between the slits 2a in the width direction of the lead sheet 2 is configured as the wire 2b, and that between the slits in the advancing direction is configured as the node 2c.

In each of the disk cutter rolls, in the same manner as the prior art example, a large number of the disk cutters 1 are arranged with forming a gap therebetween. However, the disk cutter 1 is configured in a manner different from the prior art example. In the disk cutter 1, as shown in FIG. 20, the ridges 1a having a relatively long circumferential length, and the valleys 1b having a relatively short circumferential length are alternately formed in a large number in the peripheral edge of a metal disk over the whole circumference. In each of the valleys 1b, a peripheral side face configured by a reference circumferential face of a predetermined radius and centered at the axis of the disk cutter 1 is formed in the same manner as the prior art example. The groove 1c which is opened in a peripheral side face of the valley 1b is formed in a peripheral edge portion of one of disk faces in which valleys 1b that are adjacent to each other via the ridge 1a are formed in an oppositely reverse manner. Also in FIG. 20, the oval enlarged view shows the reference circumferential face in a form developed to a plane.

In each of the ridges 1a of the disk cutter 1, a peripheral side face which protrudes in a ridge-like shape from the reference circumferential face toward the outer periphery. As shown in the oval enlarged view of FIG. 20, the peripheral side face of the ridge 1a is formed in a ridge-like shape in which the peripheral side face obliquely rises in a substantially linear manner from the reference circumferential face that is a peripheral side face of the valley 1b toward the outer peripheral side, is curved in the apex of the ridge 1a, and obliquely falls in a substantially linear manner toward the inner peripheral side to return to the reference circumferential face. The rising and falling portions of the peripheral side face of the ridge 1a are not evenly formed in the rotational direction with respect to the apex of the ridge 1a. Actually, the apex is shifted toward the front side in the rotational direction, so that the rising portion which is in the front side in the rotational direction is a peripheral side face which is steeper than the falling portion in the rear side. The configuration in which the apex of the ridge 1a is shifted toward the front side in the rotational direction is identical with that of the prior art.

Inclined faces 1g, 1g are formed in the rising and falling portions of the peripheral side face of the ridge 1a, respectively. As shown in FIG. 21, the inclined faces 1g are formed respectively in ranges from middles of the rising and falling portions of the peripheral side faces of the ridges 1a, to the valley 1b, and, in the same manner as the grooves 1c, formed as faces which are alternately inclined in opposite directions for each of the valleys 1b. For each of the valleys 1b, the inclined faces are more inclined toward the center of the rotation shaft of the disk cutter 1 as being nearer to the disk face (directed to the right lower side in FIG. 21) in which the groove 1c opened in the valley 1b is formed, respectively in the falling portion of the peripheral side face of the ridge 1a which is in the front side in the rotational direction, and the rising portion of the peripheral side face of the ridge 1a which is in the rear side in the rotational direction (or in the falling and rising portions which are opposed to each other across the valley 1b), the ridge portions being adjacent to both the sides of the valley 1b. In the peripheral side face of a certain one of the ridges 1a, therefore, the inclined face 1g formed in the rising portion, and that formed in the falling portion are inclined in opposite directions, respectively.

In the embodiment, the inclined face 1g is configured by a plane enclosed by a triangle in which the vertexes are points A, B, and C shown in FIG. 21. In this case, the point A is a point where, when the distance (height) from the intermediate part of the edge of the falling portion of the peripheral side face of the ridge 1a shown in the right upper side of FIG. 21 on the side of the disk face directed to the right lower side in FIG. 21, i.e., the reference circumferential face that is a peripheral side face of the valley 1b, to the apex of the ridge 1a is indicated by H, a tangential line with a circumferential face of a radius which is larger by H/2 than the predetermined radius of the reference circumferential face, and the peripheral side face of the ridge 1a intersects the disk face. The point B is a point where the edge of the falling portion of the peripheral side face of the ridge 1a on the side of the disk face directed to the left upper side in FIG. 21 is in contact with the peripheral side face of the valley 1b. The point C is a point which is on the peripheral edge the disk face directed to the right lower side in FIG. 21, and closer to the ridge 1a along the reference circumferential face than a point O where the falling portion of the original peripheral side face of the ridge 1a is in contact with the original peripheral side face of the valley 1b. Since the point C is closer toward the ridge 1a, the inclined face 1g is inclined with respect to the falling portion of the peripheral side face of the ridge 1a.

In the above, the inclined face 1g formed in the right upper side of the valley 1b shown in FIG. 21 has been described. Also the inclined face 1g formed in the left lower side of the valley 1b shown in FIG. 21 is configured by a plane enclosed by a similar triangle, and is a face which is inclined in the same direction with respect to the peripheral side face of the ridge 1a. For another valley 1b which is adjacent to the valley 1b through the ridge 1a, and which is not shown in FIG. 21, inclined faces 1g, 1g which are inclined in opposite directions are formed.

When the metal sheet 2 is passed between disk cutter rolls using the disk cutters 1 in which the inclined faces 1g are formed, the metal sheet is vertically pressed by the inclined faces 1g of the ridges 1a of the disk cutters 1 as shown in FIG. 22, at the timing when the slits 2a are formed by the ridges 1a, whereby the wires 2b are deformed in a ridge-like shape while being twisted. The section shape is not a rectangular shape but a parallelogram shape. In each of the wires 2b, as shown in FIG. 23, the portion which is pressed by the inclined face 1g of the ridge 1a, i.e., the end portion connected to the node 2c (the dotted portion in FIG. 23) is formed with being twisted from the beginning. The twisting direction of the end portion of the wire 2b indicated by the arrow R of FIG. 23 is opposite to the direction in which the node 2c connected to the end portion is twisted during the developing process, i.e., the direction of the arrow F which has been described in conjunction with FIG. 45. The relationship in which the twisting directions of the arrows R and F are opposite to each other is applied also to the two upper wires 2b shown in FIG. 23. In the node 2c which is twisted in the direction of the arrow G in FIG. 45 during the developing process, the wires 2b connected to the node are formed with being twisted in the direction opposite to that of the arrow G.

According to the configuration, when the slits 2a are formed in the metal sheet 2, the rotary expander of the embodiment deforms the wires 2b into a ridge-like shape in a state where the end portions of each of the wires 2b are pretwisted by the inclined faces 1g formed in the peripheral side faces of the ridges 1a of the disk cutter 1. Moreover, the end portions of the wire 2b are twisted in the direction opposite to the direction in which the node 2c is twisted during the process of developing the metal sheet 2. Even when the node 2c is twisted during the developing process in which the metal sheet 2 is actually developed, therefore, the wires 2b connected to the node receive torsion stress in which the previously applied twisting is canceled. In the wires 2b, consequently, influence of torsion stress applied to the end portions can be reduced, and the torsion stress can be prevented from being concentrated into the vicinity of the apex 2e of the wire 2b.

In the embodiment, the case where the point C of the inclined face 1g is made closer to the ridge 1a along the reference circumferential face than the point O as shown in FIG. 21 has been described. Alternatively, as shown in FIG. 24, the point C may be made close toward the axis along the edge of the groove 1c, i.e., a radial direction of the disk cutter 1. In the case of FIG. 21, the peripheral side face of the valley 1b is widened by the area of the triangle BOC. When the inclined faces are configured as shown in FIG. 24, the inclined faces 1g are naturally connected to the peripheral side face of the valley 1b and the groove 1c, so that twisting applied to the end portions of the wire 2b can be smoothed. In the case of FIG. 24, however, the peripheral side face of the valley 1b is caused to extend along the side BC of the inclined face 1g by forming a tapered face in which the edge on the side of the disk face where the groove 1c is not formed coincides with the reference circumferential face and the radius is made smaller as being nearer toward the disk face where the groove 1c is formed.

Alternatively, as shown in FIG. 25, the point B of the inclined face 1g in FIG. 24 may be moved to the edge of the opening of the groove 1c along the reference circumferential face. In the alternative, although even the maximum width of the inclined face 1g is only about one half of the width of the peripheral side face of the ridge 1a, the torsion stress can be reduced even in the case where about a half portion of the width of the wire 2b is pretwisted instead of the whole width.

Since the groove 1c for forming the node 2c in the metal sheet 2 is used for preventing the slits 2a from being formed in the metal sheet 2, by means of the gap between the groove and the groove 1c of the opposed disk cutter 1, the groove 1c is not always required to be rectangular. As shown in FIG. 26, for example, the groove 1c may be formed by chamfering the peripheral side face of the valley 1b, so as to be configured by a face through which edge sides of the inclined faces 1g on both sides are connected to each other.

The peripheral side faces of the ridges 1a of the disk cutters 1 which are alternately opposed are pressed to each other through the metal sheet 2, thereby forming the slits 2a in the metal sheet 2. Therefore, it is preferable to set the angle of the edge formed by the peripheral side face of the ridge 1a and the corresponding one of the disk faces of the disk cutters 1, to be as acute as possible, and usually to 90°. When the inclined face 1g is formed in the peripheral side face of the ridge 1a, however, the edge between the inclined face 1g and the disk face inevitably has an obtuse angle. When the angle is excessively large, the metal sheet 2 cannot be surely cut and the slits 2a are not formed. Therefore, the inclination angle of the inclined face 1g must be set so as not to be excessively large. Preferably, the inclination angle with respect to the reference circumferential face is set to be equal to or smaller than 40°, so that the angle of an edge between the inclined face and the disk face can be set to 60° or more, thereby enabling the slits 2a to be surely formed in the metal sheet 2.

In order to prevent torsion stress from being concentrated into the vicinity of the apex 2e of the wire 2b, preferably, the inclined face 1g is formed with starting from a position which is as near as possible to the apex of the ridge 1a. Therefore, it is preferable to set the point A of the inclined face 1g which is nearest to the apex to a level that is at least one third of the height H of the apex. In the embodiment, the point A is located at a level that is about a half of the height H of the apex. It is a matter of course that the inclined face 1g may be formed with starting from a position which is nearer to the apex. When the inclined face 1g is formed so as to extend to a position which is very near to the apex of the ridge 1a, however, the inclined face 1g abuts against the metal sheet 2 at the timing when cutting for the slits 2a is initially formed in the metal sheet, and hence the edge with respect to the disk face has an obtuse angle, thereby causing the possibility that the cutting operation cannot be smoothly started.

In the embodiment, the case where the inclined face 1g is formed as a flat face has been described. However, the inclined face is not always necessary to be flat, as far as the face more approaches the axis of the disk cutter 1 as being nearer to the disk face on the side where the groove 1c of the adjacent valley 1b is formed, and may be formed by a curved face or a plurality of flat faces. The inclined face 1g is not required to be a triangle surrounded by three vertexes.

In the embodiment, the rotary expander in which the metal sheet 2 is passed between upper and lower or two disk cutter rolls has been described. The disk cutter rolls can be arranged in an arbitrary manner. The invention can be similarly applied also to a rotary expander in which the metal sheet 2 is passed between three or more disk cutter rolls that are opposedly arranged.

In the embodiment, the case where the metal sheet 2 is processed to produce a grid which is to be used in a battery plate of a lead storage battery has been described. The invention is not restricted to a lead storage battery, and can be applied also to a battery of any kind as far as a similar grid is used as a current collecting member of a battery plate. A grid can be produced by using a metal sheet of an appropriate material which corresponds to the kind of the battery.

EXAMPLE 3

The grids of the embodiment and the prior art example were produced from the metal sheets (lead sheet) 2 by using the disk cutter 1 which has been described in the embodiment, and the disk cutter 1 which has been described in the prior art example. The rate of rupture was investigated by observing in detail the vicinities of apexes 2e of the wires 2b after development. An active material was filled into the grids of the embodiment and the prior art example, and the grids were then cured and dried to form positive plates. The plates were incorporated into lead storage batteries (Type 55D23 of JIS) for an automobile, and a given amount of diluted sulfuric acid of a predetermined specific gravity was poured and formation was performed to complete the batteries. An overcharge test according to JIS was conducted to test the life performance, and the breakage rate of the wires 2b after the test was investigated. In all the lead storage batteries, a conventional plate was used as the negative plate, and a separator which is configured mainly by microporous polyethylene was interposed between the plates.

In the ridge 1a of the disk cutter 1 of the embodiment, the inclined face 1g was configured as a triangular flat face such as shown in FIG. 21. Grids in which the height from reference circumferential face that is a peripheral side face of the valley 1b to the inclination starting position (point A) of the inclined face 1g which is nearest to the apex is 20%, 50% (H/2), or 70% of the height H of the apex of the ridge 1a were produced. In principle, the inclination angle of the inclined face 1g with respect to the reference circumferential face was set to 30°. In grids in which the inclination starting position of the inclined face 1g is set to 70%, however, a plurality of grids were produced in a range of 10° to 50°.

Results of comparisons between the embodiment and the prior art example are shown in Table 3. In the specimen which is shown in the last row of Table 3, and in which the inclination angle of the inclined face 1g is set to 50°, a grid could not be produced, and hence it was impossible to check and test the specimen, because the edge between the inclined face 1g and the disk face of the disk cutter 1 was so obtuse that the metal sheet 2 could not be cut and the slits 2a were not formed. From this, it has been seen that it is preferable to set the inclination angle of the inclined face 1g to 40° or less.

TABLE 3

| Inclination starting position | Angle of inclined face | Rate of rupture in vicinity of apex | Life performance (prior art = 100) | Breakage rate of wires after test | Remarks |
| --- | --- | --- | --- | --- | --- |
| None | None | 40 | 100 | 40 | Prior art example |
| 20% | 30° | 30 | 115 | 30 | Example |
| 50% | 30° | 15 | 130 | 15 | Example |
| 70% | 30° | 5 | 140 | 0 | Example |
| 70% | 10° | 24 | 118 | 25 | Example |
| 70% | 20° | 15 | 129 | 12 | Example |
| 70% | 40° | 5 | 115 | 0 | Example |
| 70% | 50° | — | — | — | — |

As a result of the comparison, it has been confirmed that the rate of rupture in the vicinity of the apex 2e in all the examples is lower than that of the prior art example or 40% and all the examples are effective in suppression of occurrence of rupture. In all the examples, with respect to the life performance and the breakage rates of the wires 2b after test, the life was longer and the breakage rate was lower than those of the prior art example in accordance with the reduction of the rate of rupture. In the specimen in which the inclination starting position of the inclined face 1g was set to 20%, the difference with respect to the prior art example is relatively small, and hence it has been seen that it is preferable to set the inclination starting position to a position which is at least one third (about 33%) or higher of the height H of the apex of the ridge 1a.

As apparent from the above description, according to the grid for a battery plate of the invention and the apparatus for the grid, the wires of the metal sheet are pressed into a ridge-like shape in a twisted state by the inclined faces formed in the peripheral side faces of the ridges of the disk cutter. Therefore, concentration of torsion stress of the opposite direction in the vicinity of the apexes of the wires and generated during the developing process can be suppressed. As a result, corrosion and a crack of corrosion can be prevented from occurring in the wires of the grid, so that a failure of a battery can be suppressed from occurring and the life of a battery can be prolonged.

Embodiment (5) of the Invention

FIGS. 27 to 29 show a fifth embodiment of the invention. FIG. 27 is a longitudinal section view showing a first example of formation of a node in the metal sheet 2 by a disk cutter, FIG. 28 is a longitudinal section view showing a second example of formation of a node in the metal sheet 2 by a disk cutter, and FIG. 29 is a longitudinal section view showing a third example of formation of a node in the metal sheet 2 by a disk cutter.

Figure 27A:
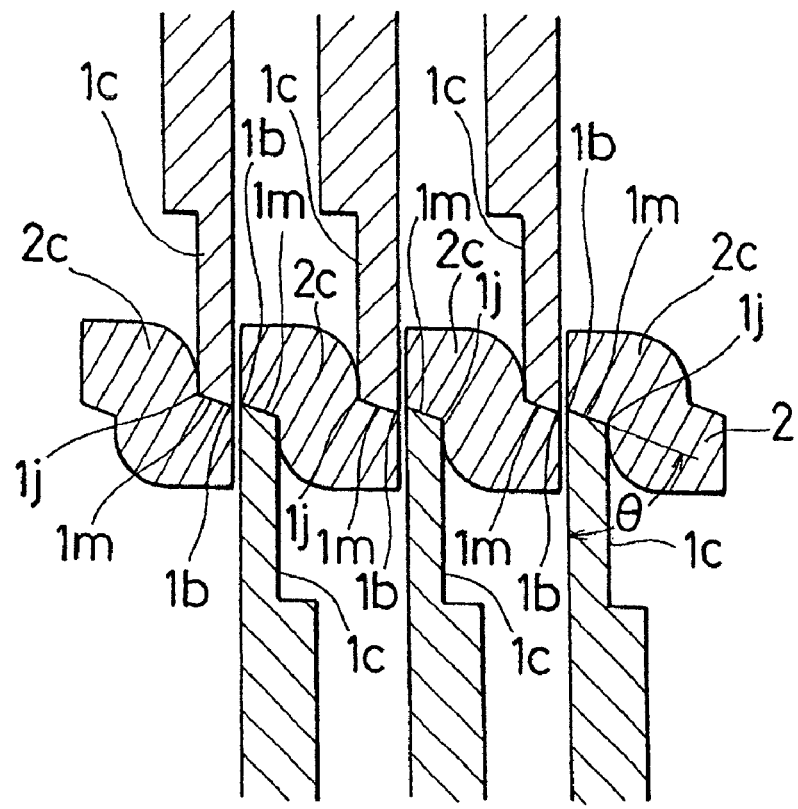
FIG. 27(a) is a schematic view showing a first example of a fifth embodiment of the invention, and showing a section shape taken along a plane passing through the disk center of a disk cutter and perpendicular to a disk face in the case where a node is formed in a metal sheet by a cutting tool.
Figure 27B:
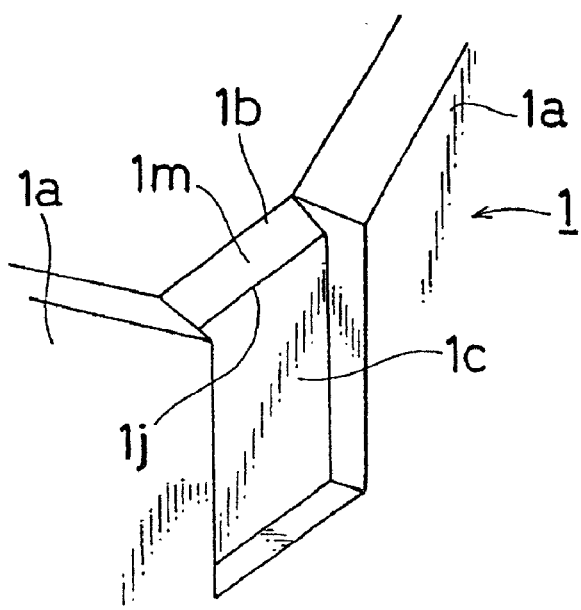
FIG. 27(b) is a partial perspective view showing the vicinity of a valley of the disk cutter of the fifth embodiment.

As shown in FIG. 27(a), two disk cutter rolls each configured by a large number of such disk cutters 1 are vertically arranged, and a lead sheet 2 is passed between the rolls, thereby forming slits 2a and the nodes 20. At this time, the upper and lower disk cutter rolls are placed respectively at levels which allow the valleys 1b of the upper and lower disk cutters 1 to slightly overlap with each other. In at least both disk faces of the peripheral side face of the disk cutter 1 which is not a ridge 1a, as shown in FIG. 27(b), a chamfered portion 1m is formed so as to be lowered toward each of the grooves 1c which are alternately disposed in the width direction. In the disk cutter 1, specifically, the ridges 1a, and the valley 1b between the ridges 1a are formed, and the chamfered portion 1m is disposed over a range from the peripheral side face of the valley 1b to the groove 1c. The chamfered portion 1m is lowered as moving from the peripheral side face of the valley 1b toward the groove 1c. A new ridgeline 1j which is formed on the side of the groove 1c does not damage the node 2c of the metal sheet 2.

Figure 28A:
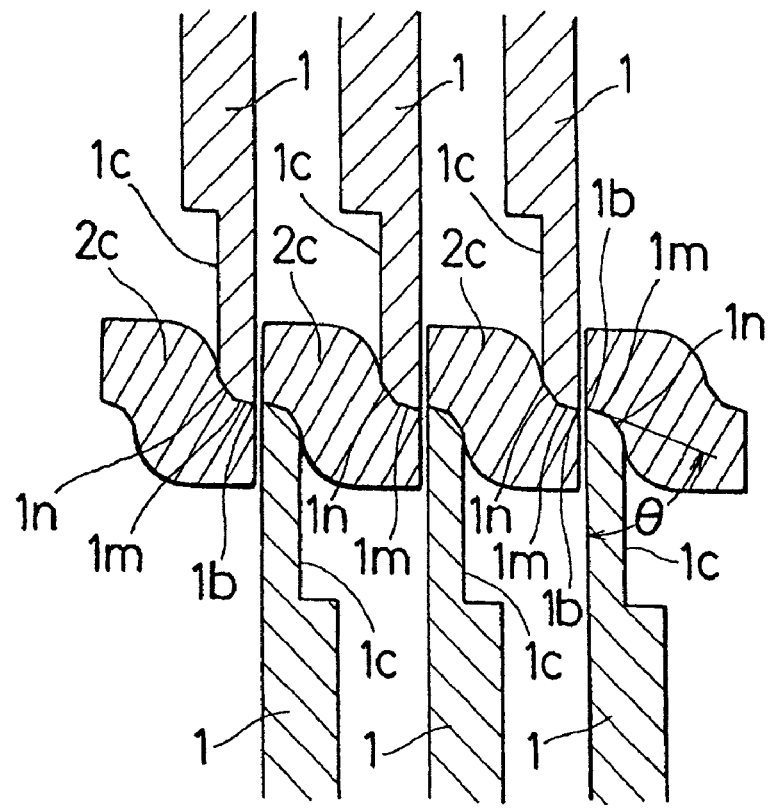
FIG. 28(a) is a schematic view showing a second example of the fifth embodiment of the invention, and showing a section shape taken along a plane passing through the disk center of a disk cutter and perpendicular to a disk face in the case where a node is formed in a metal sheet by a cutting tool.
Figure 28B:
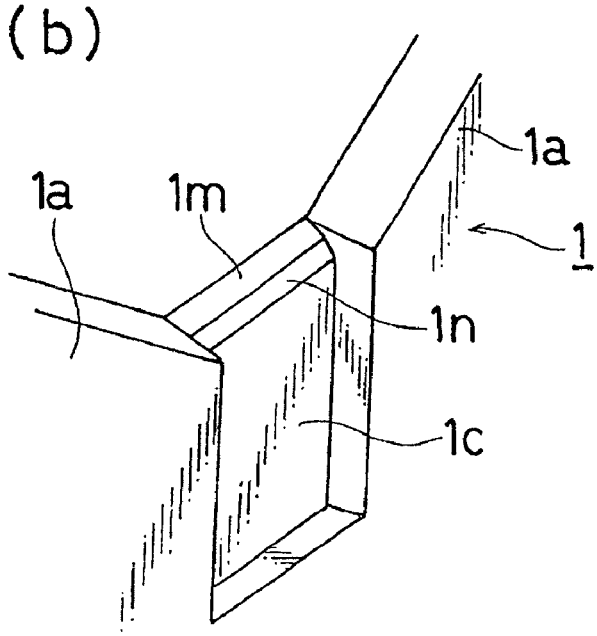
FIG. 28(b) is a partial perspective view showing the vicinity of a valley of the disk cutter of the fifth embodiment.
Figure 29A:
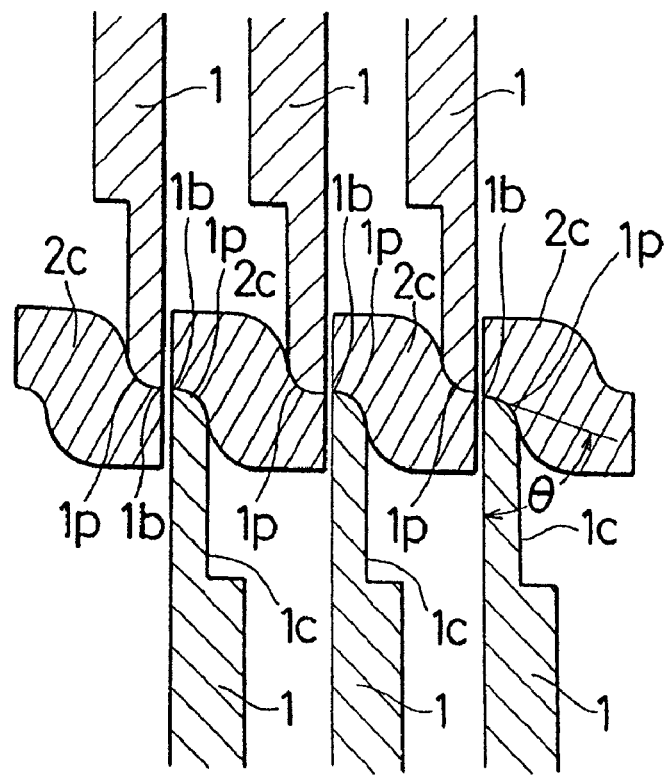
FIG. 29(a) is a schematic view showing a third example of the fifth embodiment of the invention, and showing a section shape taken along a plane passing through the disk center of a disk cutter and perpendicular to a disk face in the case where a node is formed in a metal sheet by a cutting tool.
Figure 29B:
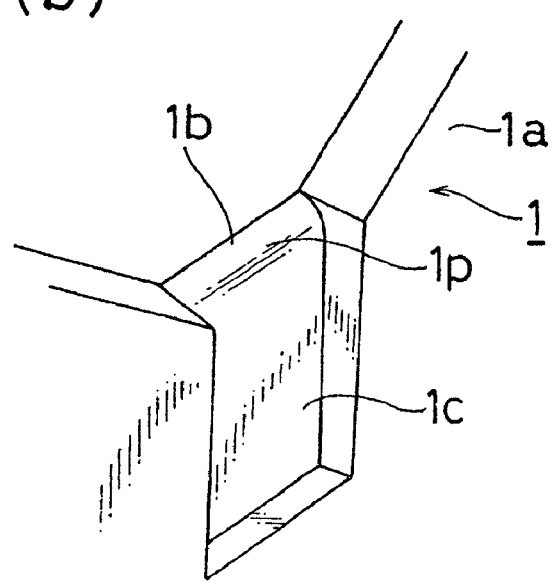
FIG. 29(b) is a partial perspective view showing the vicinity of a valley of the disk cutter of the fifth embodiment.

As shown in FIG. 28(a) and FIG. 28(b) which is a perspective view showing the vicinity of the valley 1b of the disk cutter 1, the chamfered portion 1m which is formed from the peripheral side face of the valley 1b of the disk cutter 1 to the groove 1c may be further chamfered to form a chamfered portion 1n in the ridgeline 1j between the chamfered portion 1m to the groove 1c. Alternatively, as shown in FIGS. 29(a) and 29(b), a curved face 1p may be disposed in the peripheral side face of the valley 1b. The chamfered portions 1m and 1n, or the curved face 1p is effective in improvement of the strength and suppression of local corrosion which are due to suppression of rupture of the node 2c formed in the metal sheet 2.

In the outermost peripheral side face where the groove 1c is disposed, a certain inclination with respect to the surface of the metal sheet 2 which is being passed between the rolls is provided to the peripheral side face, so that a peripheral side face which is substantially parallel to the metal sheet 2 is eliminated. As apparent from comparison between FIG. 46, and FIGS. 27 to 29, in the conventional method shown in FIG. 46, excessive stress is applied to the bent portions of the node 2c of the metal sheet 2, and, when the disk cutter 1 of the invention shown in FIGS. 27 to 29 is used, reduced stress is applied to the node 2c of the metal sheet 2. When the disk cutter 1 of the invention is used, therefore, the strength of the node 2c can be improved and local corrosion can be suppressed irrespective of the shapes of the other portions of the disk cutter 1.

EXAMPLE 4

Next, a method of producing an expand grid will be described.

A plurality of slits which are parallel to one another were formed intermittently and in a zigzag pattern along the longitudinal direction of a lead sheet 2 that is the metal sheet 2. Thereafter, the sheet was developed in the width direction to attain a predetermined dimension to form meshes, thereby producing a grid for a battery plate (see, for example, FIG. 38). An active material was filled into grids which were produced by this method, and the grids were then cured and dried to form positive plates. The positive plates, negative plates which were formed by a usual method, and separators which are configured mainly by microporous polyethylene were combined to one another to produce lead storage batteries (Type 55D23) for an automobile. Then, a given amount of diluted sulfuric acid of a predetermined specific gravity was poured into the batteries, and formation was performed to complete the batteries.

Batteries having grids that were produced by using the disk cutters 1 in which the angle θ (FIG. 4) formed by the peripheral side face not constituting the ridge 1a and the disk face 3 is changed in a range of 90 to 60°, and those having grids that were produced by using the disk cutters 1 in which the portion between the peripheral side face and the disk face 3 where the groove 4 is formed is chamfered and various kinds of flat or curved faces are formed were subjected to a light-load life test according to JIS standard (D 5301) in a gaseous phase of 75° C. After the life test was ended, the batteries were disassembled, and the rate of crack of corrosion due to rupture in the node 2c was investigated (Table 4).

TABLE 4

Figure 46A:
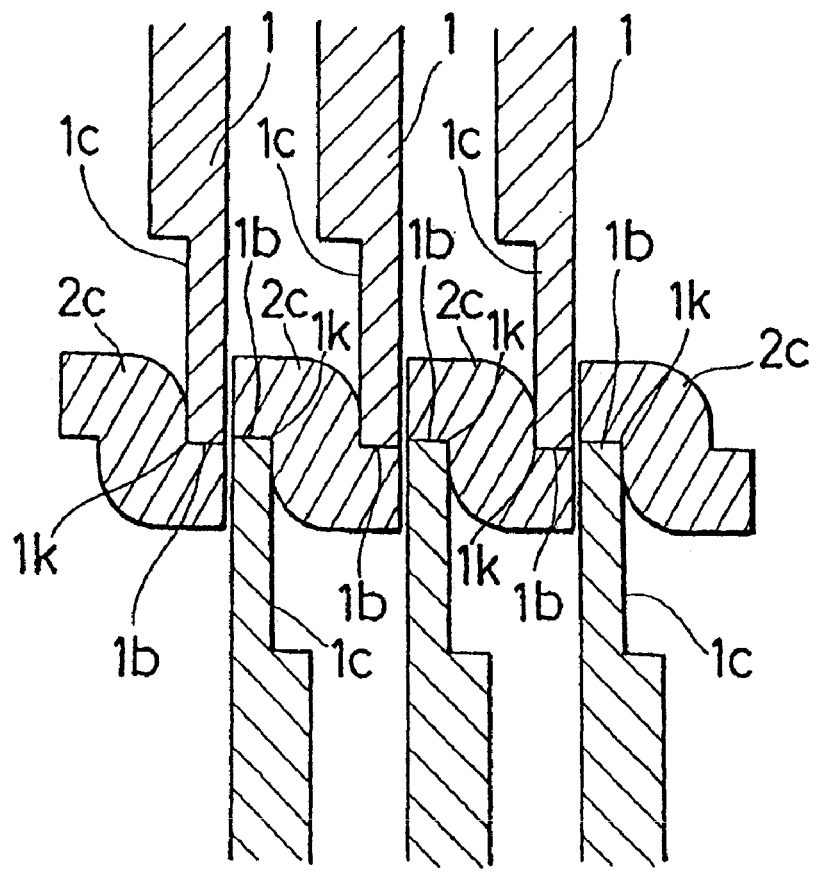
FIG. 46(a) is a schematic view showing a prior art example, and showing a section shape taken along a plane passing through the disk center of a disk cutter and perpendicular to a disk face in the case where a node is formed in a metal sheet by a cutting tool.
Figure 46B:
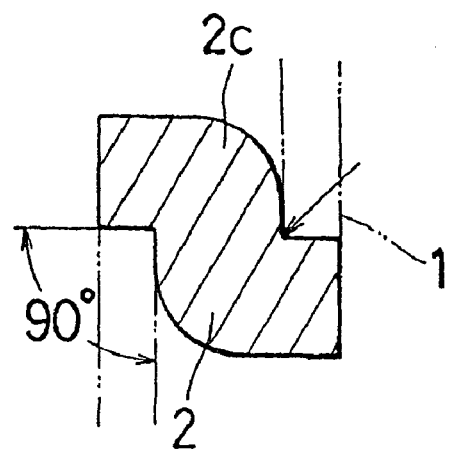
FIG. 46(b) is a partial section view showing the node formed by the cutter.
Figure 47A:
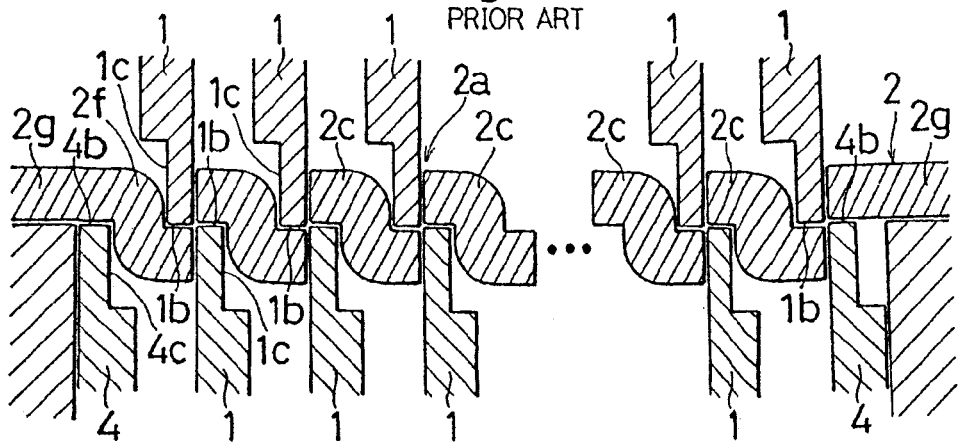
FIG. 47 is a partial enlarged front longitudinal section view showing a prior art example, and showing a process of forming slits in a metal sheet by disk cutters of upper and lower disk cutter rolls.
Figure 47B:
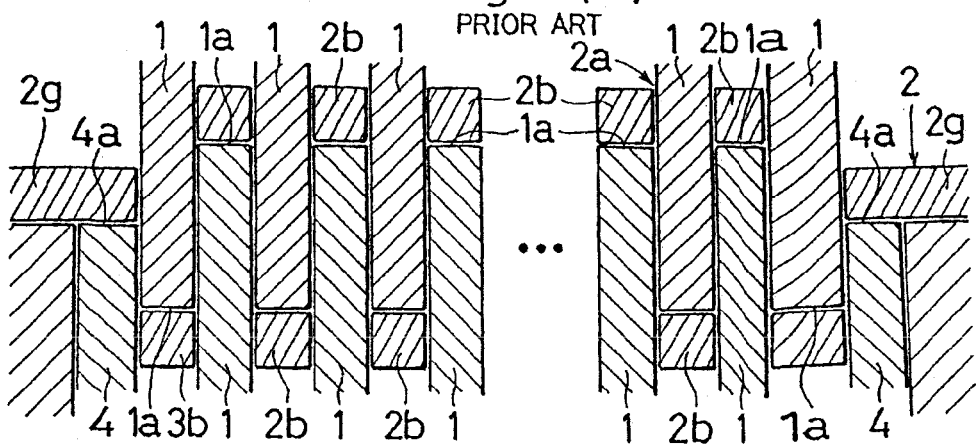
Figure 47C:
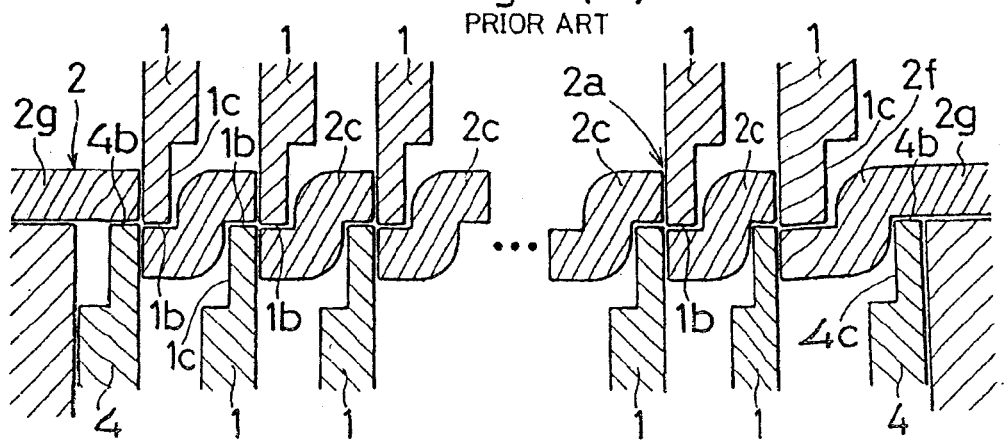
Figure 48:
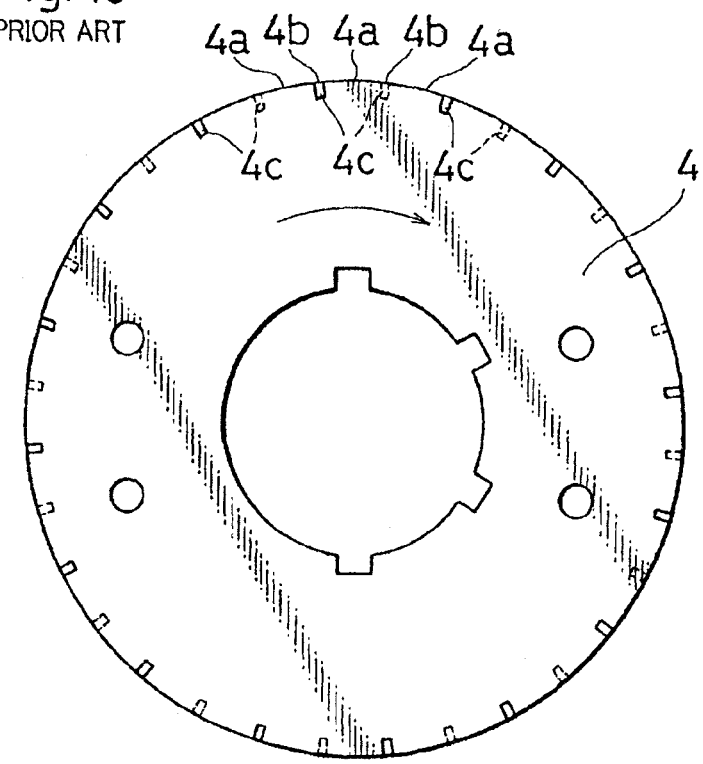
FIG. 48 is a side view showing a prior art example, and showing the configuration of an endmost disk cutter.
Figure 49:
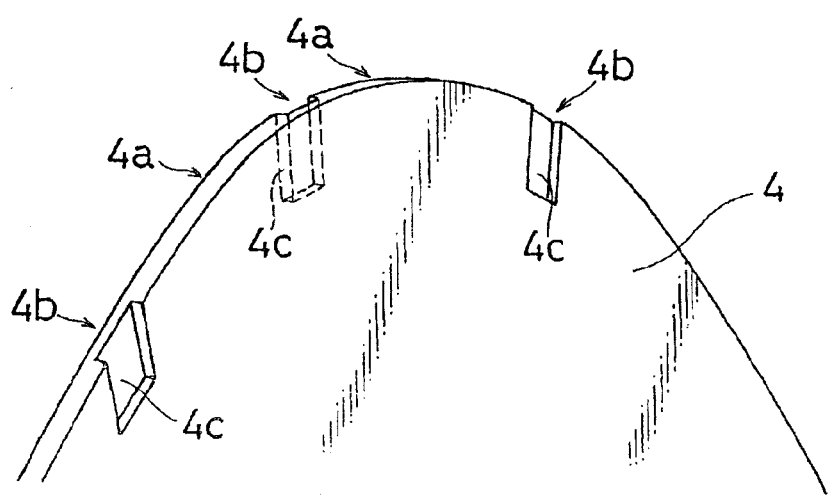
FIG. 49 is a partial enlarged perspective view showing a prior art example, and showing the configuration of the endmost disk cutter.
Figure 50:
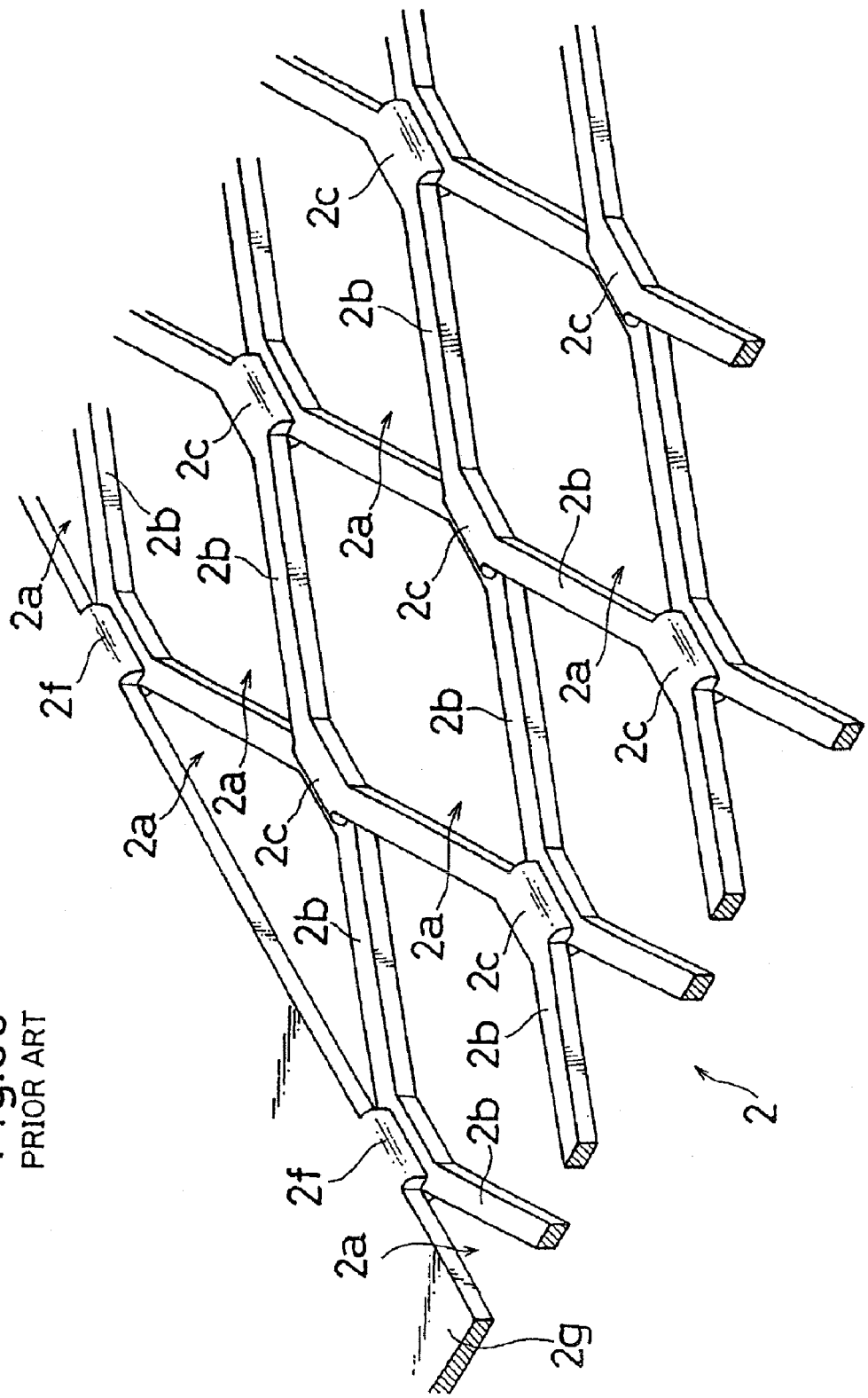
FIG. 50 is a partial enlarged perspective view showing a prior art example, and showing the vicinity of an endmost node in a grid which is obtained by developing slits formed in a metal sheet.

| No. | Section view | Angle θ | Percentage of crack in node (%) | Life performance (100 in No. 1) | Remarks |
|---|---|---|---|---|---|
| 1 | FIG. 46 | 90 | 5.0 | 100 | Prior art example |
| 2 | FIG. 27 | 85 | 4.6 | 105 | Example |
| 3 | FIG. 27 | 75 | 3.2 | 113 | Example |
| 4 | FIG. 27 | 65 | 2.8 | 122 | Example |
| 5 | FIG. 27 | 60 | 2.8 | 123 | Example |
| 6 | FIG. 28 | 75 | 2.2 | 135 | Example |
| 7 | FIG. 29 | 75 | 2.1 | 143 | Example |

From the results shown in Table 4, is has been seen that, in expand grids produced by using the disk cutter according to the invention, the percentage of crack in nodes is suppressed as compared with the prior art example or No. 1 in which the flat portion forms an angle of 90°. Furthermore, it has been seen that, in accordance with this, also the SAE life performance at 75° C. is improved by forming an angle.

Embodiment (6) of the Invention

Hereinafter, a sixth embodiment of the invention will be described with reference to the accompanying drawings.

Figure 30A:
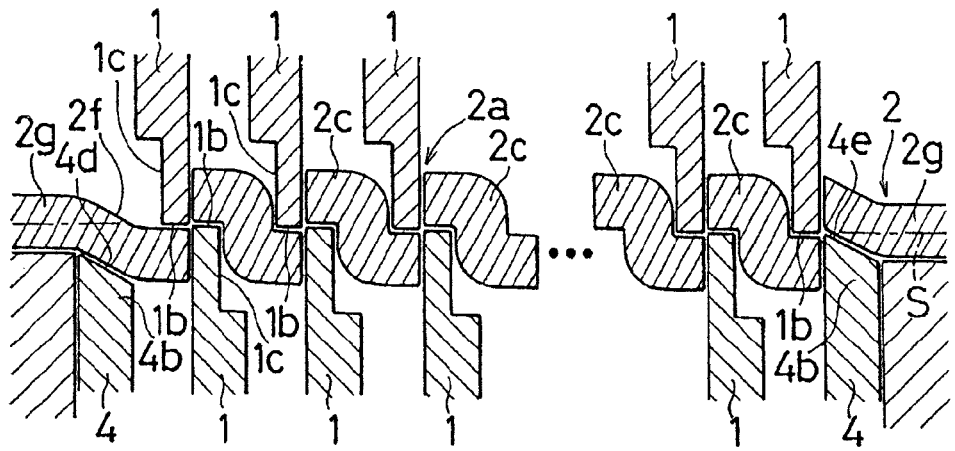
FIG. 30 is a partial enlarged front longitudinal section view showing a sixth embodiment of the invention, and showing a process of forming slits in a metal sheet by disk cutters of upper and lower disk cutter rolls.
Figure 30B:
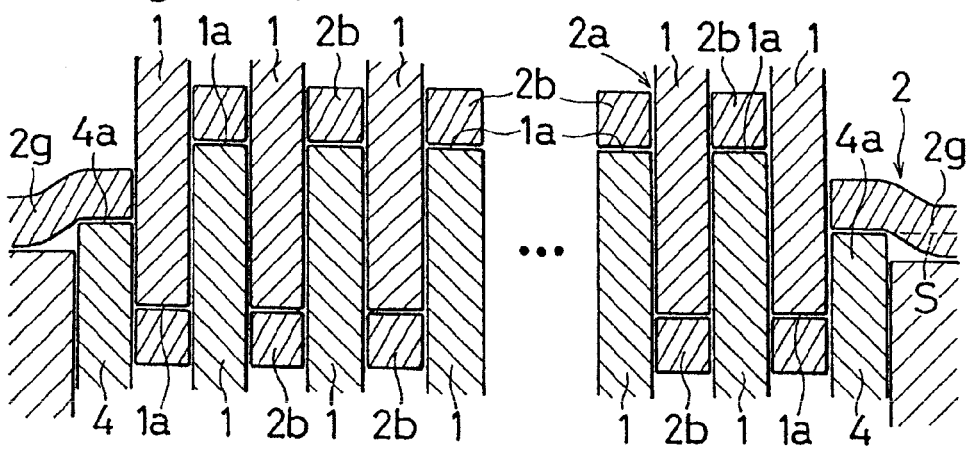
Figure 30C:
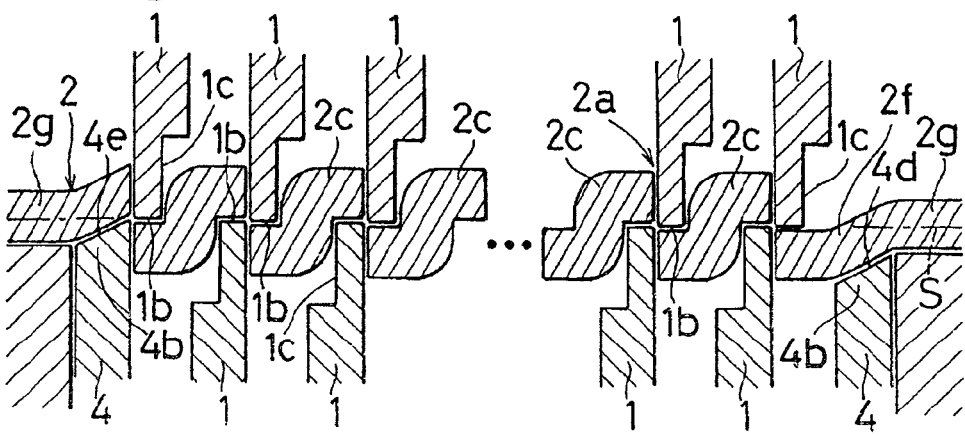
Figure 31:
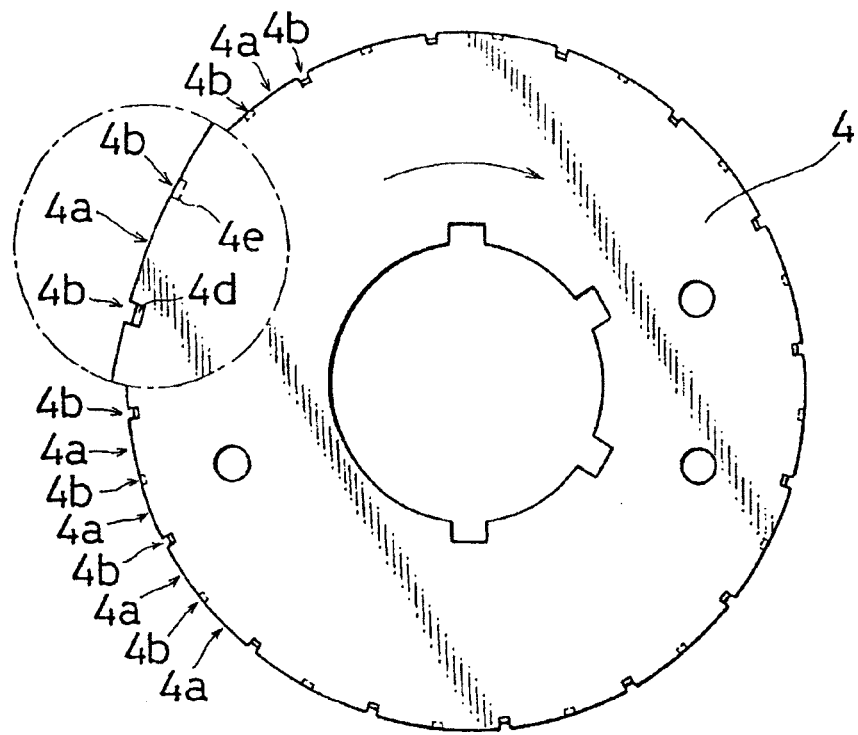
FIG. 31 is a side view showing the sixth embodiment of the invention, and showing the configuration of an endmost disk cutter.
Figure 32:
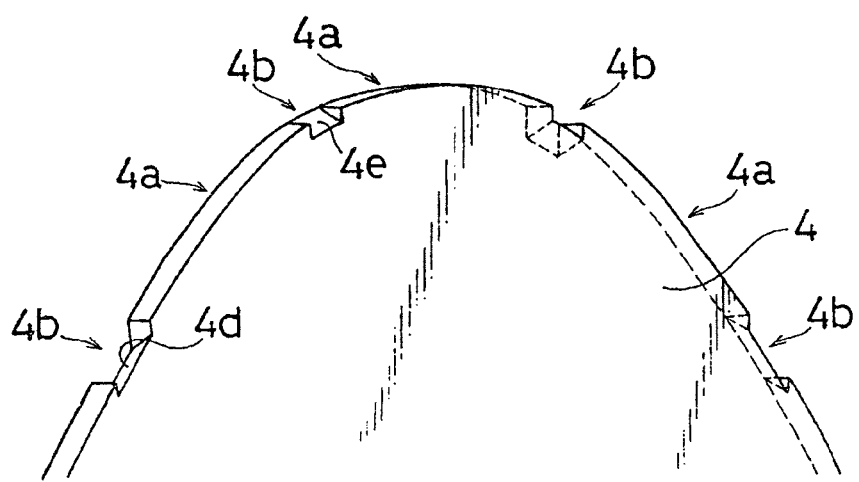
FIG. 32 is a partial enlarged perspective view showing the sixth embodiment of the invention, and showing the configuration of the endmost disk cutter.
Figure 33:
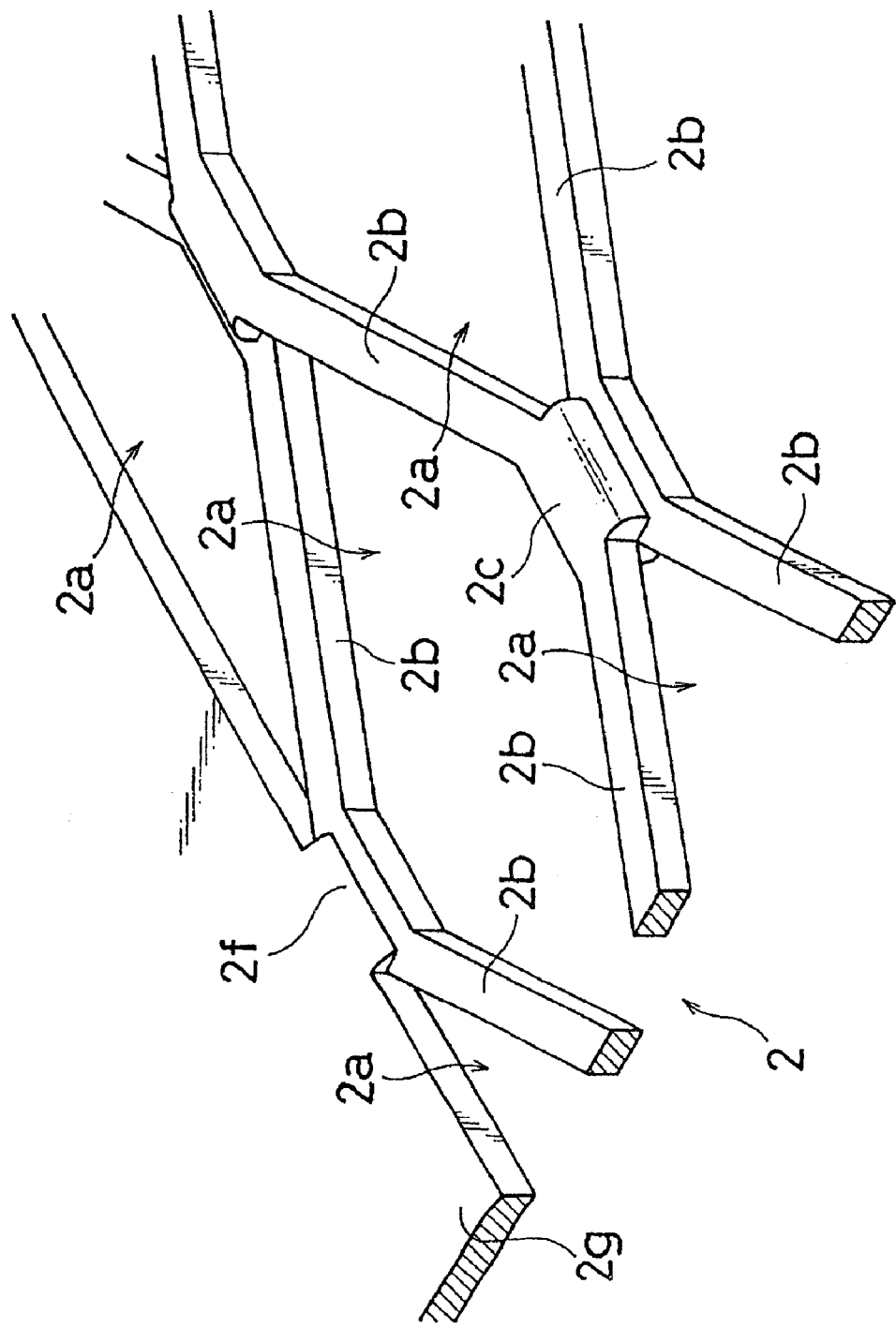
FIG. 33 is a partial enlarged perspective view showing the sixth embodiment of the invention, and showing the vicinity of an endmost node in a grid which is obtained by developing slits formed in a metal sheet.
Figure 34:
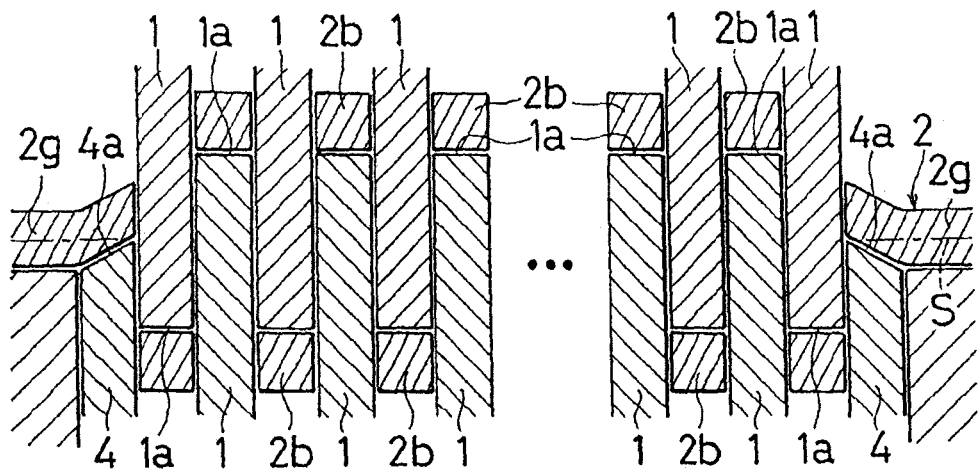
FIG. 34 is a partial enlarged front longitudinal section view showing the sixth embodiment of the invention, and showing a process of forming slits in a metal sheet by using an endmost disk cutter in which inclined faces are formed in peripheral side faces of ridges.
Figure 35:
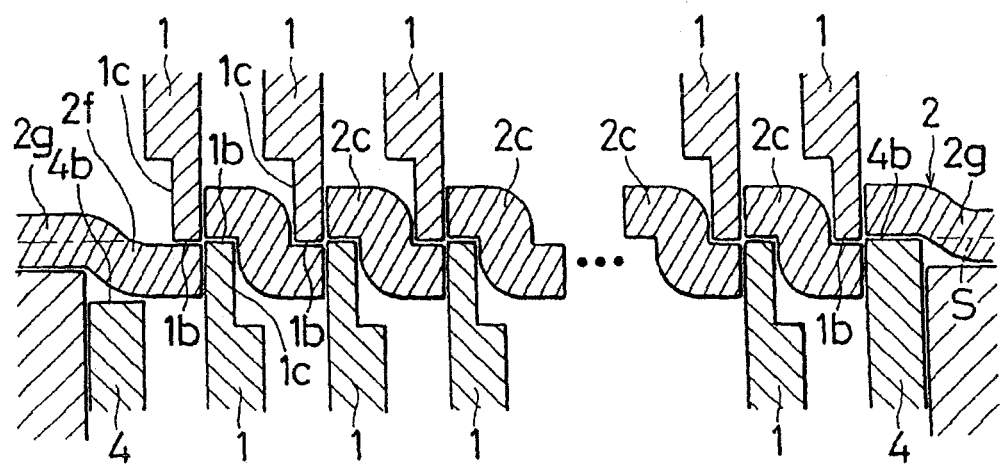
FIG. 35 is a partial enlarged front longitudinal section view showing the sixth embodiment of the invention, and showing a process of forming slits in a metal sheet by using an endmost disk cutter in which peripheral side faces of valleys are configured as a circumferential face.
Figure 36:
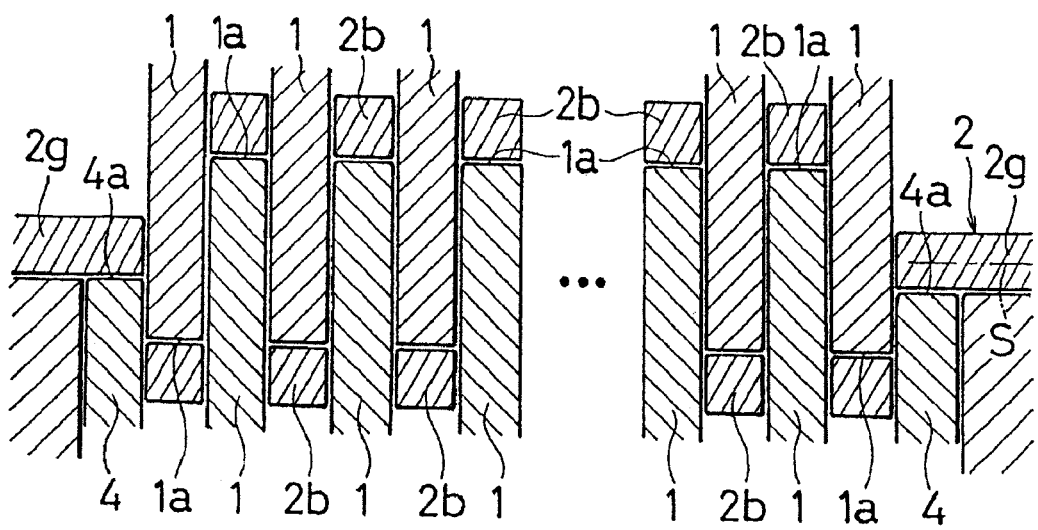
FIG. 36 is a partial enlarged front longitudinal section view showing the sixth embodiment of the invention, and showing a process of forming slits in a metal sheet by using an endmost disk cutter in which peripheral side faces of valleys are recessed.
Figure 37:
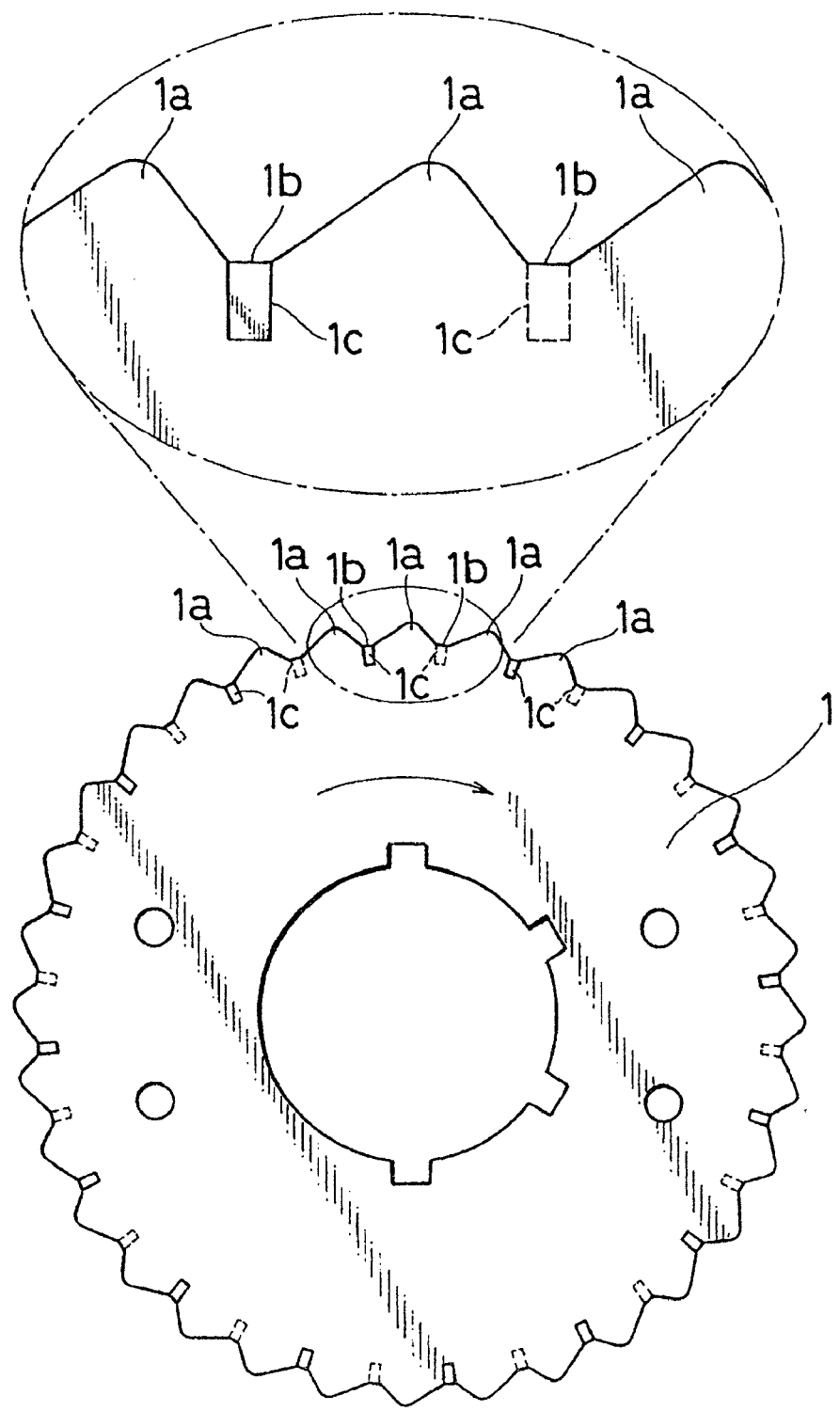
FIG. 37 is a front view showing a prior art example, and showing the configuration of a disk cutter and a peripheral edge of the disk cutter.

FIGS. 30 to 36 show the sixth embodiment of the invention. FIG. 30 is a partial enlarged front longitudinal section view showing a process of forming slits in a metal sheet (including a lead sheet) by disk cutters of upper and lower disk cutter rolls, FIG. 31 is a side view showing the configuration of an endmost disk cutter, FIG. 32 is a partial enlarged perspective view showing the configuration of the endmost disk cutter, FIG. 33 is a partial enlarged perspective view showing the vicinity of an endmost node in a grid which is obtained by developing slits formed in a metal sheet, FIG. 34 is a partial enlarged front longitudinal section view showing a process of forming slits in a metal sheet by using an endmost disk cutter in which inclined faces are formed in peripheral side faces of ridges, FIG. 35 is a partial enlarged front longitudinal section view showing a process of forming slits in a metal sheet by using an endmost disk cutter in which peripheral side faces of valleys are configured as a circumferential face, and FIG. 36 is a partial enlarged front longitudinal section view showing a process of forming slits in a metal sheet by using an endmost disk cutter in which peripheral side faces of valleys are recessed.

In a manner similar to the prior art example, also the embodiment relates to a rotary expander for producing a grid for a battery plate of a lead storage battery. In the rotary expander, as shown in FIG. 38, the metal sheet 2 is passed between the upper and lower disk cutter rolls to form zigzag slits 2a in the metal sheet 2. The upper disk cutter roll is configured in the same manner as the prior art example. The lower disk cutter roll has the same configuration as the prior art in which the endmost disk cutters 4 are disposed at both the ends of a large number of the disk cutters 1, but the configuration of the endmost disk cutters 4 is different from that of the prior art example.

In the same manner as the prior art example, also in each of the endmost disk cutters 4 in the embodiment, as shown in FIGS. 31 and 32, the ridges 4a and the valleys 4b are alternately arranged in the peripheral edge. However, the ridges 4a and the valleys 4b in the endmost disk cutter 4 show the peripheral edge corresponding to the ridges 1a and the valleys 1b in the disk cutter 1 placed in the same disk cutter roll, and do not always have a ridge-like shape or a valley-like shape. Specifically, a peripheral side face configured by a reference circumferential face of a predetermined radius and centered at the axis of the endmost disk cutter 4 is formed in the ridge 4a, and the valley 4b is not formed as a concave portion between the ridges 4a. Unlike the prior art example, the groove 4c is not formed in each of the valleys 4b, an inward inclined face 4d which is a peripheral side face recessed toward the center from the reference circumferential face, and which is inward inclined is formed in each of the valleys 4b (endmost node forming valleys) on one side which are alternately arranged, and an outward inclined face 4e which is outward inclined is formed in each of the valleys 4b on the other side. The peripheral side face of the valley 4b on the one side forms the inward inclined face 4d configured by a part of a tapered face wherein the portion contacting with the outer disk face (the rear face in FIG. 31, and the right front face in FIG. 32) of the endmost disk cutter 4 coincides with a circumferential face which is centered at the axis of the endmost disk cutter 4, and in which the radius is smaller than the predetermined radius of the reference circumferential face by 50% of the thickness of the metal sheet 2. The radius of the tapered face is smaller as further moving from the portion toward the inner disk face (the front face in FIG. 31, and the left rear face in FIG. 32). In the valley 4b on the one side, a peripheral side face that is recessed by one step from the ridges 4a which are adjacent on both the sides, and in which a peripheral side face is configured by the reference circumferential face is formed, and the peripheral side face is configured by the inward inclined face 4d which is more inclined toward the center as being nearer the inner disk face of the endmost disk cutter 4. The inward inclined face 4d is not always required to be a part of a tapered face, and may be a flat face or a curved face of another kind depending on the circumstances of the process or the like, as far as the face is recessed from the peripheral side face of the ridge 4a and inward inclined.

Each of the valleys 4b (the valleys other than the endmost node forming valleys) on the other side of the endmost disk cutter 4 forms the outward inclined face 4e configured by a part of a tapered face wherein the portion contacting with the inner disk face of the endmost disk cutter 4 coincides with the reference circumferential face of the predetermined radius, and in which the radius is smaller than the predetermined radius as further moving from the portion toward the outer disk face of the endmost disk cutter 4. Therefore, the valley 4b on the other side has a shape where the outermost diameter is equal to that of the ridges 4a which are adjacent on both the sides, and in which a peripheral side face configured by the reference circumferential face is formed, and the outward inclined face 4e is formed by obliquely cutting away in the outer disk face. Also the outward inclined face 4e is not always required to be a part of a tapered face, and may be a flat face or a curved face of another kind depending on the circumstances of the process or the like, as far as the face is more inclined toward the center than the peripheral side face of the predetermined radius as being nearer to the outer disk face.

The thus configured endmost disk cutters 4 are placed at the ends of the lower disk cutter roll so as to be outward juxtaposed with the usual disk cutters 1 at the ends of the upper disk cutter roll, respectively. The phase in the rotational direction is adjusted so that the valley 4b which is an endmost node forming valley of the endmost disk cutter 4 is opposed at the upper end via the metal sheet 2 to the valley 1b of the disk cutter 1 of the upper disk cutter roll in which the groove 1c is formed in the opposed face. The metal sheet 2 is transported so as to be passed between the upper and lower disk cutter rolls. At this time, conventionally, the metal sheet 2 is transported with being placed on the transportation face which coincides with the cutting plane S between the upper and lower disk cutter rolls. By contrast, in the embodiment, the transportation face is set to be lower than the cutting plane S by 50% of the thickness of the metal sheet 2. Conventionally, the cutting plane S of the upper and lower disk cutter rolls is set so as to coincide with the transportation face for the metal sheet 2, i.e., the lower face of the metal sheet 2. By contrast, in the embodiment, the cutting plane S of the upper and lower disk cutter rolls is set so as to coincide with the middle portion of the thickness of the metal sheet 2 transported on the transportation face. The cutting plane S is a plane in which the distances from the axes of the upper and lower disk cutter rolls are equal to each other. The predetermined radius of the reference circumferential face constituting the peripheral side face of the valley 1b of each of the upper and lower disk cutters 1 is slightly larger than the distance from the axis to the cutting plane S. When the peripheral side face of the valley 1b of the upper disk cutter 1 is at the lower end, the peripheral side face slightly downward exceeds the cutting plane S, and the peripheral side face of the valley 1b of the lower disk cutter 1, that of the ridge 4a of the endmost disk cutter 4, and the outermost peripheral end of the peripheral side face of the valleys 4b of the endmost disk cutter 4 other than the endmost node forming valleys slightly upward exceed the cutting plane S.

When the metal sheet 2 is passed between the upper and lower disk cutter rolls, in the case where the valleys 1b of the upper and lower disk cutters 1 overlap with each other in the cutting plane S, as shown in FIGS. 30(a) and 30(c), in the portions of the upper and lower adjacent disk cutters 1 where the grooves 1c face each other in opposite directions, the metal sheet 2 is cut so that the slits 2a are formed, and, in the portions where the grooves 1c face each other, the metal sheet 2 is not cut and the nodes 2c are formed. In the case where the valley 4b of the endmost disk cutter 4 is an endmost node forming valley, i.e., the valley faces the groove 1c of the adjacent upper disk cutter 1 (the left end in FIG. 30(a), and the right end in FIG. 30(c)), the endmost node 2f connected to the frame portion 2g of the metal sheet 2 is formed. In the endmost node 2f, one end in the width direction of the metal sheet 2 (the left one in FIG. 30(a), and the right one in FIG. 30(c)) is directly connected to the frame portion 2g, and the other end is cut by the valley 1b of the extreme end disk cutter 1 in the upper disk cutter roll, and also by the valley 1b of the extreme end disk cutter 1 in the lower disk cutter roll excluding the endmost disk cutter 4. The other end is pressed substantially to the cutting plane S by the valley 1b of the upper disk cutter 1. In the metal sheet 2 which is transported on the transportation face, therefore, the other end of the endmost node 2f is deformed with being downward pressed by 50% of the sheet thickness. By contrast, in the same manner as the prior art, in the usual node 2c, the one and other ends are vertically pressed while exceeding the same cutting plane S, and hence deformation of upward and downward directions and 100% or more of the sheet thickness occurs. In the endmost nodes 2f, moreover, the portion which is above the valley 4b of the endmost disk cutter 4 is gently bent from the transportation face along the inward inclined face 4d, and hence the other end is further gently deformed.

In the case where the valley 4b of the endmost disk cutter 4 is not an endmost node forming valley, i.e., the valley faces the groove 1c of the valley 1b of the adjacent upper disk cutter 1 (the right end in FIG. 30(a), and the left end in FIG. 30(c)), the end of the frame portion 2g of the metal sheet 2 is cut by means of the valley 1b of the extreme end disk cutter 1 in the upper disk cutter roll. In the end of the frame portion 2g, moreover, the portion which is above the valley 4b of the endmost disk cutter 4 is gently bent from the transportation face along the outward inclined face 4e.

In the case where the ridges 1a of the upper and lower disk cutters 1 overlap with each other, as shown in FIG. 30(b), the metal sheet 2 is cut by the adjacent upper and lower disk cutters 1 to form the slits 2a, and the wires 2b between the slits 2a are vertically pressed by the ridges 1a of the disk cutters 1. In the same manner as the prior art, the wires 2b are pressed in a vertical ridge-like shape along the transportation direction of the metal sheet 2. The metal sheet 2 above the ridge 4a of the endmost disk cutter 4 is cut by the upper disk cutter 1 which is inward adjacent, to be formed as an end of the frame portion 2g, and upward pressed by the ridge 4a to the cutting plane S by 50% of the sheet thickness.

The metal sheet 2 in which the many slits 2a are formed as described above is stretched toward both the sides in the width direction in the subsequent step of the rotary expander. As a result, as shown in FIG. 33, the slits 2a are widened so as to form meshes, whereby a lattice-like grid is formed in which the nodes 2c and the endmost nodes 2f are connected to one another by four wires 2b that are obliquely drawn out. In the same manner as FIG. 50, also in FIG. 33, twist of the node 2c and the wire 2b is omitted and the grid is diagrammatically shown.

According to the configuration, the vertical deformation of the endmost nodes 2f in the metal sheet 2 is about a half of the sheet thickness. Therefore, concentration of stress in the endmost nodes 2f is reduced. Even after the wire 2b is obliquely pulled as a result of development, corrosion or heat generation hardly occurs in the endmost nodes 2f, and there is little chance of breakage of the wire 2b as compared with the usual node 2c. Since the wire 2b which is closest to the frame portions 2g of the metal sheet 2 is hardly broken, it is possible to surely prevent the capacity of a lead storage battery from being largely reduced.

In the embodiment, the case where the outermost radius of the valley 1b that is the endmost node forming valley is smaller than the predetermined radius by 50% of the thickness of the metal sheet 2 has been described. However, this difference is not restricted to 50% of the sheet thickness as far as the outermost radius is smaller than the predetermined radius. As the degree by which the outermost radius is reduced from the predetermined radius is smaller, the amount of the vertical deformation of the endmost nodes 2f is larger. By contrast, when the degree by which the outermost radius is smaller than the predetermined radius is large, the vertical level difference with respect to the position where the metal sheet 2 is cut in the valleys 1b other than the endmost node forming valleys becomes excessively large. When the outermost radius is smaller than the predetermined radius by 100% or more of the sheet thickness, the peripheral side face of the valley 1b that is the endmost node forming valley cannot support the endmost node 2f of the metal sheet 2. Therefore, it is preferable to set the outermost radius of the valley 1b that is the endmost node forming valley, to be smaller than the predetermined radius by a degree in a range from 30% or more to 70% or less of the thickness of the metal sheet 2.

In the embodiment, the case where the peripheral side face of the ridge 4a of the endmost disk cutter 4 is used as the reference circumferential face has been described. Alternatively, as shown in FIG. 34, the peripheral side face of the ridge 4a may be formed as an inclined face similar to the outward inclined face 4e of the valley 4b other than the endmost node forming valleys. In the alternative, the peripheral side faces of the ridge 4a of the endmost disk cutter 4 and the valley 4b other than the endmost node forming valleys constitute the same inclined face, and the inward inclined face 4d which is inclined in the opposite direction is formed only in the peripheral side face of the valley 4b that is the endmost node forming valley.

In the embodiment, the case where the inward inclined face 4d and the outward inclined face 4e are formed in the peripheral side faces of the valleys 4b of the endmost disk cutter 4 has been described. Alternatively, as shown in FIG. 35, each of the peripheral side faces of the valleys 4b may be configured by a circumferential face. In FIG. 35, the peripheral side face of the valley 4b (the left end in FIG. 35) that is the endmost node forming valley is configured by a circumferential face of a radius which is smaller than the predetermined radius by 100% of the sheet thickness, and the peripheral side face of the valley 4b (the right end in FIG. 35) other than the endmost node forming valleys is the reference circumferential face of the predetermined radius. For example, the peripheral side face of the valley 4b that is the endmost node forming valley may be configured by a circumferential face of a radius which is smaller than the predetermined radius of the reference circumferential face by 50% of the sheet thickness. In this case, the endmost node 2f is abruptly changed in a small range as compared with the case where the inward inclined face 4d is formed as in the embodiment. Although the amount of vertical deformation of the endmost node 2f is identical, the node is abruptly changed in a smaller range in the axial direction of the disk cutter roll. In the embodiment, the groove 4c is not formed in the endmost disk cutter 4. In the case where the groove 4c is formed also in the endmost disk cutter 4 as in the prior art, the inner side of the peripheral side face of the valley 4b stepwise sinks. Even when the peripheral side face is configured by a circumferential face of a radius which is smaller than the predetermined radius of the reference circumferential face by 50% of the sheet thickness, therefore, the endmost node 2f is not abruptly deformed. Namely, the step due to the groove 4c allows the metal sheet 2 to be gently deformed, in the same manner as the inward inclined face 4d and the outward inclined face 4e in the valleys 4b in the embodiment.

As described above, the peripheral side face of the valley 4b that is the endmost node forming valley in the endmost disk cutter 4 is requested only to have the outermost radius which is smaller than the predetermined radius, and not required to be a circumferential face. The peripheral side face may be a flat face which extends substantially along the circumferential face, a tapered face as in the embodiment, or a flat inclined face which extends substantially along the tapered face. Alternatively, the peripheral side face may have a step-like shape as in the case where the groove 4c is formed, or may be an arbitrary curved face or a face of another kind. By contrast, in the valley 4b other than the endmost node forming valleys, in order to cut the metal sheet 2 in combination with the valley 1b of the upper disk cutter 1, at least the outer radius of the inner end must be larger than the predetermined radius and exceed the cutting plane S. As far as the conditions are satisfied, the valley 4b other than the endmost node forming valleys may be configured by any kind of face.

In the embodiment, the case where the peripheral side face of the ridge 4a of the endmost disk cutter 4 is the reference circumferential face of the predetermined radius has been described. Alternatively, as shown in FIG. 36, the peripheral side face of the ridge 4a may be configured by a circumferential face of a radius which is smaller than the predetermined radius by 50% of the sheet thickness. In the alternative, the peripheral side face of the ridge 4a has a radius which is equal to the outermost radius of the outer end of the inward inclined face 4d of the valley 4b that is the endmost node forming valley in the embodiment. Also the ridge 4a must cut the metal sheet 2 in combination with the ridge 1a of the upper disk cutter 1. Since the ridge 1a of the upper disk cutter 1 downward protrudes in a ridge-like shape, the peripheral side face of the ridge 4a of the lower disk cutter 1 can be formed as such a circumferential face of a radius which is smaller than the predetermined radius. However, the amount of the downward protrusion in both the basal areas of the ridge 1a of the upper disk cutter 1 is small, and hence there arises the possibility that, in the areas, the radius of the peripheral side face of the ridge 4a must be increased in order to cut the metal sheet 2.

In the embodiment, the case where the endmost disk cutters 4 are placed respectively at both the ends of the lower disk cutter roll has been described. Alternatively, one or both of the endmost disk cutters 4 may be placed in one or both ends of the upper disk cutter roll. Two or more paired disk cutter rolls may be used. For example, the metal sheet 2 can be passed through an arrangement of three disk cutter rolls.

In the embodiment, the case where the wires 2b connected to the endmost nodes 2f in the metal sheet 2, and those connected to the other nodes 2c are formed so as to have the same thickness has been described. Alternatively, the wires 2b connected to the endmost nodes 2f may be formed so as to be particularly thicker, so that the wires 2b are more hardly broken.

In the embodiment, the case where the metal sheet 2 is processed to produce a grid which is to be used in a battery plate of a lead storage battery has been described. The invention is not restricted to a lead storage battery, and can be applied also to a battery of any kind as far as a similar grid is used as a current collecting member of a battery plate. A grid can be produced by using a metal sheet of an appropriate material which corresponds to the kind of the battery.

EXAMPLE 5

By using rotary expanders in which the endmost disk cutters 4 of the embodiment, or the endmost disk cutter 4 of the prior art example are placed at the ends of the lower disk cutter roll, the slits 2a were formed in the metal sheets 2, comparisons were then conducted. Results of the comparisons are shown in Table 5

TABLE 5

| Recess in valley (%) | Inclined face | Ratio of sheet thickness after slitting to original sheet thickness (%) | Life performance (prior art = 100) | Breakage rate of endmost node after corrosion test (rate of crack) (%) | Remarks |
|---|---|---|---|---|---|
| 0 | None | 60 | 100 | 42 | Prior art example |
| 10 | None | 69 | 103 | 35 | Example |
| 30 | None | 80 | 136 | 12 | Example |
| 50 | None | 90 | 152 | 0 | Example |
| 70 | None | 83 | 141 | 13 | Example |
| 100 | None | 63 | 110 | 37 | Example |
| 50 | Formed | 93 | 165 | 0 | Example |

As the metal sheet 2, a lead sheet of a thickness of 1.0 mm was used. The endmost disk cutters 4 configured in the following manner were used. In the prior art example, the peripheral side face of the valley 4b coincides with the reference circumferential face of the predetermined radius (namely, in the prior art example, the valley 4b is recessed by 0% of the thickness of the lead sheet 2). In the examples, the peripheral side face of the valley 4b is configured by a circumferential face which is recessed from the reference circumferential face of the predetermined radius by 10% (0.1 mm), 30% (0.3 mm), 50% (0.5 mm), 70% (0.7 mm), or 100% (1.0 mm) of the thickness of the lead sheet 2. In the example, the outermost end of the peripheral side face of the valley 4b is recessed by 50% of the thickness of the lead sheet 2, and the inward inclined face 4d of 30° is formed in the peripheral side face. The interval distance between the upper and lower disk cutter rolls was fixed.

In each of the lead sheets 2 in which the slits 2a were formed by the prior art example and the examples, after development to a grid, the thickness of the thinnest part in the endmost node 2f was measured, and the ratio of the sheet thickness to the original thickness of the lead sheet 2 was calculated. An active material was filled into the grids, and the grids were then cured and dried to form positive plates. The plates were incorporated into lead storage batteries (Type 55D23 of JIS). An overcharge test according to JIS was conducted to test the life performance, and the breakage rate of the wires 2b after the test was investigated. In all the lead storage batteries, a conventional plate was used as the negative plate, and a separator which is configured mainly by macroporous polyethylene was interposed between the plates.

As a result of the comparison test, it has been confirmed that, in all of the grids produced by the examples, the sheet thickness ratio of the endmost node 2f is larger than that of the prior art example, and elongation of the lead sheet 2 is suppressed. It has been confirmed also that life performance of lead storage batteries using the grids is improved and the breakage rate is reduced. Furthermore, it has been confirmed that the configuration in which the recess of the valley 4b is in a range from 30% or more to 70% or less is particularly effective, with attaining the highest effect in the case where the recess is 50%. Moreover, it has been confirmed that the effect is further enhanced by forming the inward inclined face 4d in the peripheral side face of the valley 4b.

As apparent from the above description, according to the grid for a battery plate of the invention and the method of producing it, deformation of the endmost node of the metal sheet can be reduced by recessing the peripheral side face of the endmost node forming valley of the endmost disk cutter. Therefore, the wires drawn out from the endmost node can be surely prevented from being easily broken, a failure of a battery can be suppressed from occurring, and the life of a battery can be prolonged.

Preferred embodiments of the invention have been described.

The invention can be implemented by combining the various processes described above to prevent rupture from occurring during a production process, to prevent corrosion and a crack of corrosion from occurring after production of a grid for a battery plate, thereby preventing the capacity of a lead storage battery from being reduced, and the life of the battery from being shortened. As described above, the aspects of the invention relate to one another as a whole. These inventions belong to the same technique from the viewpoint that a crack of corrosion in a node of a grid which may occur during a process of producing a grid for a battery plate, or during use in a storage battery can be prevented from occurring so as to provide a storage battery of a long life.

What is claimed is:

1. A method of producing a grid for a battery plate comprising:
   providing a rotary expander having two or more opposed disk cutter rolls, each of said disk cutter rolls having:
      a plurality of disk cutters on a same shaft with forming a gap therebetween, each of said disk cutters being configured by:
         alternately forming ridges in which a peripheral side face protrudes toward an outer periphery from a reference circumferential face of a predetermined radius,
         and valleys in which a peripheral side face composed of a face substantially extending along the reference circumferential face is formed, in a whole periphery of a peripheral edge of a disk, the reference circumferential face being centered at a rotation axis of said disk; and,
      for each of said valleys, forming a groove which is opened in a peripheral side face of said valley, in a peripheral edge portion of one of the disk faces in which valleys that are adjacent to each other via a ridge are formed in an oppositely reverse manner, wherein:
   among said disk cutter rolls, a disk cutter roll which is opposed to a disk cutter roll having a disk cutter that is disposed outermost is provided an endmost disk cutter that is placed more outward than said outermost disk cutter,
   an entire peripheral side face of said endmost disk cutter is configured by the reference circumferential face,
   valleys are provided on the peripheral side face of the endmost disk cutter at regular intervals, the valleys including a first set of valleys and a second set of valleys which are alternately arranged with respect to each other, each valley of the first set of valleys being an endmost node forming valley which corresponds to a valley in a disk cutter of another disk cutter roll that is opposed via said metal sheet,
   a peripheral side face which is recessed toward a center with respect to said reference circumferential face is formed in each valley of the first set of valleys, and
   an outermost diameter of the endmost disk cutter when measured between valleys of the second set of valleys is substantially equal to the diameter of the endmost disk cutter when measured at the peripheral side face of the endmost disk cutter configured by the reference circumferential face; and
   passing said metal sheet between said two or more opposed disk cutter rolls.

2. A method of producing a grid for a battery plate according to claim 1, wherein an inclined face is formed in said peripheral side face of said endmost node forming valley, said inclined face being nearer to the center as being more inward.

3. A method of producing a grid for a battery plate according to claim 1, wherein said peripheral side face of said endmost node forming valley is recessed toward the center with respect to said reference circumferential face by a degree which is not smaller than 30% and not larger than 70% of a thickness of said metal sheet.

* * * * *